United States Patent
Ishikawa et al.

(10) Patent No.: US 12,467,071 B2
(45) Date of Patent: Nov. 11, 2025

(54) METHOD FOR PRODUCING SECRETED β-GALACTOSIDASE

(71) Applicant: Kabushiki Kaisha Yakult Honsha, Tokyo (JP)

(72) Inventors: Eiji Ishikawa, Tokyo (JP); Masakazu Ikeda, Tokyo (JP); Minako Anbe, Tokyo (JP); Hiroshi Hatano, Tokyo (JP)

(73) Assignee: KABUSHIKI KAISHA YAKULT HONSHA, Tokyo (JP)

( * ) Notice: Subject to any disclaimer, the term of this patent is extended or adjusted under 35 U.S.C. 154(b) by 886 days.

(21) Appl. No.: 17/293,189

(22) PCT Filed: Nov. 7, 2019

(86) PCT No.: PCT/JP2019/043629
§ 371 (c)(1),
(2) Date: May 12, 2021

(87) PCT Pub. No.: WO2020/100706
PCT Pub. Date: May 22, 2020

(65) Prior Publication Data
US 2022/0002771 A1    Jan. 6, 2022

(30) Foreign Application Priority Data

Nov. 13, 2018  (JP) ................ 2018-212757

(51) Int. Cl.
C12P 19/04  (2006.01)
C12R 1/69   (2006.01)

(52) U.S. Cl.
CPC .......... C12P 19/04 (2013.01); *C12R 2001/69* (2021.05)

(58) Field of Classification Search
CPC ..................................................... C12P 19/04
See application file for complete search history.

(56) References Cited

U.S. PATENT DOCUMENTS

2019/0119662 A1   4/2019  Hoshi et al.

FOREIGN PATENT DOCUMENTS

| CN | 101864439 A | 10/2010 |
|---|---|---|
| JP | 7-236480 A | 9/1995 |
| JP | 11-80153 | 3/1999 |
| JP | 2005-514911 A | 5/2005 |
| JP | 2006-223268 A | 8/2006 |
| WO | 01/49878 A1 | 7/2001 |
| WO | 2003/008575 A2 | 1/2003 |
| WO | 03/070957 A2 | 8/2003 |
| WO | 2017/115826 A1 | 7/2017 |

OTHER PUBLICATIONS

Extended European Search Report issued in European Patent Application No. 19 885 568.6 dated Sep. 13, 2022.
Ishikawa, E. et al., "Identification, Cloning and Characterization of a Sporobolomyces singularis beta-Galactosidase-like Enzyme Involved in Galacto-Oligosaccharide Production", Journal of Bioscience and Bioengineering, vol. 99, No. 4, 2005, pp. 331-339.
"Sporobolomyces singularis bg1A gene for beta-galactosidase-like enzyme, complete cds", Database GenBank, accession No. AB126324, 2008.
International Search Report issued in International Patent Application No. PCT/JP2019/043629, dated Feb. 4, 2020, along with English translation thereof.
Written Opinion of International Searching Authority issued in International Patent Application No. PCT/JP2019/043629, dated Feb. 4, 2020, along with English translation thereof.
Office Action dated Oct. 30, 2023 in corresponding Taiwanese family member Application No. 108140977. Note: this document is being submitted for its conventional categorization, in English (e.g., "X", "Y", etc.), of the documents cited therein, and the Examiner's consideration of this information on that basis is respectfully requested.
N Onishi et al., "*Purification and properties of a novel thermostable galacto-oligosaccharide-producing beta-galactosidase from Sterigmatomyces elviae CBS8119.*", Appl. Environ. Microbiol. Nov. 1995; 61 (11): 4026-4030.
Notice of Reasons for Refusal issued Apr. 17, 2025 in Japanese patent application No. 2024-033065, with English machine translation thereof.

*Primary Examiner* — Robert J Yamasaki
*Assistant Examiner* — Trevor Kane
(74) *Attorney, Agent, or Firm* — GREENBLUM & BERNSTEIN, P.L.C.

(57) ABSTRACT

A method for producing a secreted β-galactosidase, characterized by integrating a non-secreted β-galactosidase gene derived from a basidiomycetous yeast into Aspergillus oryzae to produce a secreted β-galactosidase, and a method for producing a galactooligosaccharide using a β-galactosidase produced by the method facilitate the production of a galactooligosaccharide.

3 Claims, 7 Drawing Sheets

Specification includes a Sequence Listing.

SEQUENCE LISTING

```
<160> NUMBER OF SEQ ID NOS: 29

<210> SEQ ID NO 1
<211> LENGTH: 1785
<212> TYPE: DNA
<213> ORGANISM: Sporobolomyces singularis
<220> FEATURE:
<221> NAME/KEY: CDS
<222> LOCATION: (1)..(1785)
<223> OTHER INFORMATION: Inventor: Ishikawa, Eiji; Ikeda, Masakazu;
      Anbe, Minako; Hatano, Hiroshi
<220> FEATURE:
<221> NAME/KEY: sig_peptide
<222> LOCATION: (1)..(57)
<220> FEATURE:
<221> NAME/KEY: mat_peptide
<222> LOCATION: (58)..(1782)

<400> SEQUENCE: 1 atg atg ctg cat gcg gca ctg ctc gtt gcg ctc ccc tgc gtg gtt ctt      48
Met Met Leu His Ala Ala Leu Leu Val Ala Leu Pro Cys Val Val Leu
                -15                 -10                  -5 gct cgt ccc gcc ggt gca gtt acc tac ccc ggt gcg att cca ctt agc      96
Ala Arg Pro Ala Gly Ala Val Thr Tyr Pro Gly Ala Ile Pro Leu Ser
         -1   1               5                  10 ttg acc agc aat tac gag acg ccg agt ccg acc gcc atc ccc ctg gag     144
Leu Thr Ser Asn Tyr Glu Thr Pro Ser Pro Thr Ala Ile Pro Leu Glu
             15                  20                  25
```

```
ccg acc cca acg gcg acc gga acc gcc gaa ctt gat gcg ctc tgg aat      192
Pro Thr Pro Thr Ala Thr Gly Thr Ala Glu Leu Asp Ala Leu Trp Asn
 30              35                  40                  45 ttg gtg gaa gca cag tac cct gtt cag acg gcg gct gtc acc acc ctg      240
Leu Val Glu Ala Gln Tyr Pro Val Gln Thr Ala Ala Val Thr Thr Leu
                 50                  55                  60 gtg acg gtg ccc gac gac tac aag ttt gaa gca gac cct cct tcc tat      288
Val Thr Val Pro Asp Asp Tyr Lys Phe Glu Ala Asp Pro Pro Ser Tyr
             65                  70                  75 gct ctt gct ggc tac gag aca tca gaa att gcc ggt ttg aag ttc ccg      336
Ala Leu Ala Gly Tyr Glu Thr Ser Glu Ile Ala Gly Leu Lys Phe Pro
         80                  85                  90 aag ggg ttc aag ttt ggc gtg gcc ggc gcg gct att caa gtg gaa ggc      384
Lys Gly Phe Lys Phe Gly Val Ala Gly Ala Ala Ile Gln Val Glu Gly
     95                 100                 105 gca gcg aaa gca gag gga cga ggc cca tcc act tgg gat tac ttg tgc      432
Ala Ala Lys Ala Glu Gly Arg Gly Pro Ser Thr Trp Asp Tyr Leu Cys
110             115                 120                 125 cac cat tac gcg tcc aca cag tgc aac aac tat gat cct gac att acg      480
His His Tyr Ala Ser Thr Gln Cys Asn Asn Tyr Asp Pro Asp Ile Thr
                130                 135                 140 acg aac cat tac tac ctt tac cct ctt gat ttc gcc cgg ctc cag cat      528
Thr Asn His Tyr Tyr Leu Tyr Pro Leu Asp Phe Ala Arg Leu Gln His
            145                 150                 155 cta ggc atc aac acg tat tcg ttt tca atc tcc tgg act cgt ata tac      576
Leu Gly Ile Asn Thr Tyr Ser Phe Ser Ile Ser Trp Thr Arg Ile Tyr
        160                 165                 170 cct ctg ggt gct ggc tac gtt aac gaa gcc ggt ttg gcg cat tac gac      624
Pro Leu Gly Ala Gly Tyr Val Asn Glu Ala Gly Leu Ala His Tyr Asp
175                 180                 185 gcg gta atc cac tcg gcc aag aag tac ggg ctg gag cct gtc gga aca      672
Ala Val Ile His Ser Ala Lys Lys Tyr Gly Leu Glu Pro Val Gly Thr
190                 195                 200                 205 gta ttt cac tgg gac acc cct ctc agc ctc atg ctc aaa tat ggc gcg      720
Val Phe His Trp Asp Thr Pro Leu Ser Leu Met Leu Lys Tyr Gly Ala
                210                 215                 220 tgg caa gat acc ggc gac cag atc gtt aaa gat ttc gtc aca tac gcc      768
Trp Gln Asp Thr Gly Asp Gln Ile Val Lys Asp Phe Val Thr Tyr Ala
            225                 230                 235 acc acc gtc ttc aaa cga tac ggt aat gaa gtc aag acc tgg ttc acg      816
Thr Thr Val Phe Lys Arg Tyr Gly Asn Glu Val Lys Thr Trp Phe Thr
        240                 245                 250 ttc aat gag cct cgc gtg ttc tgt tct caa aac agt ggc ctt ccc tat      864
Phe Asn Glu Pro Arg Val Phe Cys Ser Gln Asn Ser Gly Leu Pro Tyr
255                 260                 265 aac ctc acg tat cct gag gga atc aac tca act tca gcc gtc ttc cgg      912
Asn Leu Thr Tyr Pro Glu Gly Ile Asn Ser Thr Ser Ala Val Phe Arg
270                 275                 280                 285 tgt act tat aac gtc ctg aaa gcc cat ggc cac gcg gtt aag gtt tac      960
Cys Thr Tyr Asn Val Leu Lys Ala His Gly His Ala Val Lys Val Tyr
                290                 295                 300 cgg gat ctc gtt gcc agc gga acc att gct gct gga gag atc ggc ttc     1008
Arg Asp Leu Val Ala Ser Gly Thr Ile Ala Ala Gly Glu Ile Gly Phe
            305                 310                 315 aag tcg gac gac aac tac cca atc cca gcg cgg ccc gga aac gcg gac     1056
Lys Ser Asp Asp Asn Tyr Pro Ile Pro Ala Arg Pro Gly Asn Ala Asp
        320                 325                 330 gac gag gaa tcc gcc aaa cgt cac gaa gcg ttc cga atc gga atc ttt     1104
Asp Glu Glu Ser Ala Lys Arg His Glu Ala Phe Arg Ile Gly Ile Phe
335                 340                 345
```

```
gcc cag cca gtt tac gga aac ggc gac tat cct gat gta gta aaa gag     1152
Ala Gln Pro Val Tyr Gly Asn Gly Asp Tyr Pro Asp Val Val Lys Glu
350                 355                 360                 365 acc gtt ggc gac atg ctg ccc gcc ctg acg gat gag gac aag ggc tac     1200
Thr Val Gly Asp Met Leu Pro Ala Leu Thr Asp Glu Asp Lys Gly Tyr
                370                 375                 380 atc aag ggc agc ggc gac atc ttc gcc att gac ggt tac cgg acc gat     1248
Ile Lys Gly Ser Gly Asp Ile Phe Ala Ile Asp Gly Tyr Arg Thr Asp
            385                 390                 395 atc tcg cat gcc gca ctg aat gga atc gcg aat tgc atc aga aac cag     1296
Ile Ser His Ala Ala Leu Asn Gly Ile Ala Asn Cys Ile Arg Asn Gln
        400                 405                 410 tcg gac cct aac tgg cct gtt tgc gag gaa ggg tct gac ccg ttc gcc     1344
Ser Asp Pro Asn Trp Pro Val Cys Glu Glu Gly Ser Asp Pro Phe Ala
    415                 420                 425 cac gta tac ccg tct ggt ttc gcc atc ggc cag tcc gcc gat ccg ctg     1392
His Val Tyr Pro Ser Gly Phe Ala Ile Gly Gln Ser Ala Asp Pro Leu
430                 435                 440                 445 tcg tca tgg ctc gtc aac tcc gcc cca ttt att cgc gac cag ctg aag     1440
Ser Ser Trp Leu Val Asn Ser Ala Pro Phe Ile Arg Asp Gln Leu Lys
                450                 455                 460 ttc ctc act caa acg tac ccg gca aag gga ggt att tac ttc agc gag     1488
Phe Leu Thr Gln Thr Tyr Pro Ala Lys Gly Gly Ile Tyr Phe Ser Glu
            465                 470                 475 ttt ggg tgg gcc gag gat gcg gag tac gac cgc cag ctg ttg tac caa     1536
Phe Gly Trp Ala Glu Asp Ala Glu Tyr Asp Arg Gln Leu Leu Tyr Gln
        480                 485                 490 atc acc tgg gac ggt ctt agg acc cag tat ctc act gac tac ctg tcc     1584
Ile Thr Trp Asp Gly Leu Arg Thr Gln Tyr Leu Thr Asp Tyr Leu Ser
    495                 500                 505 caa ctc ctg ctc gcc gtc cat aag gat ggg att aat ctt cgc ggc gcg     1632
Gln Leu Leu Leu Ala Val His Lys Asp Gly Ile Asn Leu Arg Gly Ala
510                 515                 520                 525 tta acc tgg agt ttc gtc gac aac tgg gaa tgg gga ctg ggg atg caa     1680
Leu Thr Trp Ser Phe Val Asp Asn Trp Glu Trp Gly Leu Gly Met Gln
                530                 535                 540 cag aaa ttc gga ttc cag ttt gtc aat cag tcg gac cca gat ctc acc     1728
Gln Lys Phe Gly Phe Gln Phe Val Asn Gln Ser Asp Pro Asp Leu Thr
            545                 550                 555 agg acc ttc aaa ctc tct gcg cac gct tac gct caa ttt ggt cgc aac     1776
Arg Thr Phe Lys Leu Ser Ala His Ala Tyr Ala Gln Phe Gly Arg Asn
        560                 565                 570 cac ctc tga                                                         1785
His Leu
    575

<210> SEQ ID NO 2
<211> LENGTH: 594
<212> TYPE: PRT
<213> ORGANISM: Sporobolomyces singularis

<400> SEQUENCE: 2

Met Met Leu His Ala Ala Leu Leu Val Ala Leu Pro Cys Val Val Leu
            -15                 -10                  -5

Ala Arg Pro Ala Gly Ala Val Thr Tyr Pro Gly Ala Ile Pro Leu Ser
        -1   1               5                   10

Leu Thr Ser Asn Tyr Glu Thr Pro Ser Pro Thr Ala Ile Pro Leu Glu
            15                  20                  25

Pro Thr Pro Thr Ala Thr Gly Thr Ala Glu Leu Asp Ala Leu Trp Asn
```

-continued

```
                30                  35                  40                  45
        Leu Val Glu Ala Gln Tyr Pro Val Gln Thr Ala Ala Val Thr Thr Leu
                            50                  55                  60

Val Thr Val Pro Asp Asp Tyr Lys Phe Glu Ala Asp Pro Pro Ser Tyr
                    65                  70                  75

Ala Leu Ala Gly Tyr Glu Thr Ser Glu Ile Ala Gly Leu Lys Phe Pro
                80                  85                  90

Lys Gly Phe Lys Phe Gly Val Ala Gly Ala Ala Ile Gln Val Glu Gly
        95                  100                 105

Ala Ala Lys Ala Glu Gly Arg Gly Pro Ser Thr Trp Asp Tyr Leu Cys
        110                 115                 120                 125

His His Tyr Ala Ser Thr Gln Cys Asn Asn Tyr Asp Pro Asp Ile Thr
                            130                 135                 140

Thr Asn His Tyr Tyr Leu Tyr Pro Leu Asp Phe Ala Arg Leu Gln His
                    145                 150                 155

Leu Gly Ile Asn Thr Tyr Ser Phe Ser Ile Ser Trp Thr Arg Ile Tyr
                    160                 165                 170

Pro Leu Gly Ala Gly Tyr Val Asn Glu Ala Gly Leu Ala His Tyr Asp
                175                 180                 185

Ala Val Ile His Ser Ala Lys Lys Tyr Gly Leu Glu Pro Val Gly Thr
        190                 195                 200                 205

Val Phe His Trp Asp Thr Pro Leu Ser Leu Met Leu Lys Tyr Gly Ala
                            210                 215                 220

Trp Gln Asp Thr Gly Asp Gln Ile Val Lys Asp Phe Val Thr Tyr Ala
                    225                 230                 235

Thr Thr Val Phe Lys Arg Tyr Gly Asn Glu Val Lys Thr Trp Phe Thr
                    240                 245                 250

Phe Asn Glu Pro Arg Val Phe Cys Ser Gln Asn Ser Gly Leu Pro Tyr
                255                 260                 265

Asn Leu Thr Tyr Pro Glu Gly Ile Asn Ser Thr Ser Ala Val Phe Arg
        270                 275                 280                 285

Cys Thr Tyr Asn Val Leu Lys Ala His Gly His Ala Val Lys Val Tyr
                            290                 295                 300

Arg Asp Leu Val Ala Ser Gly Thr Ile Ala Ala Gly Glu Ile Gly Phe
                    305                 310                 315

Lys Ser Asp Asp Asn Tyr Pro Ile Pro Ala Arg Pro Gly Asn Ala Asp
                320                 325                 330

Asp Glu Glu Ser Ala Lys Arg His Glu Ala Phe Arg Ile Gly Ile Phe
        335                 340                 345

Ala Gln Pro Val Tyr Gly Asn Gly Asp Tyr Pro Asp Val Val Lys Glu
        350                 355                 360                 365

Thr Val Gly Asp Met Leu Pro Ala Leu Thr Asp Glu Asp Lys Gly Tyr
                            370                 375                 380

Ile Lys Gly Ser Gly Asp Ile Phe Ala Ile Asp Gly Tyr Arg Thr Asp
                    385                 390                 395

Ile Ser His Ala Ala Leu Asn Gly Ile Ala Asn Cys Ile Arg Asn Gln
                    400                 405                 410

Ser Asp Pro Asn Trp Pro Val Cys Glu Glu Gly Ser Asp Pro Phe Ala
                415                 420                 425

His Val Tyr Pro Ser Gly Phe Ala Ile Gly Gln Ser Ala Asp Pro Leu
        430                 435                 440                 445

Ser Ser Trp Leu Val Asn Ser Ala Pro Phe Ile Arg Asp Gln Leu Lys
                            450                 455                 460
```

```
Phe Leu Thr Gln Thr Tyr Pro Ala Lys Gly Gly Ile Tyr Phe Ser Glu
                465                 470                 475

Phe Gly Trp Ala Glu Asp Ala Glu Tyr Asp Arg Gln Leu Leu Tyr Gln
            480                 485                 490

Ile Thr Trp Asp Gly Leu Arg Thr Gln Tyr Leu Thr Asp Tyr Leu Ser
    495                 500                 505

Gln Leu Leu Ala Val His Lys Asp Gly Ile Asn Leu Arg Gly Ala
510                 515                 520                 525

Leu Thr Trp Ser Phe Val Asp Asn Trp Glu Trp Gly Leu Gly Met Gln
                530                 535                 540

Gln Lys Phe Gly Phe Gln Phe Val Asn Gln Ser Asp Pro Asp Leu Thr
            545                 550                 555

Arg Thr Phe Lys Leu Ser Ala His Ala Tyr Ala Gln Phe Gly Arg Asn
        560                 565                 570

His Leu
    575

<210> SEQ ID NO 3
<211> LENGTH: 1791
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1791)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1788)

<400> SEQUENCE: 3 atg atg gtc gcg tgg tgg tct cta ttt ctg tac ggc ctt cag gtc gcg      48
Met Met Val Ala Trp Trp Ser Leu Phe Leu Tyr Gly Leu Gln Val Ala
    -20                 -15                 -10 gca cct gct ttg gct gcc ggt gca gtt acc tac ccc ggt gcg att cca      96
Ala Pro Ala Leu Ala Ala Gly Ala Val Thr Tyr Pro Gly Ala Ile Pro
-5              -1   1               5                   10 ctt agc ttg acc agc aat tac gag acg ccg agt ccg acc gcc atc ccc     144
Leu Ser Leu Thr Ser Asn Tyr Glu Thr Pro Ser Pro Thr Ala Ile Pro
                15                  20                  25 ctg gag ccg acc cca acg gcg acc gga acc gcc gaa ctt gat gcg ctc     192
Leu Glu Pro Thr Pro Thr Ala Thr Gly Thr Ala Glu Leu Asp Ala Leu
            30                  35                  40 tgg aat ttg gtg gaa gca cag tac cct gtt cag acg gcg gct gtc acc     240
Trp Asn Leu Val Glu Ala Gln Tyr Pro Val Gln Thr Ala Ala Val Thr
45                  50                  55 acc ctg gtg acg gtg ccc gac gac tac aag ttt gaa gca gac cct cct     288
Thr Leu Val Thr Val Pro Asp Asp Tyr Lys Phe Glu Ala Asp Pro Pro
60                  65                  70                  75 tcc tat gct ctt gct ggc tac gag aca tca gaa att gcc ggc ttg aag     336
Ser Tyr Ala Leu Ala Gly Tyr Glu Thr Ser Glu Ile Ala Gly Leu Lys
                80                  85                  90 ttc ccg aag ggg ttc aag ttt ggc gtg gcc ggc gcg gct att caa gtg     384
Phe Pro Lys Gly Phe Lys Phe Gly Val Ala Gly Ala Ala Ile Gln Val
            95                  100                 105 gaa ggc gca gcg aaa gca gag gga cga ggc cca tcc act tgg gat tac     432
Glu Gly Ala Ala Lys Ala Glu Gly Arg Gly Pro Ser Thr Trp Asp Tyr
        110                 115                 120
```

```
ttg tgc cac cat tac gcg tcc aca cag tgc aac aac tat gat cct gac      480
Leu Cys His His Tyr Ala Ser Thr Gln Cys Asn Asn Tyr Asp Pro Asp
    125                 130                 135 att acg acg aac cat tac tac ctt tac cct ctt gat ttc gcc cgg ctc      528
Ile Thr Thr Asn His Tyr Tyr Leu Tyr Pro Leu Asp Phe Ala Arg Leu
140                 145                 150                 155 cag cat cta ggc atc aac acg tat tcg ttt tca atc tcc tgg act cgt      576
Gln His Leu Gly Ile Asn Thr Tyr Ser Phe Ser Ile Ser Trp Thr Arg
                160                 165                 170 ata tac cct ctg ggt gct ggc tac gtt aac gaa gcc ggt ttg gcg cat      624
Ile Tyr Pro Leu Gly Ala Gly Tyr Val Asn Glu Ala Gly Leu Ala His
                175                 180                 185 tac gac gcg gta atc cac tcg gcc aag aag tac ggg ctg gag cct gtc      672
Tyr Asp Ala Val Ile His Ser Ala Lys Lys Tyr Gly Leu Glu Pro Val
            190                 195                 200 gga aca gta ttt cac tgg gac acc cct ctc agc ctc atg ctc aaa tat      720
Gly Thr Val Phe His Trp Asp Thr Pro Leu Ser Leu Met Leu Lys Tyr
        205                 210                 215 ggc gcg tgg caa gat acc ggc gac cag atc gtt aaa gat ttc gtc aca      768
Gly Ala Trp Gln Asp Thr Gly Asp Gln Ile Val Lys Asp Phe Val Thr
220                 225                 230                 235 tac gcc acc acc gtc ttc aaa cga tac ggt aat gaa gtc aag acc tgg      816
Tyr Ala Thr Thr Val Phe Lys Arg Tyr Gly Asn Glu Val Lys Thr Trp
                240                 245                 250 ttc acg ttc aat gag cct cgc gtg ttc tgt tct caa aac agt ggc ctt      864
Phe Thr Phe Asn Glu Pro Arg Val Phe Cys Ser Gln Asn Ser Gly Leu
                255                 260                 265 ccc tat aac ctc acg tat cct gag gga atc aac tca act tca gcc gtc      912
Pro Tyr Asn Leu Thr Tyr Pro Glu Gly Ile Asn Ser Thr Ser Ala Val
            270                 275                 280 ttc cgg tgt act tat aac gtc ctg aaa gcc cat ggc cac gcg gtt aag      960
Phe Arg Cys Thr Tyr Asn Val Leu Lys Ala His Gly His Ala Val Lys
        285                 290                 295 gtt tac cgg gat ctc gtt gcc agc gga acc att gct gct gga gag atc     1008
Val Tyr Arg Asp Leu Val Ala Ser Gly Thr Ile Ala Ala Gly Glu Ile
300                 305                 310                 315 ggc ttc aag tcg gac gac aac tac cca atc cca gcg cgg ccc gga aac     1056
Gly Phe Lys Ser Asp Asp Asn Tyr Pro Ile Pro Ala Arg Pro Gly Asn
                320                 325                 330 gcg gac gac gag gaa tcc gcc aaa cgt cac gaa gcg ttc cga atc gga     1104
Ala Asp Asp Glu Glu Ser Ala Lys Arg His Glu Ala Phe Arg Ile Gly
                335                 340                 345 atc ttt gcc cag cca gtt tac gga aac ggc gac tat cct gat gta gta     1152
Ile Phe Ala Gln Pro Val Tyr Gly Asn Gly Asp Tyr Pro Asp Val Val
            350                 355                 360 aaa gag acc gtt ggc gac atg ctg ccc gcc ctg acg gat gag gac aag     1200
Lys Glu Thr Val Gly Asp Met Leu Pro Ala Leu Thr Asp Glu Asp Lys
        365                 370                 375 ggc tac atc aag ggc agc ggc gac atc ttc gcc att gac ggt tac cgg     1248
Gly Tyr Ile Lys Gly Ser Gly Asp Ile Phe Ala Ile Asp Gly Tyr Arg
380                 385                 390                 395 acc gat atc tcg cat gcc gca ctg aat gga atc gcg aat tgc atc aga     1296
Thr Asp Ile Ser His Ala Ala Leu Asn Gly Ile Ala Asn Cys Ile Arg
                400                 405                 410 aac cag tcg gac cct aac tgg cct gtt tgc gag gaa ggg tct gac ccg     1344
Asn Gln Ser Asp Pro Asn Trp Pro Val Cys Glu Glu Gly Ser Asp Pro
                415                 420                 425 ttc gcc cac gta tac ccg tct ggt ttc gcc atc ggc cag tcc gcc gat     1392
Phe Ala His Val Tyr Pro Ser Gly Phe Ala Ile Gly Gln Ser Ala Asp
```

-continued

```
                430                 435                 440
ccg ctg tcg tca tgg ctc gtc aac tcc gcc cca ttt att cgc gac cag    1440
Pro Leu Ser Ser Trp Leu Val Asn Ser Ala Pro Phe Ile Arg Asp Gln
    445                 450                 455 ctg aag ttc ctc act caa acg tac ccg gca aag gga ggt att tac ttc    1488
Leu Lys Phe Leu Thr Gln Thr Tyr Pro Ala Lys Gly Gly Ile Tyr Phe
460                 465                 470                 475 agc gag ttt ggg tgg gcc gag gat gcg gag tac gac cgc cag ctg ttg    1536
Ser Glu Phe Gly Trp Ala Glu Asp Ala Glu Tyr Asp Arg Gln Leu Leu
                480                 485                 490 tac caa atc acc tgg gac ggt ctt agg acc cag tat ctc act gac tac    1584
Tyr Gln Ile Thr Trp Asp Gly Leu Arg Thr Gln Tyr Leu Thr Asp Tyr
            495                 500                 505 ctg tcc caa ctc ctg ctc gcc gtc cat aag gat ggg att aat ctt cgc    1632
Leu Ser Gln Leu Leu Leu Ala Val His Lys Asp Gly Ile Asn Leu Arg
        510                 515                 520 ggc gcg tta acc tgg agt ttc gtc gac aac tgg gaa tgg gga ctg ggg    1680
Gly Ala Leu Thr Trp Ser Phe Val Asp Asn Trp Glu Trp Gly Leu Gly
    525                 530                 535 atg caa cag aaa ttc gga ttc cag ttt gtc aat cag tcg gac cca gat    1728
Met Gln Gln Lys Phe Gly Phe Gln Phe Val Asn Gln Ser Asp Pro Asp
540                 545                 550                 555 ctc acc agg acc ttc aaa ctc tct gcg cac gct tac gct caa ttt ggt    1776
Leu Thr Arg Thr Phe Lys Leu Ser Ala His Ala Tyr Ala Gln Phe Gly
                560                 565                 570 cgc aac cac ctc tga                                                1791
Arg Asn His Leu
            575
```

<210> SEQ ID NO 4
<211> LENGTH: 596
<212> TYPE: PRT
<213> ORGANISM: Artificial Sequence
<220> FEATURE:
<223> OTHER INFORMATION: Synthetic Construct

<400> SEQUENCE: 4

```
Met Met Val Ala Trp Trp Ser Leu Phe Leu Tyr Gly Leu Gln Val Ala
    -20                 -15                 -10

Ala Pro Ala Leu Ala Ala Gly Ala Val Thr Tyr Pro Gly Ala Ile Pro
-5               -1  1               5                   10

Leu Ser Leu Thr Ser Asn Tyr Glu Thr Pro Ser Pro Thr Ala Ile Pro
                15                  20                  25

Leu Glu Pro Thr Pro Thr Ala Thr Gly Thr Ala Glu Leu Asp Ala Leu
        30                  35                  40

Trp Asn Leu Val Glu Ala Gln Tyr Pro Val Gln Thr Ala Val Thr
    45                  50                  55

Thr Leu Val Thr Val Pro Asp Asp Tyr Lys Phe Glu Ala Asp Pro Pro
60                  65                  70                  75

Ser Tyr Ala Leu Ala Gly Tyr Glu Thr Ser Glu Ile Ala Gly Leu Lys
                80                  85                  90

Phe Pro Lys Gly Phe Lys Phe Gly Val Ala Gly Ala Ala Ile Gln Val
        95                  100                 105

Glu Gly Ala Ala Lys Ala Glu Gly Arg Gly Pro Ser Thr Trp Asp Tyr
            110                 115                 120

Leu Cys His His Tyr Ala Ser Thr Gln Cys Asn Asn Tyr Asp Pro Asp
        125                 130                 135

Ile Thr Thr Asn His Tyr Tyr Leu Tyr Pro Leu Asp Phe Ala Arg Leu
```

-continued

|     |     |     |     |
| --- | --- | --- | --- |
| 140 | 145 | 150 | 155 |

Gln His Leu Gly Ile Asn Thr Tyr Ser Phe Ser Ile Ser Trp Thr Arg
                    160                 165                 170

Ile Tyr Pro Leu Gly Ala Gly Tyr Val Asn Glu Ala Gly Leu Ala His
            175                 180                 185

Tyr Asp Ala Val Ile His Ser Ala Lys Lys Tyr Gly Leu Glu Pro Val
            190                 195                 200

Gly Thr Val Phe His Trp Asp Thr Pro Leu Ser Leu Met Leu Lys Tyr
    205                 210                 215

Gly Ala Trp Gln Asp Thr Gly Asp Gln Ile Val Lys Asp Phe Val Thr
220                 225                 230                 235

Tyr Ala Thr Thr Val Phe Lys Arg Tyr Gly Asn Glu Val Lys Thr Trp
                240                 245                 250

Phe Thr Phe Asn Glu Pro Arg Val Phe Cys Ser Gln Asn Ser Gly Leu
                255                 260                 265

Pro Tyr Asn Leu Thr Tyr Pro Glu Gly Ile Asn Ser Thr Ser Ala Val
            270                 275                 280

Phe Arg Cys Thr Tyr Asn Val Leu Lys Ala His Gly His Ala Val Lys
        285                 290                 295

Val Tyr Arg Asp Leu Val Ala Ser Gly Thr Ile Ala Ala Gly Glu Ile
300                 305                 310                 315

Gly Phe Lys Ser Asp Asn Tyr Pro Ile Pro Ala Arg Pro Gly Asn
                320                 325                 330

Ala Asp Asp Glu Glu Ser Ala Lys Arg His Glu Ala Phe Arg Ile Gly
                335                 340                 345

Ile Phe Ala Gln Pro Val Tyr Gly Asn Gly Asp Tyr Pro Asp Val Val
            350                 355                 360

Lys Glu Thr Val Gly Asp Met Leu Pro Ala Leu Thr Asp Glu Asp Lys
    365                 370                 375

Gly Tyr Ile Lys Gly Ser Gly Asp Ile Phe Ala Ile Asp Gly Tyr Arg
380                 385                 390                 395

Thr Asp Ile Ser His Ala Ala Leu Asn Gly Ile Ala Asn Cys Ile Arg
                400                 405                 410

Asn Gln Ser Asp Pro Asn Trp Pro Val Cys Glu Glu Gly Ser Asp Pro
            415                 420                 425

Phe Ala His Val Tyr Pro Ser Gly Phe Ala Ile Gly Gln Ser Ala Asp
        430                 435                 440

Pro Leu Ser Ser Trp Leu Val Asn Ser Ala Pro Phe Ile Arg Asp Gln
    445                 450                 455

Leu Lys Phe Leu Thr Gln Thr Tyr Pro Ala Lys Gly Ile Tyr Phe
460                 465                 470                 475

Ser Glu Phe Gly Trp Ala Glu Asp Ala Glu Tyr Asp Arg Gln Leu Leu
                480                 485                 490

Tyr Gln Ile Thr Trp Asp Gly Leu Arg Thr Gln Tyr Leu Thr Asp Tyr
            495                 500                 505

Leu Ser Gln Leu Leu Ala Val His Lys Asp Gly Ile Asn Leu Arg
        510                 515                 520

Gly Ala Leu Thr Trp Ser Phe Val Asp Asn Trp Glu Trp Gly Leu Gly
    525                 530                 535

Met Gln Gln Lys Phe Gly Phe Gln Phe Val Asn Gln Ser Asp Pro Asp
540                 545                 550                 555

Leu Thr Arg Thr Phe Lys Leu Ser Ala His Ala Tyr Ala Gln Phe Gly
                560                 565                 570

<210> SEQ ID NO 5
<211> LENGTH: 1791
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1791)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1788)

<400> SEQUENCE: 5

```
atg atg gtc gcg tgg tgg tct cta ttt ctg tac ggc ctt cag gtc gcg      48
Met Met Val Ala Trp Trp Ser Leu Phe Leu Tyr Gly Leu Gln Val Ala
    -20                 -15                 -10 gca cct gct ttg gct gct ggc gcc gtc aca tac ccc gga gct att cca      96
Ala Pro Ala Leu Ala Ala Gly Ala Val Thr Tyr Pro Gly Ala Ile Pro
 -5                  -1  1               5                  10 ctg tcc ctc aca agc aac tac gag aca cct tct cct acc gcc att cct     144
Leu Ser Leu Thr Ser Asn Tyr Glu Thr Pro Ser Pro Thr Ala Ile Pro
            15                  20                  25 ttg gag cca act ccg act gca act gga acc gca gaa ctg gat gcg ctc     192
Leu Glu Pro Thr Pro Thr Ala Thr Gly Thr Ala Glu Leu Asp Ala Leu
        30                  35                  40 tgg aac ctt gtc gaa gct cag tat ccc gtc caa acg gcc gca gtc acc     240
Trp Asn Leu Val Glu Ala Gln Tyr Pro Val Gln Thr Ala Ala Val Thr
    45                  50                  55 acc ctc gtc acc gtc cct gac gac tac aag ttc gag gcc gat cct cct     288
Thr Leu Val Thr Val Pro Asp Asp Tyr Lys Phe Glu Ala Asp Pro Pro
60                  65                  70                  75 agc tat gca ctc gca ggt tac gag act tcc gag att gcg gga ctg aag     336
Ser Tyr Ala Leu Ala Gly Tyr Glu Thr Ser Glu Ile Ala Gly Leu Lys
                80                  85                  90 ttc ccc aaa ggt ttc aag ttc ggc gtt gct ggg gcc gcg att cag gtc     384
Phe Pro Lys Gly Phe Lys Phe Gly Val Ala Gly Ala Ala Ile Gln Val
            95                  100                 105 gaa ggc gct gct aaa gcg gaa gga cgt ggg ccc tct aca tgg gat tac     432
Glu Gly Ala Ala Lys Ala Glu Gly Arg Gly Pro Ser Thr Trp Asp Tyr
        110                 115                 120 ctc tgt cat cac tat gcc agc act cag tgc aac aac tac gat ccc gat     480
Leu Cys His His Tyr Ala Ser Thr Gln Cys Asn Asn Tyr Asp Pro Asp
    125                 130                 135 atc acc acc aac cat tac tac ctc tac ccc ctc gat ttc gcg cgt ctt     528
Ile Thr Thr Asn His Tyr Tyr Leu Tyr Pro Leu Asp Phe Ala Arg Leu
140                 145                 150                 155 caa cat ctg ggc atc aac acc tac tcc ttt tcc att tcc tgg acc cga     576
Gln His Leu Gly Ile Asn Thr Tyr Ser Phe Ser Ile Ser Trp Thr Arg
                160                 165                 170 atc tac cct ctc ggc gcc ggt tac gtc aac gag gcc ggc ttg gca cac     624
Ile Tyr Pro Leu Gly Ala Gly Tyr Val Asn Glu Ala Gly Leu Ala His
            175                 180                 185 tac gat gct gtc att cac tcc gcc aag aag tac gga ttg gag cca gtt     672
Tyr Asp Ala Val Ile His Ser Ala Lys Lys Tyr Gly Leu Glu Pro Val
        190                 195                 200
```

```
ggc acg gtc ttt cac tgg gac act cct ctg tcg ctc atg ctt aag tac    720
Gly Thr Val Phe His Trp Asp Thr Pro Leu Ser Leu Met Leu Lys Tyr
    205             210                 215 ggg gcg tgg cag gat act ggt gat cag atc gtc aag gac ttt gtg acg    768
Gly Ala Trp Gln Asp Thr Gly Asp Gln Ile Val Lys Asp Phe Val Thr
220             225                 230                 235 tat gcc acg acc gtt ttc aag cgc tat ggt aac gag gtc aag aca tgg    816
Tyr Ala Thr Thr Val Phe Lys Arg Tyr Gly Asn Glu Val Lys Thr Trp
                240                 245                 250 ttc aca ttc aac gag cca cgt gtc ttc tgc tcc cag aat tcc ggg ctt    864
Phe Thr Phe Asn Glu Pro Arg Val Phe Cys Ser Gln Asn Ser Gly Leu
            255                 260                 265 ccg tac aac ctg acc tat cct gaa ggc atc aac tct act tct gcg gtg    912
Pro Tyr Asn Leu Thr Tyr Pro Glu Gly Ile Asn Ser Thr Ser Ala Val
        270                 275                 280 ttc cgt tgc acg tac aac gtg ctt aag gct cat ggt cat gct gtc aaa    960
Phe Arg Cys Thr Tyr Asn Val Leu Lys Ala His Gly His Ala Val Lys
285                 290                 295 gtg tat cga gat ctt gtg gca tcg ggt aca atc gct gcc ggc gag atc   1008
Val Tyr Arg Asp Leu Val Ala Ser Gly Thr Ile Ala Ala Gly Glu Ile
300                 305                 310                 315 ggc ttc aag agc gac gac aac tac ccg atc ccg gct cgg cct ggt aat   1056
Gly Phe Lys Ser Asp Asp Asn Tyr Pro Ile Pro Ala Arg Pro Gly Asn
            320                 325                 330 gcc gac gac gag gag tcg gcc aag cgc cac gaa gca ttt cga atc ggc   1104
Ala Asp Asp Glu Glu Ser Ala Lys Arg His Glu Ala Phe Arg Ile Gly
        335                 340                 345 atc ttc gcc cag cct gtg tat ggg aat ggt gac tat ccc gat gtg gtg   1152
Ile Phe Ala Gln Pro Val Tyr Gly Asn Gly Asp Tyr Pro Asp Val Val
    350                 355                 360 aag gag acc gtg ggc gac atg ctc ccc gcc ctt acc gat gag gac aaa   1200
Lys Glu Thr Val Gly Asp Met Leu Pro Ala Leu Thr Asp Glu Asp Lys
365                 370                 375 ggt tac atc aag ggc tcg ggc gac atc ttc gcg att gac ggc tat cgg   1248
Gly Tyr Ile Lys Gly Ser Gly Asp Ile Phe Ala Ile Asp Gly Tyr Arg
380                 385                 390                 395 act gac atc tcg cac gcg gct ctg aat ggc atc gca aac tgc att cgc   1296
Thr Asp Ile Ser His Ala Ala Leu Asn Gly Ile Ala Asn Cys Ile Arg
            400                 405                 410 aat cag agc gac cct aac tgg ccg gtg tgt gaa gaa gga agc gat ccg   1344
Asn Gln Ser Asp Pro Asn Trp Pro Val Cys Glu Glu Gly Ser Asp Pro
        415                 420                 425 ttt gcc cat gtg tat ccc tct ggc ttt gca att gga caa agc gct gat   1392
Phe Ala His Val Tyr Pro Ser Gly Phe Ala Ile Gly Gln Ser Ala Asp
    430                 435                 440 cct ctg tct tct tgg ctc gtt aac tcc gct ccc ttc atc cga gat caa   1440
Pro Leu Ser Ser Trp Leu Val Asn Ser Ala Pro Phe Ile Arg Asp Gln
445                 450                 455 ctg aag ttc ctg acg caa acc tat cct gca aaa ggc ggc atc tac ttc   1488
Leu Lys Phe Leu Thr Gln Thr Tyr Pro Ala Lys Gly Gly Ile Tyr Phe
460                 465                 470                 475 tcc gag ttt gga tgg gca gag gat gcg gaa tac gat cgg caa ctc ctt   1536
Ser Glu Phe Gly Trp Ala Glu Asp Ala Glu Tyr Asp Arg Gln Leu Leu
            480                 485                 490 tac cag atc acc tgg gac ggg ctt cgc act cag tat ctc acc gat tac   1584
Tyr Gln Ile Thr Trp Asp Gly Leu Arg Thr Gln Tyr Leu Thr Asp Tyr
        495                 500                 505 ctc tcc cag ctg ctg ttg gct gtg cat aag gat ggg atc aac ctt cgg   1632
Leu Ser Gln Leu Leu Leu Ala Val His Lys Asp Gly Ile Asn Leu Arg
    510                 515                 520
```

```
ggc gca ttg acc tgg tct ttc gtg gac aac tgg gaa tgg ggt ctg ggc    1680
Gly Ala Leu Thr Trp Ser Phe Val Asp Asn Trp Glu Trp Gly Leu Gly
        525                 530                 535 atg cag cag aag ttc gga ttc caa ttc gtc aat cag agc gat cca gac    1728
Met Gln Gln Lys Phe Gly Phe Gln Phe Val Asn Gln Ser Asp Pro Asp
540                 545                 550                 555 ttg acc cgc aca ttc aag ctc agc gct cat gcg tat gcc cag ttc ggg    1776
Leu Thr Arg Thr Phe Lys Leu Ser Ala His Ala Tyr Ala Gln Phe Gly
                560                 565                 570 cgc aat cac ctg taa                                                1791
Arg Asn His Leu
        575

<210> SEQ ID NO 6
<211> LENGTH: 596
<212> TYPE: PRT
<213> ORGANISM: Artificial Sequence
<220> FEATURE:
<223> OTHER INFORMATION: Synthetic Construct

<400> SEQUENCE: 6

Met Met Val Ala Trp Trp Ser Leu Phe Leu Tyr Gly Leu Gln Val Ala
    -20                 -15                 -10

Ala Pro Ala Leu Ala Ala Gly Ala Val Thr Tyr Pro Gly Ala Ile Pro
-5              -1   1               5                  10

Leu Ser Leu Thr Ser Asn Tyr Glu Thr Pro Ser Pro Thr Ala Ile Pro
                15                  20                  25

Leu Glu Pro Thr Pro Thr Ala Thr Gly Thr Ala Glu Leu Asp Ala Leu
                30                  35                  40

Trp Asn Leu Val Glu Ala Gln Tyr Pro Val Gln Thr Ala Ala Val Thr
        45                  50                  55

Thr Leu Val Thr Val Pro Asp Asp Tyr Lys Phe Glu Ala Asp Pro Pro
60                  65                  70                  75

Ser Tyr Ala Leu Ala Gly Tyr Glu Thr Ser Glu Ile Ala Gly Leu Lys
                80                  85                  90

Phe Pro Lys Gly Phe Lys Phe Gly Val Ala Gly Ala Ala Ile Gln Val
            95                  100                 105

Glu Gly Ala Ala Lys Ala Glu Gly Arg Gly Pro Ser Thr Trp Asp Tyr
        110                 115                 120

Leu Cys His His Tyr Ala Ser Thr Gln Cys Asn Asn Tyr Asp Pro Asp
125                 130                 135

Ile Thr Thr Asn His Tyr Tyr Leu Tyr Pro Leu Asp Phe Ala Arg Leu
140                 145                 150                 155

Gln His Leu Gly Ile Asn Thr Tyr Ser Phe Ser Ile Ser Trp Thr Arg
                160                 165                 170

Ile Tyr Pro Leu Gly Ala Gly Tyr Val Asn Glu Ala Gly Leu Ala His
            175                 180                 185

Tyr Asp Ala Val Ile His Ser Ala Lys Lys Tyr Gly Leu Glu Pro Val
        190                 195                 200

Gly Thr Val Phe His Trp Asp Thr Pro Leu Ser Leu Met Leu Lys Tyr
205                 210                 215

Gly Ala Trp Gln Asp Thr Gly Asp Gln Ile Val Lys Asp Phe Val Thr
220                 225                 230                 235

Tyr Ala Thr Thr Val Phe Lys Arg Tyr Gly Asn Glu Val Lys Thr Trp
                240                 245                 250

Phe Thr Phe Asn Glu Pro Arg Val Phe Cys Ser Gln Asn Ser Gly Leu
```

```
                    255                 260                 265
Pro Tyr Asn Leu Thr Tyr Pro Glu Gly Ile Asn Ser Thr Ser Ala Val
            270                 275                 280

Phe Arg Cys Thr Tyr Asn Val Leu Lys Ala His Gly His Ala Val Lys
            285                 290                 295

Val Tyr Arg Asp Leu Val Ala Ser Gly Thr Ile Ala Ala Gly Glu Ile
300                 305                 310                 315

Gly Phe Lys Ser Asp Asn Tyr Pro Ile Pro Ala Arg Pro Gly Asn
                320                 325                 330

Ala Asp Asp Glu Glu Ser Ala Lys Arg His Glu Ala Phe Arg Ile Gly
                335                 340                 345

Ile Phe Ala Gln Pro Val Tyr Gly Asn Gly Asp Tyr Pro Asp Val Val
            350                 355                 360

Lys Glu Thr Val Gly Asp Met Leu Pro Ala Leu Thr Asp Glu Asp Lys
365                 370                 375

Gly Tyr Ile Lys Gly Ser Gly Asp Ile Phe Ala Ile Asp Gly Tyr Arg
380                 385                 390                 395

Thr Asp Ile Ser His Ala Ala Leu Asn Gly Ile Ala Asn Cys Ile Arg
                400                 405                 410

Asn Gln Ser Asp Pro Asn Trp Pro Val Cys Glu Gly Ser Asp Pro
                415                 420                 425

Phe Ala His Val Tyr Pro Ser Gly Phe Ala Ile Gly Gln Ser Ala Asp
            430                 435                 440

Pro Leu Ser Ser Trp Leu Val Asn Ser Ala Pro Phe Ile Arg Asp Gln
            445                 450                 455

Leu Lys Phe Leu Thr Gln Thr Tyr Pro Ala Lys Gly Ile Tyr Phe
460                 465                 470                 475

Ser Glu Phe Gly Trp Ala Glu Asp Ala Glu Tyr Asp Arg Gln Leu Leu
                480                 485                 490

Tyr Gln Ile Thr Trp Asp Gly Leu Arg Thr Gln Tyr Leu Thr Asp Tyr
                495                 500                 505

Leu Ser Gln Leu Leu Leu Ala Val His Lys Asp Gly Ile Asn Leu Arg
510                 515                 520

Gly Ala Leu Thr Trp Ser Phe Val Asp Asn Trp Glu Trp Gly Leu Gly
            525                 530                 535

Met Gln Gln Lys Phe Gly Phe Gln Phe Val Asn Gln Ser Asp Pro Asp
540                 545                 550                 555

Leu Thr Arg Thr Phe Lys Leu Ser Ala His Ala Tyr Ala Gln Phe Gly
                560                 565                 570

Arg Asn His Leu
            575

<210> SEQ ID NO 7
<211> LENGTH: 2106
<212> TYPE: DNA
<213> ORGANISM: Sirobasidium magnum
<220> FEATURE:
<221> NAME/KEY: CDS
<222> LOCATION: (1)..(2106)
<220> FEATURE:
<221> NAME/KEY: sig_peptide
<222> LOCATION: (1)..(48)
<220> FEATURE:
<221> NAME/KEY: mat_peptide
<222> LOCATION: (49)..(2103)

<400> SEQUENCE: 7
```

| | |
|---|---|
| atg ttc aag ctt acc tct gtg ctg ttg ctg ctc ggt gca gct caa gca<br>Met Phe Lys Leu Thr Ser Val Leu Leu Leu Leu Gly Ala Ala Gln Ala<br>-15            -10                -5                -1 | 48 |
| gct gtt cta aac cct cgt caa gct ggc agc ggt aat tcc act gcc agc<br>Ala Val Leu Asn Pro Arg Gln Ala Gly Ser Gly Asn Ser Thr Ala Ser<br>1               5                  10              15 | 96 |
| ggc tcg ata gcc ggc gat tcc act aga cca gcc acg aca tcc tcg gtc<br>Gly Ser Ile Ala Gly Asp Ser Thr Arg Pro Ala Thr Thr Ser Ser Val<br>        20                  25                 30 | 144 |
| gtc tca ccc tct gca gcc aga aac tcc act gcc gca gct act ggt aat<br>Val Ser Pro Ser Ala Ala Arg Asn Ser Thr Ala Ala Ala Thr Gly Asn<br>        35                  40                 45 | 192 |
| gct tct cgc aat gct act gcg aca ggt act gcc gtc gct aca gcc act<br>Ala Ser Arg Asn Ala Thr Ala Thr Gly Thr Ala Val Ala Thr Ala Thr<br>        50                  55                 60 | 240 |
| ggc ggg gtt aca gca gcc acg tcc act gga atg gcg gtg act tcc cct<br>Gly Gly Val Thr Ala Ala Thr Ser Thr Gly Met Ala Val Thr Ser Pro<br>65              70                  75              80 | 288 |
| gcc cag gga gcc ggt acc gga gtc ggt acc gca gcc gct gct acg acg<br>Ala Gln Gly Ala Gly Thr Gly Val Gly Thr Ala Ala Ala Ala Thr Thr<br>                85                  90                 95 | 336 |
| act acc gcc acg cct agc caa tcc gac ttt gat aat tgg gtc ctc acc<br>Thr Thr Ala Thr Pro Ser Gln Ser Asp Phe Asp Asn Trp Val Leu Thr<br>            100                 105                110 | 384 |
| agt gga ttg cct acc atc acc act tca ttg atc agt acc aat ccc gat<br>Ser Gly Leu Pro Thr Ile Thr Thr Ser Leu Ile Ser Thr Asn Pro Asp<br>            115                 120                125 | 432 |
| gcc att act ccg act gcc agt act tca gga ccg aag cct acg gtc acg<br>Ala Ile Thr Pro Thr Ala Ser Thr Ser Gly Pro Lys Pro Thr Val Thr<br>130             135                 140 | 480 |
| ttc agc tcg tac tcg gac caa gag ctg gag aat ctc tgg gac gac ttt<br>Phe Ser Ser Tyr Ser Asp Gln Glu Leu Glu Asn Leu Trp Asp Asp Phe<br>145             150                 155                160 | 528 |
| gtg gga caa gta caa caa cct cca ttc agc tat gtt cca gaa ccc caa<br>Val Gly Gln Val Gln Gln Pro Pro Phe Ser Tyr Val Pro Glu Pro Gln<br>                165                 170                175 | 576 |
| aac ccc tat cct ctg cca aac acc cca cca tcc ctc tat cca gac tgg<br>Asn Pro Tyr Pro Leu Pro Asn Thr Pro Pro Ser Leu Tyr Pro Asp Trp<br>            180                 185                190 | 624 |
| tac gtc aat tgc cct aca aag agt cta ccg ggg tac aaa ttc ccc aga<br>Tyr Val Asn Cys Pro Thr Lys Ser Leu Pro Gly Tyr Lys Phe Pro Arg<br>            195                 200                205 | 672 |
| gga ttc ctg ttc ggc tgg gct aca gct gcg caa cag tgg gaa ggg gct<br>Gly Phe Leu Phe Gly Trp Ala Thr Ala Ala Gln Gln Trp Glu Gly Ala<br>210             215                 220 | 720 |
| gtc aag gcg gat ggt aag ggt cct agt atc tgg gac tgg gca agt aga<br>Val Lys Ala Asp Gly Lys Gly Pro Ser Ile Trp Asp Trp Ala Ser Arg<br>225             230                 235                240 | 768 |
| tac ccc ggc ttc atc gcg gac aac act act tct gat gtg gga gat ctg<br>Tyr Pro Gly Phe Ile Ala Asp Asn Thr Thr Ser Asp Val Gly Asp Leu<br>                245                 250                255 | 816 |
| gga tat tac cta tac aaa gaa gat atg gca cgc ctc gct gcg ttg gga<br>Gly Tyr Tyr Leu Tyr Lys Glu Asp Met Ala Arg Leu Ala Ala Leu Gly<br>            260                 265                270 | 864 |
| gga aac gtc tac tct ttc tcc atc ttc tgg act cgt atc ctc ccc ttt<br>Gly Asn Val Tyr Ser Phe Ser Ile Phe Trp Thr Arg Ile Leu Pro Phe<br>            275                 280                285 | 912 |
| gcg gtc caa gga tcc ccc gtg aac caa aag gga gta gac ttt tat cgg<br>Ala Val Gln Gly Ser Pro Val Asn Gln Lys Gly Val Asp Phe Tyr Arg<br>            290                 295                300 | 960 |

```
gac ttg atc gat tat tgc tgg agt ttg ggt atc gag cct gtc gtg aca    1008
Asp Leu Ile Asp Tyr Cys Trp Ser Leu Gly Ile Glu Pro Val Val Thr
305                 310                 315                 320 ctg ttc cac tgg gat aca cct tta gcg gtg caa ctg ctc tat gga gga    1056
Leu Phe His Trp Asp Thr Pro Leu Ala Val Gln Leu Leu Tyr Gly Gly
                325                 330                 335 ttc gca agt gac aag atc att gat gat tat gtc aat tat gcc gaa acg    1104
Phe Ala Ser Asp Lys Ile Ile Asp Asp Tyr Val Asn Tyr Ala Glu Thr
            340                 345                 350 gtg ttc act gcc tat aat ggc tcg gtt cac aaa tgg atc acc ttc aac    1152
Val Phe Thr Ala Tyr Asn Gly Ser Val His Lys Trp Ile Thr Phe Asn
        355                 360                 365 gaa cca gta gta ttc tgc agc cag atg gct tct cct gtg aat tca aca    1200
Glu Pro Val Val Phe Cys Ser Gln Met Ala Ser Pro Val Asn Ser Thr
    370                 375                 380 ctg ccc gaa ggg ttg aac agc aca aca tac cca tac aca tgt agc tac    1248
Leu Pro Glu Gly Leu Asn Ser Thr Thr Tyr Pro Tyr Thr Cys Ser Tyr
385                 390                 395                 400 cat ctc acc ctg gct cac gcc aag acc gtc caa cga ttc aga gag ctc    1296
His Leu Thr Leu Ala His Ala Lys Thr Val Gln Arg Phe Arg Glu Leu
                405                 410                 415 aac atc cag gga gag att gcg ctc aag tcg gac aac ttt aat ggt atc    1344
Asn Ile Gln Gly Glu Ile Ala Leu Lys Ser Asp Asn Phe Asn Gly Ile
            420                 425                 430 cct tgg agg gaa ggg aat ccc gac gat gaa gaa gcc gtt gct agg cat    1392
Pro Trp Arg Glu Gly Asn Pro Asp Asp Glu Glu Ala Val Ala Arg His
        435                 440                 445 tct gca tac cag att ggc atc ttt gcg gaa ccg ata tac aac act ggc    1440
Ser Ala Tyr Gln Ile Gly Ile Phe Ala Glu Pro Ile Tyr Asn Thr Gly
    450                 455                 460 gac tgg cca gaa ctg atc aag aac gat ctt gga ccc gac atc ttg ccc    1488
Asp Trp Pro Glu Leu Ile Lys Asn Asp Leu Gly Pro Asp Ile Leu Pro
465                 470                 475                 480 cga ttc acc gat gag cag atc cag atg atc aag ggt act gcc gac ttc    1536
Arg Phe Thr Asp Glu Gln Ile Gln Met Ile Lys Gly Thr Ala Asp Phe
                485                 490                 495 ttt gcc att gat ggg tat cga gat ggc tgg gtc act gcc cca cct gct    1584
Phe Ala Ile Asp Gly Tyr Arg Asp Gly Trp Val Thr Ala Pro Pro Ala
            500                 505                 510 gga gtg cag gct tgc gtg gcc aat atc agt gat ccc ctc tgg cct gtg    1632
Gly Val Gln Ala Cys Val Ala Asn Ile Ser Asp Pro Leu Trp Pro Val
        515                 520                 525 tgc aat caa gtc aac ttc tac gac tct tct ccc gca ggt tgg gga atc    1680
Cys Asn Gln Val Asn Phe Tyr Asp Ser Ser Pro Ala Gly Trp Gly Ile
    530                 535                 540 gga gcg ttt ggt aat tgg cct acc act ccc tgg ctg caa aac act tgg    1728
Gly Ala Phe Gly Asn Trp Pro Thr Thr Pro Trp Leu Gln Asn Thr Trp
545                 550                 555                 560 caa ttt gtc cgg cca ttt ttg aaa gaa ttg act cag cag tac ccc acc    1776
Gln Phe Val Arg Pro Phe Leu Lys Glu Leu Thr Gln Gln Tyr Pro Thr
                565                 570                 575 aaa ggt ggt atc tac ctc tcg gaa ttt ggc ttc tcc gaa cca ttc gag    1824
Lys Gly Gly Ile Tyr Leu Ser Glu Phe Gly Phe Ser Glu Pro Phe Glu
            580                 585                 590 aac gag aaa aac ttc atc tac cag atc acg act gac ccg gga cgg gtg    1872
Asn Glu Lys Asn Phe Ile Tyr Gln Ile Thr Thr Asp Pro Gly Arg Val
        595                 600                 605 gca tac ttt aac agt tac ctc ggt gaa gtg ctc ttg gcg atc aac gag    1920
Ala Tyr Phe Asn Ser Tyr Leu Gly Glu Val Leu Leu Ala Ile Asn Glu
```

```
                  610                  615                  620
gat gaa aca gat gtg aga ggg act ttt gga tgg agt ctt ttg gac aac    1968
Asp Glu Thr Asp Val Arg Gly Thr Phe Gly Trp Ser Leu Leu Asp Asn
625                 630                 635                 640 ttt gag tgg aac tcg ggg ttg tcg act cgg ttc ggt gtc caa tat gtc    2016
Phe Glu Trp Asn Ser Gly Leu Ser Thr Arg Phe Gly Val Gln Tyr Val
                645                 650                 655 gat tac aac agt cct acg ctc gaa agg acg ttc aag cgc tct gcg atc    2064
Asp Tyr Asn Ser Pro Thr Leu Glu Arg Thr Phe Lys Arg Ser Ala Ile
            660                 665                 670 gag atg agc cag ttc tgg aac act cat cgt tgc gag gac tag            2106
Glu Met Ser Gln Phe Trp Asn Thr His Arg Cys Glu Asp
        675                 680                 685

<210> SEQ ID NO 8
<211> LENGTH: 701
<212> TYPE: PRT
<213> ORGANISM: Sirobasidium magnum

<400> SEQUENCE: 8

Met Phe Lys Leu Thr Ser Val Leu Leu Leu Gly Ala Ala Gln Ala
    -15                 -10                 -5                  -1

Ala Val Leu Asn Pro Arg Gln Ala Gly Ser Gly Asn Ser Thr Ala Ser
1               5                   10                  15

Gly Ser Ile Ala Gly Asp Ser Thr Arg Pro Ala Thr Thr Ser Ser Val
            20                  25                  30

Val Ser Pro Ser Ala Ala Arg Asn Ser Thr Ala Ala Thr Gly Asn
        35                  40                  45

Ala Ser Arg Asn Ala Thr Ala Thr Gly Thr Ala Val Ala Thr Ala Thr
    50                  55                  60

Gly Gly Val Thr Ala Ala Thr Ser Thr Gly Met Ala Val Thr Ser Pro
65                  70                  75                  80

Ala Gln Gly Ala Gly Thr Gly Val Gly Thr Ala Ala Ala Thr Thr
        85                  90                  95

Thr Thr Ala Thr Pro Ser Gln Ser Asp Phe Asp Asn Trp Val Leu Thr
                100                 105                 110

Ser Gly Leu Pro Thr Ile Thr Thr Ser Leu Ile Ser Thr Asn Pro Asp
            115                 120                 125

Ala Ile Thr Pro Thr Ala Ser Thr Ser Gly Pro Lys Pro Thr Val Thr
        130                 135                 140

Phe Ser Ser Tyr Ser Asp Gln Glu Leu Glu Asn Leu Trp Asp Asp Phe
145                 150                 155                 160

Val Gly Gln Val Gln Gln Pro Pro Phe Ser Tyr Val Pro Glu Pro Gln
                165                 170                 175

Asn Pro Tyr Pro Leu Pro Asn Thr Pro Pro Ser Leu Tyr Pro Asp Trp
            180                 185                 190

Tyr Val Asn Cys Pro Thr Lys Ser Leu Pro Gly Tyr Lys Phe Pro Arg
        195                 200                 205

Gly Phe Leu Phe Gly Trp Ala Thr Ala Ala Gln Gln Trp Glu Gly Ala
    210                 215                 220

Val Lys Ala Asp Gly Lys Gly Pro Ser Ile Trp Asp Trp Ala Ser Arg
225                 230                 235                 240

Tyr Pro Gly Phe Ile Ala Asp Asn Thr Thr Ser Asp Val Gly Asp Leu
                245                 250                 255

Gly Tyr Tyr Leu Tyr Lys Glu Asp Met Ala Arg Leu Ala Ala Leu Gly
            260                 265                 270
```

Gly Asn Val Tyr Ser Phe Ser Ile Phe Trp Thr Arg Ile Leu Pro Phe
            275                 280                 285

Ala Val Gln Gly Ser Pro Val Asn Gln Lys Gly Val Asp Phe Tyr Arg
    290                 295                 300

Asp Leu Ile Asp Tyr Cys Trp Ser Leu Gly Ile Glu Pro Val Val Thr
305                 310                 315                 320

Leu Phe His Trp Asp Thr Pro Leu Ala Val Gln Leu Leu Tyr Gly Gly
                325                 330                 335

Phe Ala Ser Asp Lys Ile Ile Asp Asp Tyr Val Asn Tyr Ala Glu Thr
                340                 345                 350

Val Phe Thr Ala Tyr Asn Gly Ser Val His Lys Trp Ile Thr Phe Asn
            355                 360                 365

Glu Pro Val Val Phe Cys Ser Gln Met Ala Ser Pro Val Asn Ser Thr
        370                 375                 380

Leu Pro Glu Gly Leu Asn Ser Thr Thr Tyr Pro Tyr Thr Cys Ser Tyr
385                 390                 395                 400

His Leu Thr Leu Ala His Ala Lys Thr Val Gln Arg Phe Arg Glu Leu
                405                 410                 415

Asn Ile Gln Gly Glu Ile Ala Leu Lys Ser Asp Asn Phe Asn Gly Ile
            420                 425                 430

Pro Trp Arg Glu Gly Asn Pro Asp Asp Glu Ala Val Ala Arg His
        435                 440                 445

Ser Ala Tyr Gln Ile Gly Ile Phe Ala Glu Pro Ile Tyr Asn Thr Gly
    450                 455                 460

Asp Trp Pro Glu Leu Ile Lys Asn Asp Leu Gly Pro Asp Ile Leu Pro
465                 470                 475                 480

Arg Phe Thr Asp Glu Gln Ile Gln Met Ile Lys Gly Thr Ala Asp Phe
                485                 490                 495

Phe Ala Ile Asp Gly Tyr Arg Asp Gly Trp Val Thr Ala Pro Pro Ala
                500                 505                 510

Gly Val Gln Ala Cys Val Ala Asn Ile Ser Asp Pro Leu Trp Pro Val
        515                 520                 525

Cys Asn Gln Val Asn Phe Tyr Asp Ser Ser Pro Ala Gly Trp Gly Ile
530                 535                 540

Gly Ala Phe Gly Asn Trp Pro Thr Thr Pro Trp Leu Gln Asn Thr Trp
545                 550                 555                 560

Gln Phe Val Arg Pro Phe Leu Lys Glu Leu Thr Gln Gln Tyr Pro Thr
                565                 570                 575

Lys Gly Gly Ile Tyr Leu Ser Glu Phe Gly Phe Ser Glu Pro Phe Glu
                580                 585                 590

Asn Glu Lys Asn Phe Ile Tyr Gln Ile Thr Thr Asp Pro Gly Arg Val
            595                 600                 605

Ala Tyr Phe Asn Ser Tyr Leu Gly Glu Val Leu Leu Ala Ile Asn Glu
        610                 615                 620

Asp Glu Thr Asp Val Arg Gly Thr Phe Gly Trp Ser Leu Leu Asp Asn
625                 630                 635                 640

Phe Glu Trp Asn Ser Gly Leu Ser Thr Arg Phe Gly Val Gln Tyr Val
                645                 650                 655

Asp Tyr Asn Ser Pro Thr Leu Glu Arg Thr Phe Lys Arg Ser Ala Ile
                660                 665                 670

Glu Met Ser Gln Phe Trp Asn Thr His Arg Cys Glu Asp
            675                 680                 685

<210> SEQ ID NO 9
<211> LENGTH: 2121
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(2121)
<220> FEATURE:
<221> NAME/KEY: sig_peptide
<222> LOCATION: (1)..(63)
<220> FEATURE:
<221> NAME/KEY: mat_peptide
<222> LOCATION: (64)..(2118)

<400> SEQUENCE: 9

| | | | | | | | | | | | | | | | | |
|---|---|---|---|---|---|---|---|---|---|---|---|---|---|---|---|---|
| atg | atg | gtc | gcg | tgg | tgg | tct | cta | ttt | ctg | tac | ggc | ctt | cag | gtc | gcg | 48 |
| Met | Met | Val | Ala | Trp | Trp | Ser | Leu | Phe | Leu | Tyr | Gly | Leu | Gln | Val | Ala | |
| | -20 | | | | -15 | | | | | -10 | | | | | | |
| gca | cct | gct | ttg | gct | gct | gtt | cta | aac | cct | cgt | caa | gct | ggc | agc | ggt | 96 |
| Ala | Pro | Ala | Leu | Ala | Ala | Val | Leu | Asn | Pro | Arg | Gln | Ala | Gly | Ser | Gly | |
| -5 | | | | -1 | 1 | | | | 5 | | | | | 10 | | |
| aat | tcc | act | gcc | agc | ggc | tcg | ata | gcc | ggc | gat | tcc | act | aga | cca | gcc | 144 |
| Asn | Ser | Thr | Ala | Ser | Gly | Ser | Ile | Ala | Gly | Asp | Ser | Thr | Arg | Pro | Ala | |
| | | | 15 | | | | | 20 | | | | | 25 | | | |
| acg | aca | tcc | tcg | gtc | gtc | tca | ccc | tct | gca | gcc | aga | aac | tcc | act | gcc | 192 |
| Thr | Thr | Ser | Ser | Val | Val | Ser | Pro | Ser | Ala | Ala | Arg | Asn | Ser | Thr | Ala | |
| | | 30 | | | | | 35 | | | | | 40 | | | | |
| gca | gct | act | ggt | aat | gct | tct | cgc | aat | gct | act | gcg | aca | ggt | act | gcc | 240 |
| Ala | Ala | Thr | Gly | Asn | Ala | Ser | Arg | Asn | Ala | Thr | Ala | Thr | Gly | Thr | Ala | |
| | 45 | | | | | 50 | | | | | 55 | | | | | |
| gtc | gct | aca | gcc | act | ggc | ggg | gtt | aca | gca | gcc | acg | tcc | act | gga | atg | 288 |
| Val | Ala | Thr | Ala | Thr | Gly | Gly | Val | Thr | Ala | Ala | Thr | Ser | Thr | Gly | Met | |
| 60 | | | | | 65 | | | | | 70 | | | | | 75 | |
| gcg | gtg | act | tcc | cct | gcc | cag | gga | gcc | ggt | acc | gga | gtc | ggt | acc | gca | 336 |
| Ala | Val | Thr | Ser | Pro | Ala | Gln | Gly | Ala | Gly | Thr | Gly | Val | Gly | Thr | Ala | |
| | | | 80 | | | | | 85 | | | | | 90 | | | |
| gcc | gct | gct | acg | acg | act | acc | gcc | acg | cct | agc | caa | tcc | gac | ttt | gat | 384 |
| Ala | Ala | Ala | Thr | Thr | Thr | Thr | Ala | Thr | Pro | Ser | Gln | Ser | Asp | Phe | Asp | |
| | | 95 | | | | | 100 | | | | | 105 | | | | |
| aat | tgg | gtc | ctc | acc | agt | gga | ttg | cct | acc | atc | acc | act | tca | ttg | atc | 432 |
| Asn | Trp | Val | Leu | Thr | Ser | Gly | Leu | Pro | Thr | Ile | Thr | Thr | Ser | Leu | Ile | |
| | 110 | | | | | 115 | | | | | 120 | | | | | |
| agt | acc | aat | ccc | gat | gcc | att | act | ccg | act | gcc | agt | act | tca | gga | ccg | 480 |
| Ser | Thr | Asn | Pro | Asp | Ala | Ile | Thr | Pro | Thr | Ala | Ser | Thr | Ser | Gly | Pro | |
| 125 | | | | | 130 | | | | | 135 | | | | | | |
| aag | cct | acg | gtc | acg | ttc | agc | tcg | tac | tcg | gac | caa | gag | ctg | gag | aat | 528 |
| Lys | Pro | Thr | Val | Thr | Phe | Ser | Ser | Tyr | Ser | Asp | Gln | Glu | Leu | Glu | Asn | |
| 140 | | | | | 145 | | | | | 150 | | | | | 155 | |
| ctc | tgg | gac | gac | ttt | gtg | gga | caa | gta | caa | caa | cct | cca | ttc | agc | tat | 576 |
| Leu | Trp | Asp | Asp | Phe | Val | Gly | Gln | Val | Gln | Gln | Pro | Pro | Phe | Ser | Tyr | |
| | | | | 160 | | | | | 165 | | | | | 170 | | |
| gtt | cca | gaa | ccc | caa | aac | ccc | tat | cct | ctg | cca | aac | acc | cca | cca | tcc | 624 |
| Val | Pro | Glu | Pro | Gln | Asn | Pro | Tyr | Pro | Leu | Pro | Asn | Thr | Pro | Pro | Ser | |
| | | | 175 | | | | | 180 | | | | | 185 | | | |
| ctc | tat | cca | gac | tgg | tac | gtc | aat | tgc | cct | aca | aag | agt | cta | ccg | ggg | 672 |
| Leu | Tyr | Pro | Asp | Trp | Tyr | Val | Asn | Cys | Pro | Thr | Lys | Ser | Leu | Pro | Gly | |
| | | 190 | | | | | 195 | | | | | 200 | | | | |
| tac | aaa | ttc | ccc | aga | gga | ttc | ctg | ttc | ggc | tgg | gct | aca | gct | gcg | caa | 720 |
| Tyr | Lys | Phe | Pro | Arg | Gly | Phe | Leu | Phe | Gly | Trp | Ala | Thr | Ala | Ala | Gln | |
| | 205 | | | | | 210 | | | | | 215 | | | | | |

-continued

| | |
|---|---|
| cag tgg gaa ggg gct gtc aag gcg gat ggt aag ggt cct agt atc tgg<br>Gln Trp Glu Gly Ala Val Lys Ala Asp Gly Lys Gly Pro Ser Ile Trp<br>220                        225                      230                       235 | 768 |
| gac tgg gca agt aga tac ccc ggc ttc atc gcg gac aac act act tct<br>Asp Trp Ala Ser Arg Tyr Pro Gly Phe Ile Ala Asp Asn Thr Thr Ser<br>240                      245                        250 | 816 |
| gat gtg gga gat ctg gga tat tac cta tac aaa gaa gat atg gca cgc<br>Asp Val Gly Asp Leu Gly Tyr Tyr Leu Tyr Lys Glu Asp Met Ala Arg<br>                255                       260                     265 | 864 |
| ctc gct gcg ttg gga gga aac gtc tac tct ttc tcc atc ttc tgg act<br>Leu Ala Ala Leu Gly Gly Asn Val Tyr Ser Phe Ser Ile Phe Trp Thr<br>270                      275                      280 | 912 |
| cgt atc ctc ccc ttt gcg gtc caa gga tcc ccc gtg aac caa aag gga<br>Arg Ile Leu Pro Phe Ala Val Gln Gly Ser Pro Val Asn Gln Lys Gly<br>    285                       290                     295 | 960 |
| gta gac ttt tat cgg gac ttg atc gat tat tgc tgg agt ttg ggt atc<br>Val Asp Phe Tyr Arg Asp Leu Ile Asp Tyr Cys Trp Ser Leu Gly Ile<br>300                      305                      310                     315 | 1008 |
| gag cct gtc gtg aca ctg ttc cac tgg gat aca cct tta gcg gtg caa<br>Glu Pro Val Val Thr Leu Phe His Trp Asp Thr Pro Leu Ala Val Gln<br>                320                       325                     330 | 1056 |
| ctg ctc tat gga gga ttc gca agt gac aag atc att gat gat tat gtc<br>Leu Leu Tyr Gly Gly Phe Ala Ser Asp Lys Ile Ile Asp Asp Tyr Val<br>            335                       340                     345 | 1104 |
| aat tat gcc gaa acg gtg ttc act gcc tat aat ggc tcg gtt cac aaa<br>Asn Tyr Ala Glu Thr Val Phe Thr Ala Tyr Asn Gly Ser Val His Lys<br>                350                       355                     360 | 1152 |
| tgg atc acc ttc aac gaa cca gta gta ttc tgc agc cag atg gct tct<br>Trp Ile Thr Phe Asn Glu Pro Val Val Phe Cys Ser Gln Met Ala Ser<br>365                      370                      375 | 1200 |
| cct gtg aat tca aca ctg ccc gaa ggg ttg aac agc acc aca tac cca<br>Pro Val Asn Ser Thr Leu Pro Glu Gly Leu Asn Ser Thr Thr Tyr Pro<br>380                      385                      390                     395 | 1248 |
| tac aca tgt agc tac cat ctc acc ctg gct cac gcc aag acc gtc caa<br>Tyr Thr Cys Ser Tyr His Leu Thr Leu Ala His Ala Lys Thr Val Gln<br>                400                       405                     410 | 1296 |
| cga ttc aga gag ctc aac atc cag gga gag att gcg ctc aag tcg gac<br>Arg Phe Arg Glu Leu Asn Ile Gln Gly Glu Ile Ala Leu Lys Ser Asp<br>            415                       420                     425 | 1344 |
| aac ttt aat ggt atc cct tgg agg gaa ggg aat ccc gac gat gaa gaa<br>Asn Phe Asn Gly Ile Pro Trp Arg Glu Gly Asn Pro Asp Asp Glu Glu<br>                430                       435                     440 | 1392 |
| gcc gtt gct agg cat tct gca tac cag att ggc atc ttt gcg gaa ccg<br>Ala Val Ala Arg His Ser Ala Tyr Gln Ile Gly Ile Phe Ala Glu Pro<br>445                      450                      455 | 1440 |
| ata tac aac act ggc gac tgg cca gaa ctg atc aag aac gat ctt gga<br>Ile Tyr Asn Thr Gly Asp Trp Pro Glu Leu Ile Lys Asn Asp Leu Gly<br>460                      465                      470                     475 | 1488 |
| ccc gac atc ttg ccc cga ttc acc gat gag cag atc cag atg atc aag<br>Pro Asp Ile Leu Pro Arg Phe Thr Asp Glu Gln Ile Gln Met Ile Lys<br>                480                       485                     490 | 1536 |
| ggt act gcc gac ttc ttt gcc att gat ggg tat cga gat ggc tgg gtc<br>Gly Thr Ala Asp Phe Phe Ala Ile Asp Gly Tyr Arg Asp Gly Trp Val<br>            495                       500                     505 | 1584 |
| act gcc cca cct gct gga gtg cag gct tgc gtg gcc aat atc agt gat<br>Thr Ala Pro Pro Ala Gly Val Gln Ala Cys Val Ala Asn Ile Ser Asp<br>                510                       515                     520 | 1632 |
| ccc ctc tgg cct gtg tgc aat caa gtc aac ttc tac gac tct tct ccc<br>Pro Leu Trp Pro Val Cys Asn Gln Val Asn Phe Tyr Asp Ser Ser Pro<br>525                      530                      535 | 1680 |

```
gca ggt tgg gga atc gga gcg ttt ggt aat tgg cct acc act ccc tgg    1728
Ala Gly Trp Gly Ile Gly Ala Phe Gly Asn Trp Pro Thr Thr Pro Trp
540             545                 550                 555 ctg caa aac act tgg caa ttt gtc cgg cca ttt ttg aaa gaa ttg act    1776
Leu Gln Asn Thr Trp Gln Phe Val Arg Pro Phe Leu Lys Glu Leu Thr
                560                 565                 570 cag cag tac ccc acc aaa ggt ggt atc tac ctc tcg gaa ttt ggc ttc    1824
Gln Gln Tyr Pro Thr Lys Gly Gly Ile Tyr Leu Ser Glu Phe Gly Phe
            575                 580                 585 tcc gaa cca ttc gag aac gag aaa aac ttc atc tac cag atc acg act    1872
Ser Glu Pro Phe Glu Asn Glu Lys Asn Phe Ile Tyr Gln Ile Thr Thr
        590                 595                 600 gac ccg gga cgg gtg gca tac ttt aac agt tac ctc ggt gaa gtg ctc    1920
Asp Pro Gly Arg Val Ala Tyr Phe Asn Ser Tyr Leu Gly Glu Val Leu
    605                 610                 615 ttg gcg atc aac gag gat gaa aca gat gtg aga ggg act ttt gga tgg    1968
Leu Ala Ile Asn Glu Asp Glu Thr Asp Val Arg Gly Thr Phe Gly Trp
620                 625                 630                 635 agt ctt ttg gac aac ttt gag tgg aac tcg ggg ttg tcg act cgg ttc    2016
Ser Leu Leu Asp Asn Phe Glu Trp Asn Ser Gly Leu Ser Thr Arg Phe
                640                 645                 650 ggt gtc caa tat gtc gat tac aac agt cct acg ctc gaa agg acg ttc    2064
Gly Val Gln Tyr Val Asp Tyr Asn Ser Pro Thr Leu Glu Arg Thr Phe
            655                 660                 665 aag cgc tct gcg atc gag atg agc cag ttc tgg aac act cat cgt tgc    2112
Lys Arg Ser Ala Ile Glu Met Ser Gln Phe Trp Asn Thr His Arg Cys
        670                 675                 680 gag gac tag                                                        2121
Glu Asp
    685

<210> SEQ ID NO 10
<211> LENGTH: 706
<212> TYPE: PRT
<213> ORGANISM: Artificial Sequence
<220> FEATURE:
<223> OTHER INFORMATION: Synthetic Construct

<400> SEQUENCE: 10

Met Met Val Ala Trp Trp Ser Leu Phe Leu Tyr Gly Leu Gln Val Ala
    -20             -15             -10

Ala Pro Ala Leu Ala Ala Val Leu Asn Pro Arg Gln Ala Gly Ser Gly
-5              -1  1               5                   10

Asn Ser Thr Ala Ser Gly Ser Ile Ala Gly Asp Ser Thr Arg Pro Ala
            15                  20                  25

Thr Thr Ser Ser Val Val Ser Pro Ala Ala Arg Asn Ser Thr Ala
            30                  35                  40

Ala Ala Thr Gly Asn Ala Ser Arg Asn Ala Thr Ala Thr Gly Thr Ala
    45                  50                  55

Val Ala Thr Ala Thr Gly Gly Val Thr Ala Ala Thr Ser Thr Gly Met
60                  65                  70                  75

Ala Val Thr Ser Pro Ala Gln Gly Ala Gly Thr Gly Val Gly Thr Ala
                80                  85                  90

Ala Ala Ala Thr Thr Thr Ala Thr Pro Ser Gln Ser Asp Phe Asp
            95                  100                 105

Asn Trp Val Leu Thr Ser Gly Leu Pro Thr Ile Thr Thr Ser Leu Ile
        110                 115                 120

Ser Thr Asn Pro Asp Ala Ile Thr Pro Thr Ala Ser Thr Ser Gly Pro
```

```
            125                 130                 135
Lys Pro Thr Val Thr Phe Ser Ser Tyr Ser Asp Gln Glu Leu Glu Asn
140                 145                 150                 155

Leu Trp Asp Asp Phe Val Gly Gln Val Gln Gln Pro Phe Ser Tyr
            160                 165                 170

Val Pro Glu Pro Gln Asn Pro Tyr Pro Leu Pro Asn Thr Pro Pro Ser
            175                 180                 185

Leu Tyr Pro Asp Trp Tyr Val Asn Cys Pro Thr Lys Ser Leu Pro Gly
            190                 195                 200

Tyr Lys Phe Pro Arg Gly Phe Leu Phe Gly Trp Ala Thr Ala Ala Gln
            205                 210                 215

Gln Trp Glu Gly Ala Val Lys Ala Asp Gly Lys Gly Pro Ser Ile Trp
220                 225                 230                 235

Asp Trp Ala Ser Arg Tyr Pro Gly Phe Ile Ala Asp Asn Thr Thr Ser
            240                 245                 250

Asp Val Gly Asp Leu Gly Tyr Tyr Leu Tyr Lys Glu Asp Met Ala Arg
            255                 260                 265

Leu Ala Ala Leu Gly Gly Asn Val Tyr Ser Phe Ser Ile Phe Trp Thr
            270                 275                 280

Arg Ile Leu Pro Phe Ala Val Gln Gly Ser Pro Val Asn Gln Lys Gly
            285                 290                 295

Val Asp Phe Tyr Arg Asp Leu Ile Asp Tyr Cys Trp Ser Leu Gly Ile
300                 305                 310                 315

Glu Pro Val Val Thr Leu Phe His Trp Asp Thr Pro Leu Ala Val Gln
            320                 325                 330

Leu Leu Tyr Gly Gly Phe Ala Ser Asp Lys Ile Ile Asp Asp Tyr Val
            335                 340                 345

Asn Tyr Ala Glu Thr Val Phe Thr Ala Tyr Asn Gly Ser Val His Lys
            350                 355                 360

Trp Ile Thr Phe Asn Glu Pro Val Val Phe Cys Ser Gln Met Ala Ser
            365                 370                 375

Pro Val Asn Ser Thr Leu Pro Glu Gly Leu Asn Ser Thr Thr Tyr Pro
380                 385                 390                 395

Tyr Thr Cys Ser Tyr His Leu Thr Leu Ala His Ala Lys Thr Val Gln
            400                 405                 410

Arg Phe Arg Glu Leu Asn Ile Gln Gly Glu Ile Ala Leu Lys Ser Asp
            415                 420                 425

Asn Phe Asn Gly Ile Pro Trp Arg Glu Gly Asn Pro Asp Asp Glu Glu
            430                 435                 440

Ala Val Ala Arg His Ser Ala Tyr Gln Ile Gly Ile Phe Ala Glu Pro
            445                 450                 455

Ile Tyr Asn Thr Gly Asp Trp Pro Glu Leu Ile Lys Asn Asp Leu Gly
460                 465                 470                 475

Pro Asp Ile Leu Pro Arg Phe Thr Asp Glu Gln Ile Gln Met Ile Lys
            480                 485                 490

Gly Thr Ala Asp Phe Phe Ala Ile Asp Gly Tyr Arg Asp Gly Trp Val
            495                 500                 505

Thr Ala Pro Pro Ala Gly Val Gln Ala Cys Val Ala Asn Ile Ser Asp
            510                 515                 520

Pro Leu Trp Pro Val Cys Asn Gln Val Asn Phe Tyr Asp Ser Ser Pro
            525                 530                 535

Ala Gly Trp Gly Ile Gly Ala Phe Gly Asn Trp Pro Thr Thr Pro Trp
540                 545                 550                 555
```

```
Leu Gln Asn Thr Trp Gln Phe Val Arg Pro Phe Leu Lys Glu Leu Thr
                560                 565                 570

Gln Gln Tyr Pro Thr Lys Gly Gly Ile Tyr Leu Ser Glu Phe Gly Phe
            575                 580                 585

Ser Glu Pro Phe Glu Asn Glu Lys Asn Phe Ile Tyr Gln Ile Thr Thr
            590                 595                 600

Asp Pro Gly Arg Val Ala Tyr Phe Asn Ser Tyr Leu Gly Glu Val Leu
    605                 610                 615

Leu Ala Ile Asn Glu Asp Glu Thr Asp Val Arg Gly Thr Phe Gly Trp
620                 625                 630                 635

Ser Leu Leu Asp Asn Phe Glu Trp Asn Ser Gly Leu Ser Thr Arg Phe
                640                 645                 650

Gly Val Gln Tyr Val Asp Tyr Asn Ser Pro Thr Leu Gly Arg Thr Phe
            655                 660                 665

Lys Arg Ser Ala Ile Glu Met Ser Gln Phe Trp Asn Thr His Arg Cys
            670                 675                 680

Glu Asp
    685

<210> SEQ ID NO 11
<211> LENGTH: 2121
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(2121)
<220> FEATURE:
<221> NAME/KEY: sig_peptide
<222> LOCATION: (1)..(63)
<220> FEATURE:
<221> NAME/KEY: mat_peptide
<222> LOCATION: (64)..(2118)

<400> SEQUENCE: 11 atg atg gtc gcg tgg tgg tct cta ttt ctg tac ggc ctt cag gtc gcg      48
Met Met Val Ala Trp Trp Ser Leu Phe Leu Tyr Gly Leu Gln Val Ala
    -20                 -15                 -10 gca cct gct ttg gct gcg gtg ctc aac cca cgc cag gct ggc tct gga      96
Ala Pro Ala Leu Ala Ala Val Leu Asn Pro Arg Gln Ala Gly Ser Gly
 -5              -1  1               5                  10 aac tct act gcc tct ggg tcc att gct ggc gac tcg aca cgc ccg gct     144
Asn Ser Thr Ala Ser Gly Ser Ile Ala Gly Asp Ser Thr Arg Pro Ala
            15                  20                  25 acg acc tct tcg gtt gtc tcc cct tcc gca gcc cga aac tcc act gcc     192
Thr Thr Ser Ser Val Val Ser Pro Ser Ala Ala Arg Asn Ser Thr Ala
        30                  35                  40 gcc gcc acg ggt aat gct tcc cgc aac gct acg gcc acc gga aca gcc     240
Ala Ala Thr Gly Asn Ala Ser Arg Asn Ala Thr Ala Thr Gly Thr Ala
    45                  50                  55 gtt gcc act gcc acg ggc ggc gtt acg gcg gca acg tcc acg ggc atg     288
Val Ala Thr Ala Thr Gly Gly Val Thr Ala Ala Thr Ser Thr Gly Met
60                  65                  70                  75 gct gtt acg tct ccc gct cag ggt gcc gga acg ggt gtt ggc acc gcc     336
Ala Val Thr Ser Pro Ala Gln Gly Ala Gly Thr Gly Val Gly Thr Ala
                80                  85                  90 gca gcc gca aca aca acg acg gca acg ccc tct caa tcc gac ttc gac     384
Ala Ala Ala Thr Thr Thr Thr Ala Thr Pro Ser Gln Ser Asp Phe Asp
            95                  100                 105
```

-continued

| | | |
|---|---|---|
| aac tgg gtg ctc acg tcg ggg ctc ccc aca atc aca act agc ctg atc<br>Asn Trp Val Leu Thr Ser Gly Leu Pro Thr Ile Thr Thr Ser Leu Ile<br>110               115                    120 | | 432 |
| tcg aca aac cct gac gcc att acc cca acc gca tct acc tcg gga ccc<br>Ser Thr Asn Pro Asp Ala Ile Thr Pro Thr Ala Ser Thr Ser Gly Pro<br>125               130                   135 | | 480 |
| aaa cca acg gtt acc ttc tcc tcc tac tct gat cag gag ttg gag aat<br>Lys Pro Thr Val Thr Phe Ser Ser Tyr Ser Asp Gln Glu Leu Glu Asn<br>140                     145               150                155 | | 528 |
| ctg tgg gac gac ttt gtc ggg cag gtt cag cag cct ccg ttc tcg tat<br>Leu Trp Asp Asp Phe Val Gly Gln Val Gln Gln Pro Pro Phe Ser Tyr<br>                160               165                  170 | | 576 |
| gtt cca gaa ccc caa aac ccg tac cca ttg ccc aac acc cca ccg tct<br>Val Pro Glu Pro Gln Asn Pro Tyr Pro Leu Pro Asn Thr Pro Pro Ser<br>            175                   180               185 | | 624 |
| ctc tac ccc gac tgg tac gtc aat tgt ccc acc aag agc ttg cct ggt<br>Leu Tyr Pro Asp Trp Tyr Val Asn Cys Pro Thr Lys Ser Leu Pro Gly<br>            190                   195               200 | | 672 |
| tac aag ttc cct cga ggc ttc ctc ttc ggt tgg gcg acg gct gcg caa<br>Tyr Lys Phe Pro Arg Gly Phe Leu Phe Gly Trp Ala Thr Ala Ala Gln<br>205                    210                   215 | | 720 |
| cag tgg gag ggg gct gtg aaa gct gac ggc aaa gga cca tcc atc tgg<br>Gln Trp Glu Gly Ala Val Lys Ala Asp Gly Lys Gly Pro Ser Ile Trp<br>220                    225                   230               235 | | 768 |
| gac tgg gcc tcc cga tat ccg ggc ttc atc gcc gat aac acc aca tcg<br>Asp Trp Ala Ser Arg Tyr Pro Gly Phe Ile Ala Asp Asn Thr Thr Ser<br>                240               245                  250 | | 816 |
| gac gtg ggc gac ttg ggc tac tac ttg tac aag gag gat atg gct cgt<br>Asp Val Gly Asp Leu Gly Tyr Tyr Leu Tyr Lys Glu Asp Met Ala Arg<br>            255                   260               265 | | 864 |
| ctc gcc gcc ctc ggc ggc aat gtg tat tcc ttt tcc atc ttc tgg acg<br>Leu Ala Ala Leu Gly Gly Asn Val Tyr Ser Phe Ser Ile Phe Trp Thr<br>                270               275                280 | | 912 |
| cga att ctg ccg ttc gca gtg caa ggt tct ccg gtc aat cag aag ggt<br>Arg Ile Leu Pro Phe Ala Val Gln Gly Ser Pro Val Asn Gln Lys Gly<br>285                    290                   295 | | 960 |
| gtt gac ttc tac cgg gac ctg atc gat tac tgt tgg agc ctt ggt atc<br>Val Asp Phe Tyr Arg Asp Leu Ile Asp Tyr Cys Trp Ser Leu Gly Ile<br>300                    305                   310               315 | | 1008 |
| gaa ccg gtc gtc aca ttg ttc cac tgg gat act ccg ttg gca gtg caa<br>Glu Pro Val Val Thr Leu Phe His Trp Asp Thr Pro Leu Ala Val Gln<br>                320               325                330 | | 1056 |
| ctg ctc tat gga ggt ttc gcc tcg gac aag atc atc gac gac tac gtc<br>Leu Leu Tyr Gly Gly Phe Ala Ser Asp Lys Ile Ile Asp Asp Tyr Val<br>                335               340               345 | | 1104 |
| aac tac gcc gaa acc gtg ttc aca gcg tac aac ggt tcg gtc cat aag<br>Asn Tyr Ala Glu Thr Val Phe Thr Ala Tyr Asn Gly Ser Val His Lys<br>350                    355               360 | | 1152 |
| tgg atc acc ttc aac gag cca gtt gtg ttc tgt tcc caa atg gca tcg<br>Trp Ile Thr Phe Asn Glu Pro Val Val Phe Cys Ser Gln Met Ala Ser<br>365                    370               375 | | 1200 |
| cca gtg aat agc acg ctg cca gag ggg ttg aac tcg acc acc tac ccc<br>Pro Val Asn Ser Thr Leu Pro Glu Gly Leu Asn Ser Thr Thr Tyr Pro<br>380                    385               390               395 | | 1248 |
| tat acg tgc tcg tac cat ctg acc ctt gcg cac gcg aag acc gtg caa<br>Tyr Thr Cys Ser Tyr His Leu Thr Leu Ala His Ala Lys Thr Val Gln<br>                400               405               410 | | 1296 |
| cgg ttc cgt gag ctc aac atc cag ggg gag att gcc ttg aag agc gat<br>Arg Phe Arg Glu Leu Asn Ile Gln Gly Glu Ile Ala Leu Lys Ser Asp<br>            415                   420               425 | | 1344 |

-continued

```
aac ttc aac ggc att ccg tgg cgg gag gga aac cct gat gat gaa gag    1392
Asn Phe Asn Gly Ile Pro Trp Arg Glu Gly Asn Pro Asp Asp Glu Glu
        430                 435                 440 gct gtc gcc cga cat tct gcc tat cag atc gga atc ttc gca gaa cct    1440
Ala Val Ala Arg His Ser Ala Tyr Gln Ile Gly Ile Phe Ala Glu Pro
445                 450                 455 atc tac aac act ggt gat tgg ccg gag ctg atc aag aac gat ctg ggg    1488
Ile Tyr Asn Thr Gly Asp Trp Pro Glu Leu Ile Lys Asn Asp Leu Gly
460                 465                 470                 475 ccg gat atc ttg ccc cgc ttc act gat gaa cag atc cag atg atc aag    1536
Pro Asp Ile Leu Pro Arg Phe Thr Asp Glu Gln Ile Gln Met Ile Lys
                480                 485                 490 ggg acc gct gat ttc ttc gcg atc gat ggt tac cgt gac ggc tgg gtc    1584
Gly Thr Ala Asp Phe Phe Ala Ile Asp Gly Tyr Arg Asp Gly Trp Val
            495                 500                 505 aca gca cca cct gct ggt gtc caa gct tgc gtg gcg aac atc tct gat    1632
Thr Ala Pro Pro Ala Gly Val Gln Ala Cys Val Ala Asn Ile Ser Asp
        510                 515                 520 ccg ttg tgg ccc gtg tgt aac cag gtc aac ttc tac gat tcg agc ccg    1680
Pro Leu Trp Pro Val Cys Asn Gln Val Asn Phe Tyr Asp Ser Ser Pro
525                 530                 535 gcc ggt tgg gga att ggc gca ttt ggt aac tgg cca act act ccg tgg    1728
Ala Gly Trp Gly Ile Gly Ala Phe Gly Asn Trp Pro Thr Thr Pro Trp
540                 545                 550                 555 ctt cag aac aca tgg cag ttt gtc cgc ccg ttt ctc aag gag ctt act    1776
Leu Gln Asn Thr Trp Gln Phe Val Arg Pro Phe Leu Lys Glu Leu Thr
                560                 565                 570 cag caa tac cca acg aag ggg ggt atc tac ctc tcc gaa ttc ggt ttc    1824
Gln Gln Tyr Pro Thr Lys Gly Gly Ile Tyr Leu Ser Glu Phe Gly Phe
            575                 580                 585 tcg gag ccc ttt gag aac gaa aag aac ttc atc tac caa atc aca aca    1872
Ser Glu Pro Phe Glu Asn Glu Lys Asn Phe Ile Tyr Gln Ile Thr Thr
        590                 595                 600 gac ccc ggc cgg gtg gcc tac ttc aac agc tat ctg ggg gaa gtg ctc    1920
Asp Pro Gly Arg Val Ala Tyr Phe Asn Ser Tyr Leu Gly Glu Val Leu
605                 610                 615 ttg gcc atc aac gaa gat gag acg gac gtc cgc ggt act ttc gga tgg    1968
Leu Ala Ile Asn Glu Asp Glu Thr Asp Val Arg Gly Thr Phe Gly Trp
620                 625                 630                 635 tct ctt ctc gac aac ttc gag tgg aac tct gga ctg agc aca cga ttc    2016
Ser Leu Leu Asp Asn Phe Glu Trp Asn Ser Gly Leu Ser Thr Arg Phe
                640                 645                 650 ggg gtc cag tat gtg gac tac aac tcc cct acg ctt gaa cgg acc ttc    2064
Gly Val Gln Tyr Val Asp Tyr Asn Ser Pro Thr Leu Glu Arg Thr Phe
            655                 660                 665 aag cgc tct gcg atc gaa atg tcc cag ttc tgg aac acg cat cgt tgc    2112
Lys Arg Ser Ala Ile Glu Met Ser Gln Phe Trp Asn Thr His Arg Cys
        670                 675                 680 gag gac taa                                                         2121
Glu Asp
    685
```

<210> SEQ ID NO 12
<211> LENGTH: 706
<212> TYPE: PRT
<213> ORGANISM: Artificial Sequence
<220> FEATURE:
<223> OTHER INFORMATION: Synthetic Construct

<400> SEQUENCE: 12

```
Met Met Val Ala Trp Trp Ser Leu Phe Leu Tyr Gly Leu Gln Val Ala
    -20              -15               -10

Ala Pro Ala Leu Ala Ala Val Leu Asn Pro Arg Gln Ala Gly Ser Gly
 -5          -1   1           5                      10

Asn Ser Thr Ala Ser Gly Ser Ile Ala Gly Asp Ser Thr Arg Pro Ala
             15              20              25

Thr Thr Ser Ser Val Val Ser Pro Ser Ala Ala Arg Asn Ser Thr Ala
         30              35                  40

Ala Ala Thr Gly Asn Ala Ser Arg Asn Ala Thr Ala Thr Gly Thr Ala
         45              50              55

Val Ala Thr Ala Thr Gly Gly Val Thr Ala Ala Thr Ser Thr Gly Met
 60              65              70                      75

Ala Val Thr Ser Pro Ala Gln Gly Ala Gly Thr Gly Val Gly Thr Ala
             80              85                      90

Ala Ala Ala Thr Thr Thr Ala Thr Pro Ser Gln Ser Asp Phe Asp
             95          100             105

Asn Trp Val Leu Thr Ser Gly Leu Pro Thr Ile Thr Ser Leu Ile
         110             115             120

Ser Thr Asn Pro Asp Ala Ile Thr Pro Thr Ala Ser Thr Ser Gly Pro
125             130             135

Lys Pro Thr Val Thr Phe Ser Ser Tyr Ser Asp Gln Glu Leu Glu Asn
140             145             150             155

Leu Trp Asp Asp Phe Val Gly Gln Val Gln Gln Pro Pro Phe Ser Tyr
             160             165             170

Val Pro Glu Pro Gln Asn Pro Tyr Pro Leu Pro Asn Thr Pro Pro Ser
         175             180             185

Leu Tyr Pro Asp Trp Tyr Val Asn Cys Pro Thr Lys Ser Leu Pro Gly
         190             195             200

Tyr Lys Phe Pro Arg Gly Phe Leu Phe Gly Trp Ala Thr Ala Ala Gln
         205             210             215

Gln Trp Glu Gly Ala Val Lys Ala Asp Gly Lys Gly Pro Ser Ile Trp
220             225             230             235

Asp Trp Ala Ser Arg Tyr Pro Gly Phe Ile Ala Asp Asn Thr Thr Ser
             240             245             250

Asp Val Gly Asp Leu Gly Tyr Tyr Leu Tyr Lys Glu Asp Met Ala Arg
             255             260             265

Leu Ala Ala Leu Gly Gly Asn Val Tyr Ser Phe Ser Ile Phe Trp Thr
             270             275             280

Arg Ile Leu Pro Phe Ala Val Gln Gly Ser Pro Val Asn Gln Lys Gly
285             290             295

Val Asp Phe Tyr Arg Asp Leu Ile Asp Tyr Cys Trp Ser Leu Gly Ile
300             305             310             315

Glu Pro Val Val Thr Leu Phe His Trp Asp Thr Pro Leu Ala Val Gln
             320             325             330

Leu Leu Tyr Gly Gly Phe Ala Ser Asp Lys Ile Ile Asp Asp Tyr Val
             335             340             345

Asn Tyr Ala Glu Thr Val Phe Thr Ala Tyr Asn Gly Ser Val His Lys
             350             355             360

Trp Ile Thr Phe Asn Glu Pro Val Val Phe Cys Ser Gln Met Ala Ser
             365             370             375

Pro Val Asn Ser Thr Leu Pro Glu Gly Leu Asn Ser Thr Thr Tyr Pro
380             385             390             395

Tyr Thr Cys Ser Tyr His Leu Thr Leu Ala His Ala Lys Thr Val Gln
```

```
                    400             405             410
Arg Phe Arg Glu Leu Asn Ile Gln Gly Glu Ile Ala Leu Lys Ser Asp
            415                 420                 425

Asn Phe Asn Gly Ile Pro Trp Arg Glu Gly Asn Pro Asp Glu Glu
            430                 435             440

Ala Val Ala Arg His Ser Ala Tyr Gln Ile Gly Ile Phe Ala Glu Pro
445                 450                 455

Ile Tyr Asn Thr Gly Asp Trp Pro Glu Leu Ile Lys Asn Asp Leu Gly
460                 465                 470                 475

Pro Asp Ile Leu Pro Arg Phe Thr Asp Glu Gln Ile Gln Met Ile Lys
                480                 485                 490

Gly Thr Ala Asp Phe Phe Ala Ile Asp Gly Tyr Arg Asp Gly Trp Val
                495                 500                 505

Thr Ala Pro Pro Ala Gly Val Gln Ala Cys Val Ala Asn Ile Ser Asp
            510                 515                 520

Pro Leu Trp Pro Val Cys Asn Gln Val Asn Phe Tyr Asp Ser Ser Pro
            525                 530                 535

Ala Gly Trp Gly Ile Gly Ala Phe Gly Asn Trp Pro Thr Thr Pro Trp
540                 545                 550                 555

Leu Gln Asn Thr Trp Gln Phe Val Arg Pro Phe Leu Lys Glu Leu Thr
                560                 565                 570

Gln Gln Tyr Pro Thr Lys Gly Gly Ile Tyr Leu Ser Glu Phe Gly Phe
            575                 580                 585

Ser Glu Pro Phe Glu Asn Glu Lys Asn Phe Ile Tyr Gln Ile Thr Thr
            590                 595                 600

Asp Pro Gly Arg Val Ala Tyr Phe Asn Ser Tyr Leu Gly Glu Val Leu
            605                 610                 615

Leu Ala Ile Asn Glu Asp Glu Thr Asp Val Arg Gly Thr Phe Gly Trp
620                 625                 630                 635

Ser Leu Leu Asp Asn Phe Glu Trp Asn Ser Gly Leu Ser Thr Arg Phe
                640                 645                 650

Gly Val Gln Tyr Val Asp Tyr Asn Ser Pro Thr Leu Glu Arg Thr Phe
            655                 660                 665

Lys Arg Ser Ala Ile Glu Met Ser Gln Phe Trp Asn Thr His Arg Cys
            670                 675                 680

Glu Asp
    685

<210> SEQ ID NO 13
<211> LENGTH: 1803
<212> TYPE: DNA
<213> ORGANISM: Rodotorula minuta
<220> FEATURE:
<221> NAME/KEY: CDS
<222> LOCATION: (1)..(1803)
<220> FEATURE:
<221> NAME/KEY: sig_peptide
<222> LOCATION: (1)..(57)
<220> FEATURE:
<221> NAME/KEY: mat_peptide
<222> LOCATION: (58)..(1800)

<400> SEQUENCE: 13 atg gtc atc ctg cgc cac acg gta cta gcg gca gcg gtc gtc cag atc    48
Met Val Ile Leu Arg His Thr Val Leu Ala Ala Ala Val Val Gln Ile
            -15                 -10                 -5 gcc ctc ggg gct ccg cag ttt agc ccc aca gtc aat acg gaa ggt atc    96
Ala Leu Gly Ala Pro Gln Phe Ser Pro Thr Val Asn Thr Glu Gly Ile
```

```
         -1   1                   5                         10
att  cca  att  tcg  gag  cgc  cct  tcg  cct  aca  caa  tct  tcg  tcg  tcc  agc       144
Ile  Pro  Ile  Ser  Glu  Arg  Pro  Ser  Pro  Thr  Gln  Ser  Ser  Ser  Ser  Ser
     15                  20                       25 gga  ccc  gtg  att  cca  gct  ggc  tca  tat  gtc  tcc  gac  ttt  gat  gcc  agc       192
Gly  Pro  Val  Ile  Pro  Ala  Gly  Ser  Tyr  Val  Ser  Asp  Phe  Asp  Ala  Ser
30                       35                       40                       45 gga  ctt  gca  aac  tta  tgg  agc  caa  gtc  gaa  gta  gac  ata  cct  gtc  gag       240
Gly  Leu  Ala  Asn  Leu  Trp  Ser  Gln  Val  Glu  Val  Asp  Ile  Pro  Val  Glu
               50                       55                       60 tct  cca  agg  att  tct  gcc  gta  cct  cct  ctc  aac  aaa  acg  ttc  agt  gtt       288
Ser  Pro  Arg  Ile  Ser  Ala  Val  Pro  Pro  Leu  Asn  Lys  Thr  Phe  Ser  Val
               65                       70                       75 ccg  aaa  act  cca  gtc  ctg  ccc  aac  tcc  ctg  cag  gat  cac  ctt  cca  aaa       336
Pro  Lys  Thr  Pro  Val  Leu  Pro  Asn  Ser  Leu  Gln  Asp  His  Leu  Pro  Lys
     80                  85                       90 gat  gtc  aaa  gca  ccc  gaa  ggc  ttt  gca  tgg  ggc  gtg  gcc  tcc  gtt  gct       384
Asp  Val  Lys  Ala  Pro  Glu  Gly  Phe  Ala  Trp  Gly  Val  Ala  Ser  Val  Ala
          95                  100                     105 cag  cag  tac  gag  ggt  gcc  gtc  aaa  gca  gat  gga  cga  gga  cca  tct  cat       432
Gln  Gln  Tyr  Glu  Gly  Ala  Val  Lys  Ala  Asp  Gly  Arg  Gly  Pro  Ser  His
110                      115                     120                     125 tgg  gat  ttc  ctt  tgc  cat  aga  aac  cct  tcc  agc  tgc  aca  aac  tac  acc       480
Trp  Asp  Phe  Leu  Cys  His  Arg  Asn  Pro  Ser  Ser  Cys  Thr  Asn  Tyr  Thr
                    130                     135                     140 agt  gat  atc  act  gat  ctt  ggc  cgt  tac  tac  tat  aag  aat  gac  ttg  gca       528
Ser  Asp  Ile  Thr  Asp  Leu  Gly  Arg  Tyr  Tyr  Tyr  Lys  Asn  Asp  Leu  Ala
               145                     150                     155 cga  atg  gct  gcc  atg  ggt  ata  act  cac  tac  tca  ttt  tca  gtg  agc  tgg       576
Arg  Met  Ala  Ala  Met  Gly  Ile  Thr  His  Tyr  Ser  Phe  Ser  Val  Ser  Trp
          160                     165                     170 acc  aga  gtt  gtg  cca  ttc  ggc  aag  aag  ggc  agt  cca  gtc  agc  aac  gaa       624
Thr  Arg  Val  Val  Pro  Phe  Gly  Lys  Lys  Gly  Ser  Pro  Val  Ser  Asn  Glu
     175                     180                     185 ggc  ctc  gac  tat  tac  gaa  gat  atc  tgc  aag  acg  gct  ttg  agc  ttt  gga       672
Gly  Leu  Asp  Tyr  Tyr  Glu  Asp  Ile  Cys  Lys  Thr  Ala  Leu  Ser  Phe  Gly
190                      195                     200                     205 atc  aag  cct  gtc  att  act  tta  ttc  cac  tgg  gat  act  cct  gcc  aac  tta       720
Ile  Lys  Pro  Val  Ile  Thr  Leu  Phe  His  Trp  Asp  Thr  Pro  Ala  Asn  Leu
                    210                     215                     220 ctc  ttc  gaa  tat  gga  ggt  ttc  ctc  aac  ggg  aca  atc  gta  gat  gac  tac       768
Leu  Phe  Glu  Tyr  Gly  Gly  Phe  Leu  Asn  Gly  Thr  Ile  Val  Asp  Asp  Tyr
               225                     230                     235 tac  tat  tat  gca  gat  ata  gta  ttc  aga  aga  cta  ggc  aaa  tat  gcc  gaa       816
Tyr  Tyr  Tyr  Ala  Asp  Ile  Val  Phe  Arg  Arg  Leu  Gly  Lys  Tyr  Ala  Glu
          240                     245                     250 acc  ttc  ttc  acc  ttc  aat  gag  cct  cgt  gta  tac  tgc  agc  gag  tat  act       864
Thr  Phe  Phe  Thr  Phe  Asn  Glu  Pro  Arg  Val  Tyr  Cys  Ser  Glu  Tyr  Thr
     255                     260                     265 ggt  cct  ccg  ttc  gat  gcc  tat  tac  gaa  cgc  tat  ggg  ctg  aat  tct  agc       912
Gly  Pro  Pro  Phe  Asp  Ala  Tyr  Tyr  Glu  Arg  Tyr  Gly  Leu  Asn  Ser  Ser
270                      275                     280                     285 act  gca  cca  tat  ccc  tgc  tcg  tac  aat  ctg  ctc  cga  gcc  cat  ggt  gcc       960
Thr  Ala  Pro  Tyr  Pro  Cys  Ser  Tyr  Asn  Leu  Leu  Arg  Ala  His  Gly  Ala
                    290                     295                     300 gca  gtc  ggc  agg  tat  cgt  gcc  ctg  gtc  aaa  gaa  ggc  agc  atc  aaa  tct      1008
Ala  Val  Gly  Arg  Tyr  Arg  Ala  Leu  Val  Lys  Glu  Gly  Ser  Ile  Lys  Ser
          305                     310                     315 ggt  gaa  atc  gca  ttc  aaa  aac  gac  gat  agt  tac  cag  cta  cct  caa  aat      1056
```

```
Gly Glu Ile Ala Phe Lys Asn Asp Asp Ser Tyr Gln Leu Pro Gln Asn
            320                 325                 330 cca gac tct gac gcc gac aag cga gct gca aaa cgc cac ttc gac ttc      1104
Pro Asp Ser Asp Ala Asp Lys Arg Ala Ala Lys Arg His Phe Asp Phe
            335                 340                 345 tac atc ggc ata ttc tcg caa ccc gta tac ggc aac ggc tac tat ccc      1152
Tyr Ile Gly Ile Phe Ser Gln Pro Val Tyr Gly Asn Gly Tyr Tyr Pro
350                 355                 360                 365 gaa acc gtc cgg aac aca att tca gag cgc ttc ctc cca gag ttc acc      1200
Glu Thr Val Arg Asn Thr Ile Ser Glu Arg Phe Leu Pro Glu Phe Thr
            370                 375                 380 gca gcc gag cgc gaa caa att cag gga tca gcg gac ttc tac gcc atc      1248
Ala Ala Glu Arg Glu Gln Ile Gln Gly Ser Ala Asp Phe Tyr Ala Ile
            385                 390                 395 gac ggt tat agg acg aat atc gca agc gct gct ccc aat ggt att gac      1296
Asp Gly Tyr Arg Thr Asn Ile Ala Ser Ala Ala Pro Asn Gly Ile Asp
400                 405                 410 gcg tgc ttg aga aac gct agt gat ccc aac tgg cca gtt tgc cag gac      1344
Ala Cys Leu Arg Asn Ala Ser Asp Pro Asn Trp Pro Val Cys Gln Asp
            415                 420                 425 aac agt aac aca ggc caa tac gct act ctt gag gga ttc gca ttg gga      1392
Asn Ser Asn Thr Gly Gln Tyr Ala Thr Leu Glu Gly Phe Ala Leu Gly
430                 435                 440                 445 cct cct gca gat ccc aac gcg aat tgg cta tac aac act gca cct tac      1440
Pro Pro Ala Asp Pro Asn Ala Asn Trp Leu Tyr Asn Thr Ala Pro Tyr
                450                 455                 460 ctg cgt tac caa ttc aaa gtt ctg aaa gag aac ttc aat tac aag aag      1488
Leu Arg Tyr Gln Phe Lys Val Leu Lys Glu Asn Phe Asn Tyr Lys Lys
                465                 470                 475 atc tac ttg acg gaa ttc ggc ttt gca gaa cct ttt agc tat ttg cga      1536
Ile Tyr Leu Thr Glu Phe Gly Phe Ala Glu Pro Phe Ser Tyr Leu Arg
            480                 485                 490 cag gat ctg tat gca ttg ctg tat gac act gat cgc act gca tat tat      1584
Gln Asp Leu Tyr Ala Leu Leu Tyr Asp Thr Asp Arg Thr Ala Tyr Tyr
            495                 500                 505 caa gac tat cta gcg cag tgc atg ctg gct atc aaa gaa gat ggc atc      1632
Gln Asp Tyr Leu Ala Gln Cys Met Leu Ala Ile Lys Glu Asp Gly Ile
510                 515                 520                 525 cct ctt gct ggt gtt ttc gca tgg tca ttt gtt gat aac ttc gaa tgg      1680
Pro Leu Ala Gly Val Phe Ala Trp Ser Phe Val Asp Asn Phe Glu Trp
                530                 535                 540 ggt tcc ggt ctt gag cag aga ttt gga atg caa tat gtc aac tac acc      1728
Gly Ser Gly Leu Glu Gln Arg Phe Gly Met Gln Tyr Val Asn Tyr Thr
                545                 550                 555 gat ccg gat ctc cca cga acc ttc aag ctt tct ttc ctg gca tat cgt      1776
Asp Pro Asp Leu Pro Arg Thr Phe Lys Leu Ser Phe Leu Ala Tyr Arg
            560                 565                 570 gat ttc atc aaa aac cac aaa aag tga                                  1803
Asp Phe Ile Lys Asn His Lys Lys
575                 580

<210> SEQ ID NO 14
<211> LENGTH: 600
<212> TYPE: PRT
<213> ORGANISM: Rodotorula minuta

<400> SEQUENCE: 14

Met Val Ile Leu Arg His Thr Val Leu Ala Ala Val Val Gln Ile
                -15                 -10                 -5

Ala Leu Gly Ala Pro Gln Phe Ser Pro Thr Val Asn Thr Glu Gly Ile
```

|     | -1  | 1   |     |     |     | 5   |     |     |     |     | 10  |     |     |     |
|-----|-----|-----|-----|-----|-----|-----|-----|-----|-----|-----|-----|-----|-----|-----|
|     | Ile | Pro | Ile | Ser | Glu | Arg | Pro | Ser | Pro | Thr | Gln | Ser | Ser | Ser | Ser |
|     |     | 15  |     |     |     | 20  |     |     |     |     | 25  |     |     |     |

```
            -1   1                   5                      10
           Ile Pro Ile Ser Glu Arg Pro Ser Pro Thr Gln Ser Ser Ser Ser
                15              20                  25

Gly Pro Val Ile Pro Ala Gly Ser Tyr Val Ser Asp Phe Asp Ala Ser
           30              35                  40                  45

Gly Leu Ala Asn Leu Trp Ser Gln Val Glu Val Asp Ile Pro Val Glu
                           50                  55                  60

Ser Pro Arg Ile Ser Ala Val Pro Pro Leu Asn Lys Thr Phe Ser Val
                       65                  70                  75

Pro Lys Thr Pro Val Leu Pro Asn Ser Leu Gln Asp His Leu Pro Lys
                       80                  85                  90

Asp Val Lys Ala Pro Glu Gly Phe Ala Trp Gly Val Ala Ser Val Ala
           95                  100                 105

Gln Gln Tyr Glu Gly Ala Val Lys Ala Asp Gly Arg Gly Pro Ser His
           110                 115                 120                 125

Trp Asp Phe Leu Cys His Arg Asn Pro Ser Ser Cys Thr Asn Tyr Thr
                           130                 135                 140

Ser Asp Ile Thr Asp Leu Gly Arg Tyr Tyr Lys Asn Asp Leu Ala
                       145                 150                 155

Arg Met Ala Ala Met Gly Ile Thr His Tyr Ser Phe Ser Val Ser Trp
                       160                 165                 170

Thr Arg Val Val Pro Phe Gly Lys Lys Gly Ser Pro Val Ser Asn Glu
           175                 180                 185

Gly Leu Asp Tyr Tyr Glu Asp Ile Cys Lys Thr Ala Leu Ser Phe Gly
           190                 195                 200                 205

Ile Lys Pro Val Ile Thr Leu Phe His Trp Asp Thr Pro Ala Asn Leu
                       210                 215                 220

Leu Phe Glu Tyr Gly Gly Phe Leu Asn Gly Thr Ile Val Asp Asp Tyr
                       225                 230                 235

Tyr Tyr Tyr Ala Asp Ile Val Phe Arg Arg Leu Gly Lys Tyr Ala Glu
                       240                 245                 250

Thr Phe Phe Thr Phe Asn Glu Pro Arg Val Tyr Cys Ser Glu Tyr Thr
                       255                 260                 265

Gly Pro Pro Phe Asp Ala Tyr Tyr Glu Arg Tyr Gly Leu Asn Ser Ser
           270                 275                 280                 285

Thr Ala Pro Tyr Pro Cys Ser Tyr Asn Leu Leu Arg Ala His Gly Ala
                       290                 295                 300

Ala Val Gly Arg Tyr Arg Ala Leu Val Lys Glu Gly Ser Ile Lys Ser
                       305                 310                 315

Gly Glu Ile Ala Phe Lys Asn Asp Ser Tyr Gln Leu Pro Gln Asn
                       320                 325                 330

Pro Asp Ser Asp Ala Asp Lys Arg Ala Ala Lys Arg His Phe Asp Phe
           335                 340                 345

Tyr Ile Gly Ile Phe Ser Gln Pro Val Tyr Gly Asn Gly Tyr Tyr Pro
           350                 355                 360                 365

Glu Thr Val Arg Asn Thr Ile Ser Glu Arg Phe Leu Pro Glu Phe Thr
                       370                 375                 380

Ala Ala Glu Arg Glu Gln Ile Gln Gly Ser Ala Asp Phe Tyr Ala Ile
                       385                 390                 395

Asp Gly Tyr Arg Thr Asn Ile Ala Ser Ala Ala Pro Asn Gly Ile Asp
                       400                 405                 410

Ala Cys Leu Arg Asn Ala Ser Asp Pro Asn Trp Pro Val Cys Gln Asp
                       415                 420                 425
```

| | | | | | | | | | | | | |
|---|---|---|---|---|---|---|---|---|---|---|---|---|
| Asn | Ser | Asn | Thr | Gly | Gln | Tyr | Ala | Thr | Leu | Glu | Gly | Phe | Ala | Leu | Gly |
| 430 | | | | | 435 | | | | | 440 | | | | | 445 |

Pro Pro Ala Asp Pro Asn Ala Asn Trp Leu Tyr Asn Thr Ala Pro Tyr
               450                     455                     460

Leu Arg Tyr Gln Phe Lys Val Leu Lys Glu Asn Phe Asn Tyr Lys Lys
         465                     470                     475

Ile Tyr Leu Thr Glu Phe Gly Phe Ala Glu Pro Phe Ser Tyr Leu Arg
             480                     485                     490

Gln Asp Leu Tyr Ala Leu Leu Tyr Asp Thr Asp Arg Thr Ala Tyr Tyr
         495                     500                     505

Gln Asp Tyr Leu Ala Gln Cys Met Leu Ala Ile Lys Glu Asp Gly Ile
510                     515                     520                     525

Pro Leu Ala Gly Val Phe Ala Trp Ser Phe Val Asp Asn Phe Glu Trp
                 530                     535                     540

Gly Ser Gly Leu Glu Gln Arg Phe Gly Met Gln Tyr Val Asn Tyr Thr
             545                     550                     555

Asp Pro Asp Leu Pro Arg Thr Phe Lys Leu Ser Phe Leu Ala Tyr Arg
         560                     565                     570

Asp Phe Ile Lys Asn His Lys Lys
575                     580

<210> SEQ ID NO 15
<211> LENGTH: 1809
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1809)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1806)

<400> SEQUENCE: 15 atg atg gtc gcg tgg tgg tct cta ttt ctg tac ggc ctt cag gtc gcg    48
Met Met Val Ala Trp Trp Ser Leu Phe Leu Tyr Gly Leu Gln Val Ala
-20                 -15                 -10 gca cct gct ttg gct gct ccg cag ttt agc ccc aca gtc aat acg gaa    96
Ala Pro Ala Leu Ala Ala Pro Gln Phe Ser Pro Thr Val Asn Thr Glu
-5           -1  1               5                  10 ggt atc att cca att tcg gag cgc cct tcg cct aca caa tct tcg tcg   144
Gly Ile Ile Pro Ile Ser Glu Arg Pro Ser Pro Thr Gln Ser Ser Ser
             15                  20                  25 tcc agc gga ccc gtg att cca gct ggc tca tat gtc tcc gac ttt gat   192
Ser Ser Gly Pro Val Ile Pro Ala Gly Ser Tyr Val Ser Asp Phe Asp
         30                  35                  40 gcc agc gga ctt gca aac tta tgg agc caa gtc gaa gta gac ata cct   240
Ala Ser Gly Leu Ala Asn Leu Trp Ser Gln Val Glu Val Asp Ile Pro
     45                  50                  55 gtc gag tct cca agg att tct gcc gta cct cct ctc aac aaa acg ttc   288
Val Glu Ser Pro Arg Ile Ser Ala Val Pro Pro Leu Asn Lys Thr Phe
60                  65                  70                  75 agt gtt ccg aaa act cca gtc ctg ccc aac tcc ctg cag gat cac ctt   336
Ser Val Pro Lys Thr Pro Val Leu Pro Asn Ser Leu Gln Asp His Leu
                 80                  85                  90 cca aaa gat gtc aaa gca ccc gaa ggc ttt gca tgg ggc gtg gcc tcc   384

```
                Pro Lys Asp Val Lys Ala Pro Glu Gly Phe Ala Trp Gly Val Ala Ser
                                95                  100                 105 gtt gct cag cag tac gag ggt gcc gtc aaa gca gat gga cga gga cca                432
Val Ala Gln Gln Tyr Glu Gly Ala Val Lys Ala Asp Gly Arg Gly Pro
            110                 115                 120 tct cat tgg gat ttc ctt tgc cat aga aac cct tcc agc tgc aca aac                480
Ser His Trp Asp Phe Leu Cys His Arg Asn Pro Ser Ser Cys Thr Asn
125                 130                 135 tac acc agt gat atc act gat ctt ggc cgt tac tac tat aag aat gac                528
Tyr Thr Ser Asp Ile Thr Asp Leu Gly Arg Tyr Tyr Tyr Lys Asn Asp
140                 145                 150                 155 ttg gca cga atg gct gcc atg ggt ata act cac tac tca ttt tca gtg                576
Leu Ala Arg Met Ala Ala Met Gly Ile Thr His Tyr Ser Phe Ser Val
                160                 165                 170 agc tgg acc aga gtt gtg cca ttc ggc aag aag ggc agt cca gtc agc                624
Ser Trp Thr Arg Val Val Pro Phe Gly Lys Lys Gly Ser Pro Val Ser
            175                 180                 185 aac gaa ggc ctc gac tat tac gaa gat atc tgc aag acg gct ttg agc                672
Asn Glu Gly Leu Asp Tyr Tyr Glu Asp Ile Cys Lys Thr Ala Leu Ser
        190                 195                 200 ttt gga atc aag cct gtc att act tta ttc cac tgg gat act cct gcc                720
Phe Gly Ile Lys Pro Val Ile Thr Leu Phe His Trp Asp Thr Pro Ala
205                 210                 215 aac tta ctc ttc gaa tat gga ggt ttc ctc aac ggg aca atc gta gat                768
Asn Leu Leu Phe Glu Tyr Gly Gly Phe Leu Asn Gly Thr Ile Val Asp
220                 225                 230                 235 gac tac tac tat tat gca gat ata gta ttc aga aga cta ggc aaa tat                816
Asp Tyr Tyr Tyr Tyr Ala Asp Ile Val Phe Arg Arg Leu Gly Lys Tyr
                240                 245                 250 gcc gaa acc ttc ttc acc ttc aat gag cct cgt gta tac tgc agc gag                864
Ala Glu Thr Phe Phe Thr Phe Asn Glu Pro Arg Val Tyr Cys Ser Glu
            255                 260                 265 tat act ggt cct ccg ttc gat gcc tat tac gaa cgc tat ggg ctg aat                912
Tyr Thr Gly Pro Pro Phe Asp Ala Tyr Tyr Glu Arg Tyr Gly Leu Asn
        270                 275                 280 tct agc act gca cca tat ccc tgc tcg tac aat ctg ctc cga gcc cat                960
Ser Ser Thr Ala Pro Tyr Pro Cys Ser Tyr Asn Leu Leu Arg Ala His
285                 290                 295 ggt gcc gca gtc ggc agg tat cgt gcc ctg gtc aaa gaa ggc agc atc                1008
Gly Ala Ala Val Gly Arg Tyr Arg Ala Leu Val Lys Glu Gly Ser Ile
300                 305                 310                 315 aaa tct ggt gaa atc gca ttc aaa aac gac gat agt tac cag cta cct                1056
Lys Ser Gly Glu Ile Ala Phe Lys Asn Asp Asp Ser Tyr Gln Leu Pro
                320                 325                 330 caa aat cca gac tct gac gcc gac aag cga gct gca aaa cgc cac ttc                1104
Gln Asn Pro Asp Ser Asp Ala Asp Lys Arg Ala Ala Lys Arg His Phe
            335                 340                 345 gac ttc tac atc ggc ata ttc tcg caa ccc gta tac ggc aac ggc tac                1152
Asp Phe Tyr Ile Gly Ile Phe Ser Gln Pro Val Tyr Gly Asn Gly Tyr
        350                 355                 360 tat ccc gaa acc gtc cgg aac aca att tca gag cgc ttc ctc cca gag                1200
Tyr Pro Glu Thr Val Arg Asn Thr Ile Ser Glu Arg Phe Leu Pro Glu
365                 370                 375 ttc acc gca gcc gag cgc gaa caa att cag gga tca gcg gac ttc tac                1248
Phe Thr Ala Ala Glu Arg Glu Gln Ile Gln Gly Ser Ala Asp Phe Tyr
380                 385                 390                 395 gcc atc gac ggt tat agg acg aat atc gca agc gct gct ccc aat ggt                1296
Ala Ile Asp Gly Tyr Arg Thr Asn Ile Ala Ser Ala Ala Pro Asn Gly
                400                 405                 410
```

```
att gac gcg tgc ttg aga aac gct agt gat ccc aac tgg cca gtt tgc    1344
Ile Asp Ala Cys Leu Arg Asn Ala Ser Asp Pro Asn Trp Pro Val Cys
            415                 420                 425 cag gac aac agt aac aca ggc caa tac gct act ctt gag gga ttc gca    1392
Gln Asp Asn Ser Asn Thr Gly Gln Tyr Ala Thr Leu Glu Gly Phe Ala
            430                 435                 440 ttg gga cct cct gca gat ccc aac gcg aat tgg cta tac aac act gca    1440
Leu Gly Pro Pro Ala Asp Pro Asn Ala Asn Trp Leu Tyr Asn Thr Ala
            445                 450                 455 cct tac ctg cgt tac caa ttc aaa gtt ctg aaa gag aac ttc aat tac    1488
Pro Tyr Leu Arg Tyr Gln Phe Lys Val Leu Lys Glu Asn Phe Asn Tyr
460                 465                 470                 475 aag aag atc tac ttg acg gaa ttc ggc ttt gca gaa cct ttt agc tat    1536
Lys Lys Ile Tyr Leu Thr Glu Phe Gly Phe Ala Glu Pro Phe Ser Tyr
            480                 485                 490 ttg cga cag gat ctg tat gca ttg ctg tat gac act gat cgc act gca    1584
Leu Arg Gln Asp Leu Tyr Ala Leu Leu Tyr Asp Thr Asp Arg Thr Ala
            495                 500                 505 tat tat caa gac tat cta gcg cag tgc atg ctg gct atc aaa gaa gat    1632
Tyr Tyr Gln Asp Tyr Leu Ala Gln Cys Met Leu Ala Ile Lys Glu Asp
            510                 515                 520 ggc atc cct ctt gct ggt gtt ttc gca tgg tca ttt gtt gat aac ttc    1680
Gly Ile Pro Leu Ala Gly Val Phe Ala Trp Ser Phe Val Asp Asn Phe
525                 530                 535 gaa tgg ggt tcc ggt ctt gag cag aga ttt gga atg caa tat gtc aac    1728
Glu Trp Gly Ser Gly Leu Glu Gln Arg Phe Gly Met Gln Tyr Val Asn
540                 545                 550                 555 tac acc gat ccg gat ctc cca cga acc ttc aag ctt tct ttc ctg gca    1776
Tyr Thr Asp Pro Asp Leu Pro Arg Thr Phe Lys Leu Ser Phe Leu Ala
            560                 565                 570 tat cgt gat ttc atc aaa aac cac aaa aag tga                        1809
Tyr Arg Asp Phe Ile Lys Asn His Lys Lys
            575                 580
```

<210> SEQ ID NO 16
<211> LENGTH: 602
<212> TYPE: PRT
<213> ORGANISM: Artificial Sequence
<220> FEATURE:
<223> OTHER INFORMATION: Synthetic Construct

<400> SEQUENCE: 16

```
Met Met Val Ala Trp Trp Ser Leu Phe Leu Tyr Gly Leu Gln Val Ala
        -20                 -15                 -10

Ala Pro Ala Leu Ala Ala Pro Gln Phe Ser Pro Thr Val Asn Thr Glu
-5              -1  1               5                   10

Gly Ile Ile Pro Ile Ser Glu Arg Pro Ser Pro Thr Gln Ser Ser Ser
                15                  20                  25

Ser Ser Gly Pro Val Ile Pro Ala Gly Ser Tyr Val Ser Asp Phe Asp
            30                  35                  40

Ala Ser Gly Leu Ala Asn Leu Trp Ser Gln Val Glu Val Asp Ile Pro
            45                  50                  55

Val Glu Ser Pro Arg Ile Ser Ala Val Pro Pro Leu Asn Lys Thr Phe
60                  65                  70                  75

Ser Val Pro Lys Thr Pro Val Leu Pro Asn Ser Leu Gln Asp His Leu
                80                  85                  90

Pro Lys Asp Val Lys Ala Pro Glu Gly Phe Ala Trp Gly Val Ala Ser
            95                  100                 105

Val Ala Gln Gln Tyr Glu Gly Ala Val Lys Ala Asp Gly Arg Gly Pro
```

```
              110                 115                 120
Ser His Trp Asp Phe Leu Cys His Arg Asn Pro Ser Ser Cys Thr Asn
125                 130                 135
Tyr Thr Ser Asp Ile Thr Asp Leu Gly Arg Tyr Tyr Lys Asn Asp
140                 145                 150                 155
Leu Ala Arg Met Ala Met Gly Ile Thr His Tyr Ser Phe Ser Val
                160                 165                 170
Ser Trp Thr Arg Val Val Pro Phe Gly Lys Gly Ser Pro Val Ser
            175                 180                 185
Asn Glu Gly Leu Asp Tyr Tyr Glu Asp Ile Cys Lys Thr Ala Leu Ser
            190                 195                 200
Phe Gly Ile Lys Pro Val Ile Thr Leu Phe His Trp Asp Thr Pro Ala
205                 210                 215
Asn Leu Leu Phe Glu Tyr Gly Gly Phe Leu Asn Gly Thr Ile Val Asp
220                 225                 230                 235
Asp Tyr Tyr Tyr Ala Asp Ile Val Phe Arg Arg Leu Gly Lys Tyr
                240                 245                 250
Ala Glu Thr Phe Phe Thr Phe Asn Glu Pro Arg Val Tyr Cys Ser Glu
            255                 260                 265
Tyr Thr Gly Pro Pro Phe Asp Ala Tyr Tyr Glu Arg Tyr Gly Leu Asn
            270                 275                 280
Ser Ser Thr Ala Pro Tyr Pro Cys Ser Tyr Asn Leu Leu Arg Ala His
285                 290                 295
Gly Ala Ala Val Gly Arg Tyr Arg Ala Leu Val Lys Glu Gly Ser Ile
300                 305                 310                 315
Lys Ser Gly Glu Ile Ala Phe Lys Asn Asp Asp Ser Tyr Gln Leu Pro
                320                 325                 330
Gln Asn Pro Asp Ser Asp Ala Asp Lys Arg Ala Ala Lys Arg His Phe
            335                 340                 345
Asp Phe Tyr Ile Gly Ile Phe Ser Gln Pro Val Tyr Gly Asn Gly Tyr
            350                 355                 360
Tyr Pro Glu Thr Val Arg Asn Thr Ile Ser Glu Arg Phe Leu Pro Glu
365                 370                 375
Phe Thr Ala Ala Glu Arg Glu Gln Ile Gln Gly Ser Ala Asp Phe Tyr
380                 385                 390                 395
Ala Ile Asp Gly Tyr Arg Thr Asn Ile Ala Ser Ala Ala Pro Asn Gly
                400                 405                 410
Ile Asp Ala Cys Leu Arg Asn Ala Ser Asp Pro Asn Trp Pro Val Cys
            415                 420                 425
Gln Asp Asn Ser Asn Thr Gly Gln Tyr Ala Thr Leu Glu Gly Phe Ala
            430                 435                 440
Leu Gly Pro Pro Ala Asp Pro Asn Ala Asn Trp Leu Tyr Asn Thr Ala
            445                 450                 455
Pro Tyr Leu Arg Tyr Gln Phe Lys Val Leu Lys Glu Asn Phe Asn Tyr
460                 465                 470                 475
Lys Lys Ile Tyr Leu Thr Glu Phe Gly Phe Ala Glu Pro Phe Ser Tyr
                480                 485                 490
Leu Arg Gln Asp Leu Tyr Ala Leu Leu Tyr Asp Thr Asp Arg Thr Ala
            495                 500                 505
Tyr Tyr Gln Asp Tyr Leu Ala Gln Cys Met Leu Ala Ile Lys Glu Asp
            510                 515                 520
Gly Ile Pro Leu Ala Gly Val Phe Ala Trp Ser Phe Val Asp Asn Phe
525                 530                 535
```

```
Glu Trp Gly Ser Gly Leu Glu Gln Arg Phe Gly Met Gln Tyr Val Asn
540                 545                 550                 555

Tyr Thr Asp Pro Asp Leu Pro Arg Thr Phe Lys Leu Ser Phe Leu Ala
            560                 565                 570

Tyr Arg Asp Phe Ile Lys Asn His Lys Lys
        575                 580
```

<210> SEQ ID NO 17
<211> LENGTH: 1809
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1809)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1806)

<400> SEQUENCE: 17

| | | |
|---|---|---|
| atg atg gtc gcg tgg tgg tct cta ttt ctg tac ggc ctt cag gtc gcg<br>Met Met Val Ala Trp Trp Ser Leu Phe Leu Tyr Gly Leu Gln Val Ala<br>    -20                 -15                 -10 | 48 | |
| gca cct gct ttg gct gcg cca cag ttc tcg cca aca gtc aac acc gaa<br>Ala Pro Ala Leu Ala Ala Pro Gln Phe Ser Pro Thr Val Asn Thr Glu<br>-5              -1   1               5                  10 | 96 | |
| ggc atc atc ccc atc agc gag cgg cca agc ccg aca cag agc tcc tct<br>Gly Ile Ile Pro Ile Ser Glu Arg Pro Ser Pro Thr Gln Ser Ser Ser<br>                15                  20                  25 | 144 | |
| tct tct ggg ccc gtg atc cca gcg ggt tcc tat gtc agc gac ttc gat<br>Ser Ser Gly Pro Val Ile Pro Ala Gly Ser Tyr Val Ser Asp Phe Asp<br>        30                  35                  40 | 192 | |
| gcc agc ggg ttg gcg aac ctt tgg tcg cag gtt gaa gtg gac att ccg<br>Ala Ser Gly Leu Ala Asn Leu Trp Ser Gln Val Glu Val Asp Ile Pro<br>    45                  50                  55 | 240 | |
| gtt gag tct cca cgc att tcg gcc gtt cct ccg ctg aac aag acc ttc<br>Val Glu Ser Pro Arg Ile Ser Ala Val Pro Pro Leu Asn Lys Thr Phe<br>60                  65                  70                  75 | 288 | |
| tcg gtt ccg aag act cca gtt ctc ccc aat tcg ctt caa gac cat ctg<br>Ser Val Pro Lys Thr Pro Val Leu Pro Asn Ser Leu Gln Asp His Leu<br>                80                  85                  90 | 336 | |
| ccc aag gat gtg aaa gct cct gag ggc ttt gcc tgg gga gtg gcg tcc<br>Pro Lys Asp Val Lys Ala Pro Glu Gly Phe Ala Trp Gly Val Ala Ser<br>        95                  100                 105 | 384 | |
| gtg gca cag caa tac gag ggc gca gtc aaa gca gac gga cga ggc cct<br>Val Ala Gln Gln Tyr Glu Gly Ala Val Lys Ala Asp Gly Arg Gly Pro<br>    110                 115                 120 | 432 | |
| tct cac tgg gac ttc ctg tgc cat cgc aac ccc tcc tct tgt acc aac<br>Ser His Trp Asp Phe Leu Cys His Arg Asn Pro Ser Ser Cys Thr Asn<br>125                 130                 135 | 480 | |
| tac acc tct gac atc act gat ctg ggc cgc tac tac tac aag aac gat<br>Tyr Thr Ser Asp Ile Thr Asp Leu Gly Arg Tyr Tyr Tyr Lys Asn Asp<br>140                 145                 150                 155 | 528 | |
| ctc gcc cgt atg gcc gca atg ggg atc act cac tac tcc ttt tcg gtg<br>Leu Ala Arg Met Ala Ala Met Gly Ile Thr His Tyr Ser Phe Ser Val<br>                160                 165                 170 | 576 | |
| tct tgg acc cga gtt gtc ccc ttc ggc aag aag ggt tcg cct gtt tcc<br>Ser Trp Thr Arg Val Val Pro Phe Gly Lys Lys Gly Ser Pro Val Ser | 624 | |

-continued

|     |     |     |     |     | 175 |     |     |     | 180 |     |     |     |     | 185 |     |     |      |
|-----|-----|-----|-----|-----|-----|-----|-----|-----|-----|-----|-----|-----|-----|-----|-----|-----|------|

```
aac gag gga ttg gac tac tac gag gac atc tgc aag act gcc ctc tct      672
Asn Glu Gly Leu Asp Tyr Tyr Glu Asp Ile Cys Lys Thr Ala Leu Ser
        190                 195                 200 ttc ggc atc aag ccc gtc atc acg ctg ttc cac tgg gat acc ccg gca      720
Phe Gly Ile Lys Pro Val Ile Thr Leu Phe His Trp Asp Thr Pro Ala
205                 210                 215 aac ctc ctg ttt gag tat gga ggt ttc ctc aat ggc acg atc gtc gat      768
Asn Leu Leu Phe Glu Tyr Gly Gly Phe Leu Asn Gly Thr Ile Val Asp
220                 225                 230                 235 gac tac tac tac tac gcc gac att gtc ttc cgg cgg ttg ggc aag tac      816
Asp Tyr Tyr Tyr Tyr Ala Asp Ile Val Phe Arg Arg Leu Gly Lys Tyr
                240                 245                 250 gcg gag acg ttc ttc acg ttc aac gag cca cgc gtc tac tgc agc gag      864
Ala Glu Thr Phe Phe Thr Phe Asn Glu Pro Arg Val Tyr Cys Ser Glu
            255                 260                 265 tac act ggt cct ccc ttc gat gcc tac tac gag cga tac ggc ctc aac      912
Tyr Thr Gly Pro Pro Phe Asp Ala Tyr Tyr Glu Arg Tyr Gly Leu Asn
        270                 275                 280 tcc tcg act gcc cca tac cct tgt tcg tac aac ctt ttg cgc gct cat      960
Ser Ser Thr Ala Pro Tyr Pro Cys Ser Tyr Asn Leu Leu Arg Ala His
285                 290                 295 ggc gcc gct gtc ggg cga tac cgc gcc ctt gtc aag gag ggc tcc atc     1008
Gly Ala Ala Val Gly Arg Tyr Arg Ala Leu Val Lys Glu Gly Ser Ile
300                 305                 310                 315 aag tcc ggt gag att gcg ttc aag aac gat gac agc tat cag ctt cct     1056
Lys Ser Gly Glu Ile Ala Phe Lys Asn Asp Asp Ser Tyr Gln Leu Pro
                320                 325                 330 cag aat cct gat tcc gat gca gac aaa cgg gca gca aaa cgt cac ttt     1104
Gln Asn Pro Asp Ser Asp Ala Asp Lys Arg Ala Ala Lys Arg His Phe
            335                 340                 345 gac ttc tac atc ggg atc ttc tcc caa ccg gtt tac gga aat ggg tac     1152
Asp Phe Tyr Ile Gly Ile Phe Ser Gln Pro Val Tyr Gly Asn Gly Tyr
        350                 355                 360 tac ccg gaa aca gtg cgt aac aca atc tcc gaa cgc ttc ctg cct gag     1200
Tyr Pro Glu Thr Val Arg Asn Thr Ile Ser Glu Arg Phe Leu Pro Glu
365                 370                 375 ttc acc gct gct gaa cgc gag cag att cag ggt agc gcc gac ttc tac     1248
Phe Thr Ala Ala Glu Arg Glu Gln Ile Gln Gly Ser Ala Asp Phe Tyr
380                 385                 390                 395 gcg atc gat gga tat cgg acc aac atc gca tct gca gcc ccg aat ggg     1296
Ala Ile Asp Gly Tyr Arg Thr Asn Ile Ala Ser Ala Ala Pro Asn Gly
                400                 405                 410 att gac gct tgc ttg cgt aac gct agc gac cct aac tgg ccg gtg tgc     1344
Ile Asp Ala Cys Leu Arg Asn Ala Ser Asp Pro Asn Trp Pro Val Cys
            415                 420                 425 caa gac aac tcg aac aca ggc cag tat gcc acc ctg gaa ggt ttt gca     1392
Gln Asp Asn Ser Asn Thr Gly Gln Tyr Ala Thr Leu Glu Gly Phe Ala
        430                 435                 440 ttg ggg cct ccc gca gac cca aat gcc aac tgg ctg tac aac acg gcg     1440
Leu Gly Pro Pro Ala Asp Pro Asn Ala Asn Trp Leu Tyr Asn Thr Ala
445                 450                 455 ccg tat ctc cga tac caa ttc aag gtc ttg aag gag aac ttc aac tac     1488
Pro Tyr Leu Arg Tyr Gln Phe Lys Val Leu Lys Glu Asn Phe Asn Tyr
460                 465                 470                 475 aag aag atc tac ctg acc gaa ttc ggg ttt gct gag cct ttc tcc tat     1536
Lys Lys Ile Tyr Leu Thr Glu Phe Gly Phe Ala Glu Pro Phe Ser Tyr
                480                 485                 490 ctg cgc caa gac ctg tat gcg ctt ctc tac gat act gat cga acc gct     1584
Leu Arg Gln Asp Leu Tyr Ala Leu Leu Tyr Asp Thr Asp Arg Thr Ala
```

```
                Leu Arg Gln Asp Leu Tyr Ala Leu Leu Tyr Asp Thr Asp Arg Thr Ala
                                495                 500                 505 tac tac cag gat tac ctg gcg cag tgc atg ctg gcc atc aag gag gac           1632
Tyr Tyr Gln Asp Tyr Leu Ala Gln Cys Met Leu Ala Ile Lys Glu Asp
            510                 515                 520 ggt atc cca ttg gcc ggc gtc ttt gct tgg tcc ttc gtt gac aac ttc           1680
Gly Ile Pro Leu Ala Gly Val Phe Ala Trp Ser Phe Val Asp Asn Phe
525                 530                 535 gag tgg ggt tcg gga ttg gaa cag cgc ttt ggc atg cag tat gtg aac           1728
Glu Trp Gly Ser Gly Leu Glu Gln Arg Phe Gly Met Gln Tyr Val Asn
540                 545                 550                 555 tac acc gac ccc gac ttg ccc cgc aca ttc aag ctc tcc ttt ctc gcc           1776
Tyr Thr Asp Pro Asp Leu Pro Arg Thr Phe Lys Leu Ser Phe Leu Ala
                560                 565                 570 tat cgg gac ttc atc aag aac cac aag aag taa                               1809
Tyr Arg Asp Phe Ile Lys Asn His Lys Lys
            575                 580

<210> SEQ ID NO 18
<211> LENGTH: 602
<212> TYPE: PRT
<213> ORGANISM: Artificial Sequence
<220> FEATURE:
<223> OTHER INFORMATION: Synthetic Construct

<400> SEQUENCE: 18

Met Met Val Ala Trp Trp Ser Leu Phe Leu Tyr Gly Leu Gln Val Ala
    -20                 -15                 -10

Ala Pro Ala Leu Ala Ala Pro Gln Phe Ser Pro Thr Val Asn Thr Glu
-5              -1  1               5                   10

Gly Ile Ile Pro Ile Ser Glu Arg Pro Ser Pro Thr Gln Ser Ser Ser
            15                  20                  25

Ser Ser Gly Pro Val Ile Pro Ala Gly Ser Tyr Val Ser Asp Phe Asp
            30                  35                  40

Ala Ser Gly Leu Ala Asn Leu Trp Ser Gln Val Glu Val Asp Ile Pro
45                  50                  55

Val Glu Ser Pro Arg Ile Ser Ala Val Pro Pro Leu Asn Lys Thr Phe
60                  65                  70                  75

Ser Val Pro Lys Thr Pro Val Leu Pro Asn Ser Leu Gln Asp His Leu
                80                  85                  90

Pro Lys Asp Val Lys Ala Pro Glu Gly Phe Ala Trp Gly Val Ala Ser
            95                  100                 105

Val Ala Gln Gln Tyr Glu Gly Ala Val Lys Ala Asp Gly Arg Gly Pro
            110                 115                 120

Ser His Trp Asp Phe Leu Cys His Arg Asn Pro Ser Ser Cys Thr Asn
125                 130                 135

Tyr Thr Ser Asp Ile Thr Asp Leu Gly Arg Tyr Tyr Lys Asn Asp
140                 145                 150                 155

Leu Ala Arg Met Ala Ala Met Gly Ile Thr His Tyr Ser Phe Ser Val
                160                 165                 170

Ser Trp Thr Arg Val Val Pro Phe Gly Lys Lys Gly Ser Pro Val Ser
            175                 180                 185

Asn Glu Gly Leu Asp Tyr Tyr Glu Asp Ile Cys Lys Thr Ala Leu Ser
            190                 195                 200

Phe Gly Ile Lys Pro Val Ile Thr Leu Phe His Trp Asp Thr Pro Ala
205                 210                 215

Asn Leu Leu Phe Glu Tyr Gly Gly Phe Leu Asn Gly Thr Ile Val Asp
```

```
                220                 225                 230                 235

Asp Tyr Tyr Tyr Ala Asp Ile Val Phe Arg Arg Leu Gly Lys Tyr
            240                 245                 250

Ala Glu Thr Phe Phe Thr Phe Asn Glu Pro Arg Val Tyr Cys Ser Glu
            255                 260                 265

Tyr Thr Gly Pro Pro Phe Asp Ala Tyr Tyr Glu Arg Tyr Gly Leu Asn
            270                 275                 280

Ser Ser Thr Ala Pro Tyr Pro Cys Ser Tyr Asn Leu Leu Arg Ala His
        285                 290                 295

Gly Ala Ala Val Gly Arg Tyr Arg Ala Leu Val Lys Glu Gly Ser Ile
300                 305                 310                 315

Lys Ser Gly Glu Ile Ala Phe Lys Asn Asp Ser Tyr Gln Leu Pro
            320                 325                 330

Gln Asn Pro Asp Ser Asp Ala Asp Lys Arg Ala Ala Lys Arg His Phe
            335                 340                 345

Asp Phe Tyr Ile Gly Ile Phe Ser Gln Pro Val Tyr Gly Asn Gly Tyr
            350                 355                 360

Tyr Pro Glu Thr Val Arg Asn Thr Ile Ser Glu Arg Phe Leu Pro Glu
            365                 370                 375

Phe Thr Ala Ala Glu Arg Glu Gln Ile Gln Gly Ser Ala Asp Phe Tyr
380                 385                 390                 395

Ala Ile Asp Gly Tyr Arg Thr Asn Ile Ala Ser Ala Pro Asn Gly
            400                 405                 410

Ile Asp Ala Cys Leu Arg Asn Ala Ser Asp Pro Asn Trp Pro Val Cys
            415                 420                 425

Gln Asp Asn Ser Asn Thr Gly Gln Tyr Ala Thr Leu Glu Gly Phe Ala
            430                 435                 440

Leu Gly Pro Pro Ala Asp Pro Asn Ala Asn Trp Leu Tyr Asn Thr Ala
            445                 450                 455

Pro Tyr Leu Arg Tyr Gln Phe Lys Val Leu Lys Glu Asn Phe Asn Tyr
460                 465                 470                 475

Lys Lys Ile Tyr Leu Thr Glu Phe Gly Phe Ala Glu Pro Phe Ser Tyr
            480                 485                 490

Leu Arg Gln Asp Leu Tyr Ala Leu Leu Tyr Asp Thr Asp Arg Thr Ala
            495                 500                 505

Tyr Tyr Gln Asp Tyr Leu Ala Gln Cys Met Leu Ala Ile Lys Glu Asp
            510                 515                 520

Gly Ile Pro Leu Ala Gly Val Phe Ala Trp Ser Phe Val Asp Asn Phe
            525                 530                 535

Glu Trp Gly Ser Gly Leu Glu Gln Arg Phe Gly Met Gln Tyr Val Asn
540                 545                 550                 555

Tyr Thr Asp Pro Asp Leu Pro Arg Thr Phe Lys Leu Ser Phe Leu Ala
            560                 565                 570

Tyr Arg Asp Phe Ile Lys Asn His Lys Lys
            575                 580

<210> SEQ ID NO 19
<211> LENGTH: 1785
<212> TYPE: DNA
<213> ORGANISM: Sterigmatomyces elviae
<220> FEATURE:
<221> NAME/KEY: CDS
<222> LOCATION: (1)..(1785)
<220> FEATURE:
<221> NAME/KEY: sig_peptide
<222> LOCATION: (1)..(57)
```

-continued

```
<220> FEATURE:
<221> NAME/KEY: mat_peptide
<222> LOCATION: (58)..(1782)

<400> SEQUENCE: 19 atg ctt gtc gga ctt gct ttg act gct ctg tta ggt gcc act cgt tat      48
Met Leu Val Gly Leu Ala Leu Thr Ala Leu Leu Gly Ala Thr Arg Tyr
        -15                 -10                 -5 gtt ggc gca atc cct gct ttc cca atc act cca gat ttg gct ggt ggg      96
Val Gly Ala Ile Pro Ala Phe Pro Ile Thr Pro Asp Leu Ala Gly Gly
    -1   1               5                  10 ctg gag tct gtg acc aac act cag acc tcg ctc cct tca gcg agc gct     144
Leu Glu Ser Val Thr Asn Thr Gln Thr Ser Leu Pro Ser Ala Ser Ala
 15                  20                  25 gtg tcg tcg ccc tat aat caa gat gca ctc gac aag ctg tgg gct gag     192
Val Ser Ser Pro Tyr Asn Gln Asp Ala Leu Asp Lys Leu Trp Ala Glu
 30                  35                  40                  45 gtc gaa aaa gac att cca gtc gag aca cca agc atc tcc agc gtt gtt     240
Val Glu Lys Asp Ile Pro Val Glu Thr Pro Ser Ile Ser Ser Val Val
                 50                  55                  60 cca gta aac aac agc ttt gcg gtc ccc aaa acc cct act ctg ccc cga     288
Pro Val Asn Asn Ser Phe Ala Val Pro Lys Thr Pro Thr Leu Pro Arg
             65                  70                  75 tct ctt cag gat cat gct acc agt ggc cgc aaa ttc ccc aaa ggc ttc     336
Ser Leu Gln Asp His Ala Thr Ser Gly Arg Lys Phe Pro Lys Gly Phe
         80                  85                  90 aag ttt ggt gtc gcc acc gcc gat cag cag tat gaa ggt gcc gtc aag     384
Lys Phe Gly Val Ala Thr Ala Asp Gln Gln Tyr Glu Gly Ala Val Lys
     95                 100                 105 gct gat ggc cgt ggc ccc tct cac tgg gat tac ctt tgc cat cgt ctc     432
Ala Asp Gly Arg Gly Pro Ser His Trp Asp Tyr Leu Cys His Arg Leu
110                 115                 120                 125 cca cag caa tgc aac aac tac acc tca gac atc act gac ctt ggt cgc     480
Pro Gln Gln Cys Asn Asn Tyr Thr Ser Asp Ile Thr Asp Leu Gly Arg
                130                 135                 140 tac tat tat aag caa gat atc gca cga atc aag gcc atg gga gta aac     528
Tyr Tyr Tyr Lys Gln Asp Ile Ala Arg Ile Lys Ala Met Gly Val Asn
            145                 150                 155 act gta tca ctc acc ctt tct tgg tca cgt atc aag ccc ttc ggc acg     576
Thr Val Ser Leu Thr Leu Ser Trp Ser Arg Ile Lys Pro Phe Gly Thr
        160                 165                 170 gcc gat agt cct gtc agc aaa gaa gga ctc caa ttt tac gat gac ttt     624
Ala Asp Ser Pro Val Ser Lys Glu Gly Leu Gln Phe Tyr Asp Asp Phe
    175                 180                 185 atc aac gag ctc atc gat aat ggc atc gaa cca gtc gtc acc ctg ttc     672
Ile Asn Glu Leu Ile Asp Asn Gly Ile Glu Pro Val Val Thr Leu Phe
190                 195                 200                 205 cat tgg agt aca cca ctc aat ctg gtg ttc gaa tac ggg gcc ttc ctt     720
His Trp Ser Thr Pro Leu Asn Leu Val Phe Glu Tyr Gly Ala Phe Leu
                210                 215                 220 aat ggc agc tcg gtt gaa gat ttc gct agc tat gct aag ctt gtt ttt     768
Asn Gly Ser Ser Val Glu Asp Phe Ala Ser Tyr Ala Lys Leu Val Phe
            225                 230                 235 gag cat ttc ggt gac aga gta acc aca ttc ctt act ttc aac gag cct     816
Glu His Phe Gly Asp Arg Val Thr Thr Phe Leu Thr Phe Asn Glu Pro
        240                 245                 250 cgt gta tac tgc tcc gaa tac act ggc gag cct ttt aat gat tat tgg     864
Arg Val Tyr Cys Ser Glu Tyr Thr Gly Glu Pro Phe Asn Asp Tyr Trp
    255                 260                 265 cac ttt gga ggt ccc aac atc aat gcc acg acc gct ccc tat cct tgc     912
```

-continued

| | | | | | | | | | | | | | | | | |
|---|---|---|---|---|---|---|---|---|---|---|---|---|---|---|---|---|
| His | Phe | Gly | Gly | Pro | Asn | Ile | Asn | Ala | Thr | Thr | Ala | Pro | Tyr | Pro | Cys | |
| 270 | | | | | 275 | | | | 280 | | | | | 285 | | |

| acc | tat | aac | att | tta | aaa | gca | cac | gga | cgt | gcc | gtt | caa | gaa | tac | aga | 960 |
|---|---|---|---|---|---|---|---|---|---|---|---|---|---|---|---|---|
| Thr | Tyr | Asn | Ile | Leu | Lys | Ala | His | Gly | Arg | Ala | Val | Gln | Glu | Tyr | Arg | |
| | | | | 290 | | | | | 295 | | | | | 300 | | |

| gca | ctg | gtc | aac | agt | gga | aag | atc | aag | aaa | ggt | gaa | gtc | gca | att | aaa | 1008 |
|---|---|---|---|---|---|---|---|---|---|---|---|---|---|---|---|---|
| Ala | Leu | Val | Asn | Ser | Gly | Lys | Ile | Lys | Lys | Gly | Glu | Val | Ala | Ile | Lys | |
| | | | | 305 | | | | | 310 | | | | | 315 | | |

| aac | gac | gat | agt | tat | ccc | gtg | cca | gtc | aac | cca | gac | tcc | gaa | gcc | gat | 1056 |
|---|---|---|---|---|---|---|---|---|---|---|---|---|---|---|---|---|
| Asn | Asp | Asp | Ser | Tyr | Pro | Val | Pro | Val | Asn | Pro | Asp | Ser | Glu | Ala | Asp | |
| | | | 320 | | | | | 325 | | | | | 330 | | | |

| gta | gaa | gcg | gcc | aag | cga | cac | ttc | gat | ttc | tac | att | ggc | att | ttc | agt | 1104 |
|---|---|---|---|---|---|---|---|---|---|---|---|---|---|---|---|---|
| Val | Glu | Ala | Ala | Lys | Arg | His | Phe | Asp | Phe | Tyr | Ile | Gly | Ile | Phe | Ser | |
| | 335 | | | | | 340 | | | | | 345 | | | | | |

| cag | cct | att | tac | ggt | gat | gga | aag | ttc | cca | gac | acc | gtt | aga | aac | acc | 1152 |
|---|---|---|---|---|---|---|---|---|---|---|---|---|---|---|---|---|
| Gln | Pro | Ile | Tyr | Gly | Asp | Gly | Lys | Phe | Pro | Asp | Thr | Val | Arg | Asn | Thr | |
| 350 | | | | | 355 | | | | | 360 | | | | | 365 | |

| atc | tcc | act | gaa | ttc | ctg | cca | tac | ctc | acc | gat | gat | gag | aaa | gcc | atg | 1200 |
|---|---|---|---|---|---|---|---|---|---|---|---|---|---|---|---|---|
| Ile | Ser | Thr | Glu | Phe | Leu | Pro | Tyr | Leu | Thr | Asp | Asp | Glu | Lys | Ala | Met | |
| | | | | 370 | | | | | 375 | | | | | 380 | | |

| att | aaa | gga | agt | ggt | gac | ttt | ttc | gcc | ata | gac | gca | tat | cga | acc | aac | 1248 |
|---|---|---|---|---|---|---|---|---|---|---|---|---|---|---|---|---|
| Ile | Lys | Gly | Ser | Gly | Asp | Phe | Phe | Ala | Ile | Asp | Ala | Tyr | Arg | Thr | Asn | |
| | | | 385 | | | | | 390 | | | | | 395 | | | |

| ctt | gca | aga | gct | gcg | ccc | aat | ggc | atc | caa | gcc | tgc | gta | gct | aac | atc | 1296 |
|---|---|---|---|---|---|---|---|---|---|---|---|---|---|---|---|---|
| Leu | Ala | Arg | Ala | Ala | Pro | Asn | Gly | Ile | Gln | Ala | Cys | Val | Ala | Asn | Ile | |
| | 400 | | | | | 405 | | | | | 410 | | | | | |

| tcg | gat | ccc | aat | tgg | cct | gta | tgc | caa | gac | aac | agc | cct | gaa | gga | caa | 1344 |
|---|---|---|---|---|---|---|---|---|---|---|---|---|---|---|---|---|
| Ser | Asp | Pro | Asn | Trp | Pro | Val | Cys | Gln | Asp | Asn | Ser | Pro | Glu | Gly | Gln | |
| 415 | | | | | 420 | | | | | 425 | | | | | | |

| tac | caa | acc | atg | gat | ggc | ttt | gct | ttc | ggt | ccc | ccg | gca | gac | ccc | aac | 1392 |
|---|---|---|---|---|---|---|---|---|---|---|---|---|---|---|---|---|
| Tyr | Gln | Thr | Met | Asp | Gly | Phe | Ala | Phe | Gly | Pro | Pro | Ala | Asp | Pro | Asn | |
| 430 | | | | 435 | | | | | 440 | | | | | 445 | | |

| gct | gca | tgg | cta | tat | gac | acc | agc | ttc | aag | ttg | cgc | tac | cag | ctt | aag | 1440 |
|---|---|---|---|---|---|---|---|---|---|---|---|---|---|---|---|---|
| Ala | Ala | Trp | Leu | Tyr | Asp | Thr | Ser | Phe | Lys | Leu | Arg | Tyr | Gln | Leu | Lys | |
| | | | 450 | | | | | 455 | | | | | 460 | | | |

| aca | ctc | aaa | gag | gca | ttc | aac | tat | gac | aag | atc | tac | atc | tca | gag | ttt | 1488 |
|---|---|---|---|---|---|---|---|---|---|---|---|---|---|---|---|---|
| Thr | Leu | Lys | Glu | Ala | Phe | Asn | Tyr | Asp | Lys | Ile | Tyr | Ile | Ser | Glu | Phe | |
| | | 465 | | | | | 470 | | | | | 475 | | | | |

| gga | ttt | gct | cgg | cct | tac | gaa | tac | ctc | tac | cct | tac | ggc | ttc | gac | gtc | 1536 |
|---|---|---|---|---|---|---|---|---|---|---|---|---|---|---|---|---|
| Gly | Phe | Ala | Arg | Pro | Tyr | Glu | Tyr | Leu | Tyr | Pro | Tyr | Gly | Phe | Asp | Val | |
| | | 480 | | | | | 485 | | | | | 490 | | | | |

| ctg | tac | gac | aca | gac | cgt | gcc | att | tac | tac | caa | gac | tac | atg | gct | gag | 1584 |
|---|---|---|---|---|---|---|---|---|---|---|---|---|---|---|---|---|
| Leu | Tyr | Asp | Thr | Asp | Arg | Ala | Ile | Tyr | Tyr | Gln | Asp | Tyr | Met | Ala | Glu | |
| | 495 | | | | | 500 | | | | | 505 | | | | | |

| gcc | ttg | gat | gcc | att | cat | gac | gac | ggc | att | cct | ctg | gct | ggt | gtc | ttt | 1632 |
|---|---|---|---|---|---|---|---|---|---|---|---|---|---|---|---|---|
| Ala | Leu | Asp | Ala | Ile | His | Asp | Asp | Gly | Ile | Pro | Leu | Ala | Gly | Val | Phe | |
| 510 | | | | 515 | | | | | 520 | | | | | 525 | | |

| gct | tgg | tcc | ttc | gtt | gac | aat | ttc | gaa | tgg | gct | tcc | ggt | ctt | gaa | cag | 1680 |
|---|---|---|---|---|---|---|---|---|---|---|---|---|---|---|---|---|
| Ala | Trp | Ser | Phe | Val | Asp | Asn | Phe | Glu | Trp | Ala | Ser | Gly | Leu | Glu | Gln | |
| | | | 530 | | | | | 535 | | | | | 540 | | | |

| cga | ttc | ggc | atg | cag | ttc | gtg | aac | tac | acg | aca | ctg | gaa | aga | gag | tac | 1728 |
|---|---|---|---|---|---|---|---|---|---|---|---|---|---|---|---|---|
| Arg | Phe | Gly | Met | Gln | Phe | Val | Asn | Tyr | Thr | Thr | Leu | Glu | Arg | Glu | Tyr | |
| | | | 545 | | | | | 550 | | | | | 555 | | | |

| aag | ctc | tcc | ttc | ctg | ctt | tat | cgt | gac | ttc | att | gaa | aac | cac | agt | tgc | 1776 |
|---|---|---|---|---|---|---|---|---|---|---|---|---|---|---|---|---|
| Lys | Leu | Ser | Phe | Leu | Leu | Tyr | Arg | Asp | Phe | Ile | Glu | Asn | His | Ser | Cys | |
| | | 560 | | | | | 565 | | | | | 570 | | | | |

| gaa | gat | taa | | | | | | | | | | | | | | 1785 |
|---|---|---|---|---|---|---|---|---|---|---|---|---|---|---|---|---|
| Glu | Asp | | | | | | | | | | | | | | | |
| | 575 | | | | | | | | | | | | | | | |

<210> SEQ ID NO 20
<211> LENGTH: 594
<212> TYPE: PRT
<213> ORGANISM: Sterigmatomyces elviae

<400> SEQUENCE: 20

Met Leu Val Gly Leu Ala Leu Thr Ala Leu Leu Gly Ala Thr Arg Tyr
                -15                 -10                  -5

Val Gly Ala Ile Pro Ala Phe Pro Ile Thr Pro Asp Leu Ala Gly Gly
         -1   1              5                  10

Leu Glu Ser Val Thr Asn Thr Gln Thr Ser Leu Pro Ser Ala Ser Ala
         15                  20                  25

Val Ser Ser Pro Tyr Asn Gln Asp Ala Leu Asp Lys Leu Trp Ala Glu
 30              35                  40                      45

Val Glu Lys Asp Ile Pro Val Glu Thr Pro Ser Ile Ser Ser Val Val
                 50                  55                  60

Pro Val Asn Asn Ser Phe Ala Val Pro Lys Thr Pro Thr Leu Pro Arg
             65                  70                  75

Ser Leu Gln Asp His Ala Thr Ser Gly Arg Lys Phe Pro Lys Gly Phe
             80                  85                  90

Lys Phe Gly Val Ala Thr Ala Asp Gln Gln Tyr Glu Gly Ala Val Lys
     95                 100                 105

Ala Asp Gly Arg Gly Pro Ser His Trp Asp Tyr Leu Cys His Arg Leu
110                 115                 120                 125

Pro Gln Gln Cys Asn Asn Tyr Thr Ser Asp Ile Thr Asp Leu Gly Arg
                130                 135                 140

Tyr Tyr Tyr Lys Gln Asp Ile Ala Arg Ile Lys Ala Met Gly Val Asn
                145                 150                 155

Thr Val Ser Leu Thr Leu Ser Trp Ser Arg Ile Lys Pro Phe Gly Thr
                160                 165                 170

Ala Asp Ser Pro Val Ser Lys Glu Gly Leu Gln Phe Tyr Asp Asp Phe
                175                 180                 185

Ile Asn Glu Leu Ile Asp Asn Gly Ile Glu Pro Val Val Thr Leu Phe
190                 195                 200                 205

His Trp Ser Thr Pro Leu Asn Leu Val Phe Glu Tyr Gly Ala Phe Leu
                210                 215                 220

Asn Gly Ser Ser Val Glu Asp Phe Ala Ser Tyr Ala Lys Leu Val Phe
                225                 230                 235

Glu His Phe Gly Asp Arg Val Thr Thr Phe Leu Thr Phe Asn Glu Pro
        240                 245                 250

Arg Val Tyr Cys Ser Glu Tyr Thr Gly Glu Pro Phe Asn Asp Tyr Trp
    255                 260                 265

His Phe Gly Gly Pro Asn Ile Asn Ala Thr Thr Ala Pro Tyr Pro Cys
270                 275                 280                 285

Thr Tyr Asn Ile Leu Lys Ala His Gly Arg Ala Val Gln Glu Tyr Arg
                290                 295                 300

Ala Leu Val Asn Ser Gly Lys Ile Lys Lys Gly Glu Val Ala Ile Lys
                305                 310                 315

Asn Asp Asp Ser Tyr Pro Val Pro Val Asn Pro Asp Ser Glu Ala Asp
                320                 325                 330

Val Glu Ala Ala Lys Arg His Phe Asp Phe Tyr Ile Gly Ile Phe Ser
        335                 340                 345

Gln Pro Ile Tyr Gly Asp Gly Lys Phe Pro Asp Thr Val Arg Asn Thr
350                 355                 360                 365

```
Ile Ser Thr Glu Phe Leu Pro Tyr Leu Thr Asp Asp Glu Lys Ala Met
            370                 375                 380

Ile Lys Gly Ser Gly Asp Phe Phe Ala Ile Asp Ala Tyr Arg Thr Asn
                385                 390                 395

Leu Ala Arg Ala Ala Pro Asn Gly Ile Gln Ala Cys Val Ala Asn Ile
            400                 405                 410

Ser Asp Pro Asn Trp Pro Val Cys Gln Asp Asn Ser Pro Glu Gly Gln
            415                 420                 425

Tyr Gln Thr Met Asp Gly Phe Ala Phe Gly Pro Ala Asp Pro Asn
430                 435                 440                 445

Ala Ala Trp Leu Tyr Asp Thr Ser Phe Lys Leu Arg Tyr Gln Leu Lys
            450                 455                 460

Thr Leu Lys Glu Ala Phe Asn Tyr Asp Lys Ile Tyr Ile Ser Glu Phe
            465                 470                 475

Gly Phe Ala Arg Pro Tyr Glu Tyr Leu Tyr Pro Tyr Gly Phe Asp Val
            480                 485                 490

Leu Tyr Asp Thr Asp Arg Ala Ile Tyr Tyr Gln Asp Tyr Met Ala Glu
            495                 500                 505

Ala Leu Asp Ala Ile His Asp Asp Gly Ile Pro Leu Ala Gly Val Phe
510                 515                 520                 525

Ala Trp Ser Phe Val Asp Asn Phe Glu Trp Ala Ser Gly Leu Glu Gln
            530                 535                 540

Arg Phe Gly Met Gln Phe Val Asn Tyr Thr Thr Leu Glu Arg Glu Tyr
                545                 550                 555

Lys Leu Ser Phe Leu Leu Tyr Arg Asp Phe Ile Glu Asn His Ser Cys
            560                 565                 570

Glu Asp
    575

<210> SEQ ID NO 21
<211> LENGTH: 1791
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1791)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1788)

<400> SEQUENCE: 21 atg atg gtc gcg tgg tgg tct cta ttt ctg tac ggc ctt cag gtc gcg      48
Met Met Val Ala Trp Trp Ser Leu Phe Leu Tyr Gly Leu Gln Val Ala
    -20                 -15                 -10 gca cct gct ttg gct atc cct gct ttc cca atc act cca gat ttg gct      96
Ala Pro Ala Leu Ala Ile Pro Ala Phe Pro Ile Thr Pro Asp Leu Ala
-5                  -1  1               5                   10 ggt ggg ctg gag tct gtg acc aac act cag acc tcg ctc cct tca gcg     144
Gly Gly Leu Glu Ser Val Thr Asn Thr Gln Thr Ser Leu Pro Ser Ala
            15                  20                  25 agc gct gtg tcg tcg ccc tat aat caa gat gca ctc gac aag ctg tgg     192
Ser Ala Val Ser Ser Pro Tyr Asn Gln Asp Ala Leu Asp Lys Leu Trp
        30                  35                  40 gct gag gtc gaa aaa gac att cca gtc gag aca cca agc atc tcc agc     240
```

```
                    Ala Glu Val Glu Lys Asp Ile Pro Val Glu Thr Pro Ser Ile Ser Ser
                        45                  50                  55 gtt gtt cca gta aac aac agc ttt gcg gtc ccc aaa acc cct act ctg          288
Val Val Pro Val Asn Asn Ser Phe Ala Val Pro Lys Thr Pro Thr Leu
 60                  65                  70                  75 ccc cga tct ctt cag gat cat gct acc agt ggc cgc aaa ttc ccc aaa          336
Pro Arg Ser Leu Gln Asp His Ala Thr Ser Gly Arg Lys Phe Pro Lys
                 80                  85                  90 ggc ttc aag ttt ggt gtc gcc acc gcc gat cag cag tat gaa ggt gcc          384
Gly Phe Lys Phe Gly Val Ala Thr Ala Asp Gln Gln Tyr Glu Gly Ala
             95                 100                 105 gtc aag gct gat ggc cgt ggc ccc tct cac tgg gat tac ctt tgc cat          432
Val Lys Ala Asp Gly Arg Gly Pro Ser His Trp Asp Tyr Leu Cys His
         110                 115                 120 cgt ctc cca cag caa tgc aac aac tac acc tca gac atc act gac ctt          480
Arg Leu Pro Gln Gln Cys Asn Asn Tyr Thr Ser Asp Ile Thr Asp Leu
     125                 130                 135 ggt cgc tac tat tat aag caa gat atc gca cga atc aag gcc atg gga          528
Gly Arg Tyr Tyr Tyr Lys Gln Asp Ile Ala Arg Ile Lys Ala Met Gly
140                 145                 150                 155 gta aac act gta tca ctc acc ctt tct tgg tca cgt atc aag ccc ttc          576
Val Asn Thr Val Ser Leu Thr Leu Ser Trp Ser Arg Ile Lys Pro Phe
                 160                 165                 170 ggc acg gcc gat agt cct gtc agc aaa gaa gga ctc caa ttt tac gat          624
Gly Thr Ala Asp Ser Pro Val Ser Lys Glu Gly Leu Gln Phe Tyr Asp
             175                 180                 185 gac ttt atc aac gag ctc atc gat aat ggc atc gaa cca gtc gtc acc          672
Asp Phe Ile Asn Glu Leu Ile Asp Asn Gly Ile Glu Pro Val Val Thr
         190                 195                 200 ctg ttc cat tgg agt aca cca ctc aat ctg gtg ttc gaa tac ggg gcc          720
Leu Phe His Trp Ser Thr Pro Leu Asn Leu Val Phe Glu Tyr Gly Ala
     205                 210                 215 ttc ctt aat ggc agc tcg gtt gaa gat ttc gct agc tat gct aag ctt          768
Phe Leu Asn Gly Ser Ser Val Glu Asp Phe Ala Ser Tyr Ala Lys Leu
220                 225                 230                 235 gtt ttt gag cat ttc ggt gac aga gta acc aca ttc ctt act ttc aac          816
Val Phe Glu His Phe Gly Asp Arg Val Thr Thr Phe Leu Thr Phe Asn
                 240                 245                 250 gag cct cgt gta tac tgc tcc gaa tac act ggc gag cct ttt aat gat          864
Glu Pro Arg Val Tyr Cys Ser Glu Tyr Thr Gly Glu Pro Phe Asn Asp
             255                 260                 265 tat tgg cac ttt gga ggt ccc aac atc aat gcc acg acc gct ccc tat          912
Tyr Trp His Phe Gly Gly Pro Asn Ile Asn Ala Thr Thr Ala Pro Tyr
         270                 275                 280 cct tgc acc tat aac att tta aaa gca cac gga cgt gcc gtt caa gaa          960
Pro Cys Thr Tyr Asn Ile Leu Lys Ala His Gly Arg Ala Val Gln Glu
     285                 290                 295 tac aga gca ctg gtc aac agt gga aag atc aag aaa ggt gaa gtc gca         1008
Tyr Arg Ala Leu Val Asn Ser Gly Lys Ile Lys Lys Gly Glu Val Ala
300                 305                 310                 315 att aaa aac gac gat agt tat ccc gtg cca gtc aac cca gac tcc gaa         1056
Ile Lys Asn Asp Asp Ser Tyr Pro Val Pro Val Asn Pro Asp Ser Glu
                 320                 325                 330 gcc gat gta gaa gcg gcc aag cga cac ttc gat ttc tac att ggc att         1104
Ala Asp Val Glu Ala Ala Lys Arg His Phe Asp Phe Tyr Ile Gly Ile
             335                 340                 345 ttc agt cag cct att tac ggt gat gga aag ttc cca gac acc gtt aga         1152
Phe Ser Gln Pro Ile Tyr Gly Asp Gly Lys Phe Pro Asp Thr Val Arg
         350                 355                 360
```

```
aac acc atc tcc act gaa ttc ctg cca tac ctc acc gat gat gag aaa      1200
Asn Thr Ile Ser Thr Glu Phe Leu Pro Tyr Leu Thr Asp Asp Glu Lys
365                 370                 375 gcc atg att aaa gga agt ggt gac ttt ttc gcc ata gac gca tat cga      1248
Ala Met Ile Lys Gly Ser Gly Asp Phe Phe Ala Ile Asp Ala Tyr Arg
380                 385                 390                 395 acc aac ctt gca aga gct gcg ccc aat ggc atc caa gcc tgc gta gct      1296
Thr Asn Leu Ala Arg Ala Ala Pro Asn Gly Ile Gln Ala Cys Val Ala
        400                 405                 410 aac atc tcg gat ccc aat tgg cct gta tgc caa gac aac agc cct gaa      1344
Asn Ile Ser Asp Pro Asn Trp Pro Val Cys Gln Asp Asn Ser Pro Glu
        415                 420                 425 gga caa tac caa acc atg gat ggc ttt gct ttc ggt ccc ccg gca gac      1392
Gly Gln Tyr Gln Thr Met Asp Gly Phe Ala Phe Gly Pro Pro Ala Asp
        430                 435                 440 ccc aac gct gca tgg cta tat gac acc agc ttc aag ttg cgc tac cag      1440
Pro Asn Ala Ala Trp Leu Tyr Asp Thr Ser Phe Lys Leu Arg Tyr Gln
445                 450                 455 ctt aag aca ctc aaa gag gca ttc aac tat gac aag atc tac atc tca      1488
Leu Lys Thr Leu Lys Glu Ala Phe Asn Tyr Asp Lys Ile Tyr Ile Ser
460                 465                 470                 475 gag ttt gga ttt gct cgg cct tac gaa tac ctc tac cct tac ggc ttc      1536
Glu Phe Gly Phe Ala Arg Pro Tyr Glu Tyr Leu Tyr Pro Tyr Gly Phe
                480                 485                 490 gac gtc ctg tac gac aca gac cgt gcc att tac tac caa gac tac atg      1584
Asp Val Leu Tyr Asp Thr Asp Arg Ala Ile Tyr Tyr Gln Asp Tyr Met
                495                 500                 505 gct gag gcc ttg gat gcc att cat gac gac ggc att cct ctg gct ggt      1632
Ala Glu Ala Leu Asp Ala Ile His Asp Asp Gly Ile Pro Leu Ala Gly
510                 515                 520 gtc ttt gct tgg tcc ttc gtt gac aat ttc gaa tgg gct tcc ggt ctt      1680
Val Phe Ala Trp Ser Phe Val Asp Asn Phe Glu Trp Ala Ser Gly Leu
525                 530                 535 gaa cag cga ttc ggc atg cag ttc gtg aac tac acg aca ctg gaa aga      1728
Glu Gln Arg Phe Gly Met Gln Phe Val Asn Tyr Thr Thr Leu Glu Arg
540                 545                 550                 555 gag tac aag ctc tcc ttc ctg ctt tat cgt gac ttc att gaa aac cac      1776
Glu Tyr Lys Leu Ser Phe Leu Leu Tyr Arg Asp Phe Ile Glu Asn His
                560                 565                 570 agt tgc gaa gat taa                                                  1791
Ser Cys Glu Asp
            575

<210> SEQ ID NO 22
<211> LENGTH: 596
<212> TYPE: PRT
<213> ORGANISM: Artificial Sequence
<220> FEATURE:
<223> OTHER INFORMATION: Synthetic Construct

<400> SEQUENCE: 22

Met Met Val Ala Trp Trp Ser Leu Phe Leu Tyr Gly Leu Gln Val Ala
    -20                 -15                 -10

Ala Pro Ala Leu Ala Ile Pro Ala Phe Pro Ile Thr Pro Asp Leu Ala
-5                  -1  1               5                   10

Gly Gly Leu Glu Ser Val Thr Asn Thr Gln Thr Ser Leu Pro Ser Ala
                15                  20                  25

Ser Ala Val Ser Ser Pro Tyr Asn Gln Asp Ala Leu Asp Lys Leu Trp
            30                  35                  40

Ala Glu Val Glu Lys Asp Ile Pro Val Glu Thr Pro Ser Ile Ser Ser
```

```
                45                  50                  55
Val Val Pro Val Asn Asn Ser Phe Ala Val Pro Lys Thr Pro Thr Leu
 60                  65                  70                  75
Pro Arg Ser Leu Gln Asp His Ala Thr Ser Gly Arg Lys Phe Pro Lys
                    80                  85                  90
Gly Phe Lys Phe Gly Val Ala Thr Ala Asp Gln Gln Tyr Glu Gly Ala
                95                 100                 105
Val Lys Ala Asp Gly Arg Gly Pro Ser His Trp Asp Tyr Leu Cys His
            110                 115                 120
Arg Leu Pro Gln Gln Cys Asn Asn Tyr Thr Ser Asp Ile Thr Asp Leu
        125                 130                 135
Gly Arg Tyr Tyr Tyr Lys Gln Asp Ile Ala Arg Ile Lys Ala Met Gly
140                 145                 150                 155
Val Asn Thr Val Ser Leu Thr Leu Ser Trp Ser Arg Ile Lys Pro Phe
                    160                 165                 170
Gly Thr Ala Asp Ser Pro Val Ser Lys Glu Gly Leu Gln Phe Tyr Asp
                175                 180                 185
Asp Phe Ile Asn Glu Leu Ile Asp Asn Gly Ile Glu Pro Val Val Thr
            190                 195                 200
Leu Phe His Trp Ser Thr Pro Leu Asn Leu Val Phe Glu Tyr Gly Ala
        205                 210                 215
Phe Leu Asn Gly Ser Ser Val Glu Asp Phe Ala Ser Tyr Ala Lys Leu
220                 225                 230                 235
Val Phe Glu His Phe Gly Asp Arg Val Thr Thr Phe Leu Thr Phe Asn
                    240                 245                 250
Glu Pro Arg Val Tyr Cys Ser Glu Tyr Thr Gly Glu Pro Phe Asn Asp
                255                 260                 265
Tyr Trp His Phe Gly Gly Pro Asn Ile Asn Ala Thr Thr Ala Pro Tyr
            270                 275                 280
Pro Cys Thr Tyr Asn Ile Leu Lys Ala His Gly Arg Ala Val Gln Glu
        285                 290                 295
Tyr Arg Ala Leu Val Asn Ser Gly Lys Ile Lys Lys Gly Glu Val Ala
300                 305                 310                 315
Ile Lys Asn Asp Asp Ser Tyr Pro Val Pro Val Asn Pro Asp Ser Glu
                    320                 325                 330
Ala Asp Val Glu Ala Ala Lys Arg His Phe Asp Phe Tyr Ile Gly Ile
                335                 340                 345
Phe Ser Gln Pro Ile Tyr Gly Asp Gly Lys Phe Pro Asp Thr Val Arg
            350                 355                 360
Asn Thr Ile Ser Thr Glu Phe Leu Pro Tyr Leu Thr Asp Asp Glu Lys
        365                 370                 375
Ala Met Ile Lys Gly Ser Gly Asp Phe Phe Ala Ile Asp Ala Tyr Arg
380                 385                 390                 395
Thr Asn Leu Ala Arg Ala Ala Pro Asn Gly Ile Gln Ala Cys Val Ala
                    400                 405                 410
Asn Ile Ser Asp Pro Asn Trp Pro Val Cys Gln Asp Asn Ser Pro Glu
                415                 420                 425
Gly Gln Tyr Gln Thr Met Asp Gly Phe Ala Phe Gly Pro Pro Ala Asp
            430                 435                 440
Pro Asn Ala Ala Trp Leu Tyr Asp Thr Ser Phe Lys Leu Arg Tyr Gln
        445                 450                 455
Leu Lys Thr Leu Lys Glu Ala Phe Asn Tyr Asp Lys Ile Tyr Ile Ser
460                 465                 470                 475
```

```
Glu Phe Gly Phe Ala Arg Pro Tyr Glu Tyr Leu Tyr Pro Tyr Gly Phe
            480                 485                 490

Asp Val Leu Tyr Asp Thr Asp Arg Ala Ile Tyr Tyr Gln Asp Tyr Met
                495                 500                 505

Ala Glu Ala Leu Asp Ala Ile His Asp Asp Gly Ile Pro Leu Ala Gly
            510                 515                 520

Val Phe Ala Trp Ser Phe Val Asp Asn Phe Glu Trp Ala Ser Gly Leu
            525                 530                 535

Glu Gln Arg Phe Gly Met Gln Phe Val Asn Tyr Thr Thr Leu Glu Arg
540                 545                 550                 555

Glu Tyr Lys Leu Ser Phe Leu Leu Tyr Arg Asp Phe Ile Glu Asn His
                560                 565                 570

Ser Cys Glu Asp
            575

<210> SEQ ID NO 23
<211> LENGTH: 1791
<212> TYPE: DNA
<213> ORGANISM: Artificial Sequence
<220> FEATURE:
<223> OTHER INFORMATION: Beta-galactosidase
<220> FEATURE:
<221> NAME/KEY: CDS
<222> LOCATION: (1)..(1791)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1788)

<400> SEQUENCE: 23 atg atg gtc gcg tgg tgg tct cta ttt ctg tac ggc ctt cag gtc gcg     48
Met Met Val Ala Trp Trp Ser Leu Phe Leu Tyr Gly Leu Gln Val Ala
        -20                 -15                 -10 gca cct gct ttg gct att ccc gct ttc cca atc act ccc gat ttg gcc     96
Ala Pro Ala Leu Ala Ile Pro Ala Phe Pro Ile Thr Pro Asp Leu Ala
 -5          -1   1               5                  10 gga ggc ctg gaa agc gtc aca aac acc caa acg tcc ctc cca tct gct    144
Gly Gly Leu Glu Ser Val Thr Asn Thr Gln Thr Ser Leu Pro Ser Ala
                15                  20                  25 tcc gct gtt tcc agc ccg tac aac caa gac gct ctt gat aag ctg tgg    192
Ser Ala Val Ser Ser Pro Tyr Asn Gln Asp Ala Leu Asp Lys Leu Trp
            30                  35                  40 gca gag gtt gag aag gat atc ccc gtt gaa aca cca tcc atc agc tct    240
Ala Glu Val Glu Lys Asp Ile Pro Val Glu Thr Pro Ser Ile Ser Ser
45                  50                  55 gtg gtc ccc gtg aac aac tcc ttc gcc gtg cct aag acg ccg acc ctc    288
Val Val Pro Val Asn Asn Ser Phe Ala Val Pro Lys Thr Pro Thr Leu
60                  65                  70                  75 ccg cgc tcc ctg cag gat cat gct act tcg ggg cgg aag ttc cca aaa    336
Pro Arg Ser Leu Gln Asp His Ala Thr Ser Gly Arg Lys Phe Pro Lys
                80                  85                  90 ggg ttc aag ttc gga gtt gcc act gcg gac cag cag tac gaa ggc gcc    384
Gly Phe Lys Phe Gly Val Ala Thr Ala Asp Gln Gln Tyr Glu Gly Ala
             95                 100                 105 gtc aag gcc gac ggc cgc ggg ccg agc cac tgg gat tac ctg tgc cac    432
Val Lys Ala Asp Gly Arg Gly Pro Ser His Trp Asp Tyr Leu Cys His
            110                 115                 120 cgg ctg cct cag caa tgc aac aac tac acc tct gac atc act gac ttg    480
Arg Leu Pro Gln Gln Cys Asn Asn Tyr Thr Ser Asp Ile Thr Asp Leu
```

-continued

|     | 125 |     |     |     | 130 |     |     |     | 135 |     |     |     |      |
|-----|-----|-----|-----|-----|-----|-----|-----|-----|-----|-----|-----|-----|------|
| gga | cgt | tac | tac | tac | aag | cag | gat | atc | gcc | cgg | atc | aag | gcc | atg | ggc | 528  |
| Gly | Arg | Tyr | Tyr | Tyr | Lys | Gln | Asp | Ile | Ala | Arg | Ile | Lys | Ala | Met | Gly |      |
| 140 |     |     |     |     | 145 |     |     |     | 150 |     |     |     | 155 |

```
gga cgt tac tac tac aag cag gat atc gcc cgg atc aag gcc atg ggc     528
Gly Arg Tyr Tyr Tyr Lys Gln Asp Ile Ala Arg Ile Lys Ala Met Gly
140             145                 150                 155 gtg aat act gtc tcg ctt acc ctg agc tgg tcg cgc atc aag ccc ttt     576
Val Asn Thr Val Ser Leu Thr Leu Ser Trp Ser Arg Ile Lys Pro Phe
            160                 165                 170 ggc act gct gac tcg cct gtt tcg aag gag ggt ttg cag ttc tac gat     624
Gly Thr Ala Asp Ser Pro Val Ser Lys Glu Gly Leu Gln Phe Tyr Asp
                175                 180                 185 gac ttc atc aac gaa ctc att gac aat gga atc gag cct gtt gtg aca     672
Asp Phe Ile Asn Glu Leu Ile Asp Asn Gly Ile Glu Pro Val Val Thr
            190                 195                 200 ctc ttc cat tgg tct acc cct ctg aat ctg gtg ttt gag tac ggt gcc     720
Leu Phe His Trp Ser Thr Pro Leu Asn Leu Val Phe Glu Tyr Gly Ala
            205                 210                 215 ttt ctc aac ggc agc agc gtg gaa gac ttt gcg tcc tat gca aag ctg     768
Phe Leu Asn Gly Ser Ser Val Glu Asp Phe Ala Ser Tyr Ala Lys Leu
220                 225                 230                 235 gtc ttc gaa cac ttt ggg gac cgc gtg aca acc ttc ctt acc ttc aac     816
Val Phe Glu His Phe Gly Asp Arg Val Thr Thr Phe Leu Thr Phe Asn
                240                 245                 250 gag ccg cgt gtg tac tgc agc gag tat acg ggc gaa ccc ttc aac gac     864
Glu Pro Arg Val Tyr Cys Ser Glu Tyr Thr Gly Glu Pro Phe Asn Asp
            255                 260                 265 tac tgg cat ttc ggt gga ccg aac atc aac gca acg acc gca ccc tat     912
Tyr Trp His Phe Gly Gly Pro Asn Ile Asn Ala Thr Thr Ala Pro Tyr
            270                 275                 280 cca tgc acg tac aac atc ctt aag gcg cat ggg cga gct gtt cag gag     960
Pro Cys Thr Tyr Asn Ile Leu Lys Ala His Gly Arg Ala Val Gln Glu
285                 290                 295 tat cgg gct ctg gtc aac tcg ggg aag atc aag aag ggt gaa gtt gca    1008
Tyr Arg Ala Leu Val Asn Ser Gly Lys Ile Lys Lys Gly Glu Val Ala
300                 305                 310                 315 atc aag aac gat gac tcc tac cct gtg ccc gtt aac cca gac tct gaa    1056
Ile Lys Asn Asp Asp Ser Tyr Pro Val Pro Val Asn Pro Asp Ser Glu
                320                 325                 330 gca gat gtt gaa gct gcg aaa cga cat ttc gac ttc tac atc ggc atc    1104
Ala Asp Val Glu Ala Ala Lys Arg His Phe Asp Phe Tyr Ile Gly Ile
            335                 340                 345 ttc tcg cag ccc atc tat ggc gat ggc aag ttc cct gat acc gtc cgc    1152
Phe Ser Gln Pro Ile Tyr Gly Asp Gly Lys Phe Pro Asp Thr Val Arg
            350                 355                 360 aac aca atc agc aca gaa ttc ctg cct tac ctc act gat gac gag aag    1200
Asn Thr Ile Ser Thr Glu Phe Leu Pro Tyr Leu Thr Asp Asp Glu Lys
365                 370                 375 gcc atg atc aag ggt tcc ggc gac ttc ttc gca atc gat gct tac cgc    1248
Ala Met Ile Lys Gly Ser Gly Asp Phe Phe Ala Ile Asp Ala Tyr Arg
380                 385                 390                 395 acc aac ctt gct cga gct gct cca aac gga atc cag gcc tgt gtt gcc    1296
Thr Asn Leu Ala Arg Ala Ala Pro Asn Gly Ile Gln Ala Cys Val Ala
            400                 405                 410 aac atc tcg gat ccg aat tgg ccg gtc tgt caa gac aac agc cct gaa    1344
Asn Ile Ser Asp Pro Asn Trp Pro Val Cys Gln Asp Asn Ser Pro Glu
            415                 420                 425 ggg cag tat cag acg atg gat ggc ttt gcc ttt ggc cca cca gcg gac    1392
Gly Gln Tyr Gln Thr Met Asp Gly Phe Ala Phe Gly Pro Pro Ala Asp
                430                 435                 440 cct aac gcg gcg tgg ctc tac gac acg agc ttc aag ctg cgg tat cag    1440
Pro Asn Ala Ala Trp Leu Tyr Asp Thr Ser Phe Lys Leu Arg Tyr Gln
```

```
Pro Asn Ala Ala Trp Leu Tyr Asp Thr Ser Phe Lys Leu Arg Tyr Gln
    445             450                 455 ctt aag act ctc aaa gag gcc ttc aac tac gac aag atc tac atc agc    1488
Leu Lys Thr Leu Lys Glu Ala Phe Asn Tyr Asp Lys Ile Tyr Ile Ser
460             465                 470                 475 gaa ttc ggt ttc gcc cga ccc tat gag tat ctg tat ccc tat ggt ttt    1536
Glu Phe Gly Phe Ala Arg Pro Tyr Glu Tyr Leu Tyr Pro Tyr Gly Phe
                480                 485                 490 gac gtt ctc tat gac aca gac cga gct atc tac tac cag gac tac atg    1584
Asp Val Leu Tyr Asp Thr Asp Arg Ala Ile Tyr Tyr Gln Asp Tyr Met
            495                 500                 505 gcc gag gca ctg gat gct atc cac gac gat ggt att cca ttg gcg ggt    1632
Ala Glu Ala Leu Asp Ala Ile His Asp Asp Gly Ile Pro Leu Ala Gly
        510                 515                 520 gtg ttc gct tgg tcc ttc gtc gac aac ttc gaa tgg gcg tcc ggc ctt    1680
Val Phe Ala Trp Ser Phe Val Asp Asn Phe Glu Trp Ala Ser Gly Leu
    525                 530                 535 gag caa cgc ttt ggc atg cag ttc gtc aac tac aca acc ctc gag cgc    1728
Glu Gln Arg Phe Gly Met Gln Phe Val Asn Tyr Thr Thr Leu Glu Arg
540             545                 550                 555 gag tac aag ctc tct ttc ctg ctg tat cgt gat ttc atc gag aat cat    1776
Glu Tyr Lys Leu Ser Phe Leu Leu Tyr Arg Asp Phe Ile Glu Asn His
                560                 565                 570 agc tgc gag gat taa                                                 1791
Ser Cys Glu Asp
            575

<210> SEQ ID NO 24
<211> LENGTH: 596
<212> TYPE: PRT
<213> ORGANISM: Artificial Sequence
<220> FEATURE:
<223> OTHER INFORMATION: Synthetic Construct

<400> SEQUENCE: 24

Met Met Val Ala Trp Trp Ser Leu Phe Leu Tyr Gly Leu Gln Val Ala
    -20             -15                 -10

Ala Pro Ala Leu Ala Ile Pro Ala Phe Pro Ile Thr Pro Asp Leu Ala
-5              -1  1               5                   10

Gly Gly Leu Glu Ser Val Thr Asn Thr Gln Thr Ser Leu Pro Ser Ala
            15                  20                  25

Ser Ala Val Ser Ser Pro Tyr Asn Gln Asp Ala Leu Asp Lys Leu Trp
        30                  35                  40

Ala Glu Val Glu Lys Asp Ile Pro Val Glu Thr Pro Ser Ile Ser Ser
    45                  50                  55

Val Val Pro Val Asn Asn Ser Phe Ala Val Pro Lys Thr Pro Thr Leu
60                  65                  70                  75

Pro Arg Ser Leu Gln Asp His Ala Thr Ser Gly Arg Lys Phe Pro Lys
                80                  85                  90

Gly Phe Lys Phe Gly Val Ala Thr Ala Asp Gln Tyr Glu Gly Ala
            95                  100                 105

Val Lys Ala Asp Gly Arg Gly Pro Ser His Trp Asp Tyr Leu Cys His
        110                 115                 120

Arg Leu Pro Gln Gln Cys Asn Asn Tyr Thr Ser Asp Ile Thr Asp Leu
    125                 130                 135

Gly Arg Tyr Tyr Tyr Lys Gln Asp Ile Ala Arg Ile Lys Ala Met Gly
140                 145                 150                 155

Val Asn Thr Val Ser Leu Thr Leu Ser Trp Ser Arg Ile Lys Pro Phe
```

```
              160                 165                 170
Gly Thr Ala Asp Ser Pro Val Ser Lys Glu Gly Leu Gln Phe Tyr Asp
            175                 180                 185
Asp Phe Ile Asn Glu Leu Ile Asp Asn Gly Ile Glu Pro Val Val Thr
            190                 195                 200
Leu Phe His Trp Ser Thr Pro Leu Asn Leu Val Phe Glu Tyr Gly Ala
            205                 210                 215
Phe Leu Asn Gly Ser Ser Val Glu Asp Phe Ala Ser Tyr Ala Lys Leu
220                 225                 230                 235
Val Phe Glu His Phe Gly Asp Arg Val Thr Thr Phe Leu Thr Phe Asn
                240                 245                 250
Glu Pro Arg Val Tyr Cys Ser Glu Tyr Thr Gly Glu Pro Phe Asn Asp
                255                 260                 265
Tyr Trp His Phe Gly Gly Pro Asn Ile Asn Ala Thr Ala Pro Tyr
            270                 275                 280
Pro Cys Thr Tyr Asn Ile Leu Lys Ala His Gly Arg Ala Val Gln Glu
            285                 290                 295
Tyr Arg Ala Leu Val Asn Ser Gly Lys Ile Lys Lys Gly Glu Val Ala
300                 305                 310                 315
Ile Lys Asn Asp Asp Ser Tyr Pro Val Pro Val Asn Pro Asp Ser Glu
                320                 325                 330
Ala Asp Val Glu Ala Ala Lys Arg His Phe Asp Phe Tyr Ile Gly Ile
            335                 340                 345
Phe Ser Gln Pro Ile Tyr Gly Asp Gly Lys Phe Pro Asp Thr Val Arg
            350                 355                 360
Asn Thr Ile Ser Thr Glu Phe Leu Pro Tyr Leu Thr Asp Asp Glu Lys
            365                 370                 375
Ala Met Ile Lys Gly Ser Gly Asp Phe Phe Ala Ile Asp Ala Tyr Arg
380                 385                 390                 395
Thr Asn Leu Ala Arg Ala Ala Pro Asn Gly Ile Gln Ala Cys Val Ala
                400                 405                 410
Asn Ile Ser Asp Pro Asn Trp Pro Val Cys Gln Asp Asn Ser Pro Glu
            415                 420                 425
Gly Gln Tyr Gln Thr Met Asp Gly Phe Ala Phe Gly Pro Pro Ala Asp
            430                 435                 440
Pro Asn Ala Ala Trp Leu Tyr Asp Thr Ser Phe Lys Leu Arg Tyr Gln
            445                 450                 455
Leu Lys Thr Leu Lys Glu Ala Phe Asn Tyr Asp Lys Ile Tyr Ile Ser
460                 465                 470                 475
Glu Phe Gly Phe Ala Arg Pro Tyr Glu Tyr Leu Tyr Pro Tyr Gly Phe
                480                 485                 490
Asp Val Leu Tyr Asp Thr Asp Arg Ala Ile Tyr Tyr Gln Asp Tyr Met
            495                 500                 505
Ala Glu Ala Leu Asp Ala Ile His Asp Gly Ile Pro Leu Ala Gly
            510                 515                 520
Val Phe Ala Trp Ser Phe Val Asp Asn Phe Glu Trp Ala Ser Gly Leu
            525                 530                 535
Glu Gln Arg Phe Gly Met Gln Phe Val Asn Tyr Thr Thr Leu Glu Arg
540                 545                 550                 555
Glu Tyr Lys Leu Ser Phe Leu Leu Tyr Arg Asp Phe Ile Glu Asn His
                560                 565                 570
Ser Cys Glu Asp
            575
```

<210> SEQ ID NO 25
<211> LENGTH: 30
<212> TYPE: DNA
<213> ORGANISM: Artificial Sequence
<220> FEATURE:
<223> OTHER INFORMATION: F1 primer
<220> FEATURE:
<221> NAME/KEY: misc_feature
<222> LOCATION: (21)..(21)
<223> OTHER INFORMATION: n is a, c, g, or t
<220> FEATURE:
<221> NAME/KEY: misc_feature
<222> LOCATION: (27)..(27)
<223> OTHER INFORMATION: n is a, c, g, or t
<220> FEATURE:
<221> NAME/KEY: misc_feature
<222> LOCATION: (30)..(30)
<223> OTHER INFORMATION: n is a, c, g, or t

<400> SEQUENCE: 25
gccggcgcgg ctathcargt ngarggngcn                                30

<210> SEQ ID NO 26
<211> LENGTH: 30
<212> TYPE: DNA
<213> ORGANISM: Artificial Sequence
<220> FEATURE:
<223> OTHER INFORMATION: F2 primer
<220> FEATURE:
<221> NAME/KEY: misc_feature
<222> LOCATION: (9)..(9)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t
<220> FEATURE:
<221> NAME/KEY: misc_feature
<222> LOCATION: (30)..(30)
<223> OTHER INFORMATION: n is a, c, g, or t

<400> SEQUENCE: 26
gtcaagacnt ggttyacntt yaaygarccn                                30

<210> SEQ ID NO 27
<211> LENGTH: 30
<212> TYPE: DNA
<213> ORGANISM: Artificial Sequence
<220> FEATURE:
<223> OTHER INFORMATION: R1 primer
<220> FEATURE:
<221> NAME/KEY: misc_feature
<222> LOCATION: (19)..(19)
<223> OTHER INFORMATION: n is a, c, g, or t

<400> SEQUENCE: 27
ctcggcccac ccraaytcns wraartadat                                30

<210> SEQ ID NO 28
<211> LENGTH: 27
<212> TYPE: DNA
<213> ORGANISM: Artificial Sequence
<220> FEATURE:
<223> OTHER INFORMATION: R2 primer
<220> FEATURE:
<221> NAME/KEY: misc_feature
<222> LOCATION: (16)..(16)
<223> OTHER INFORMATION: n is a, c, g, or t
<220> FEATURE:
<221> NAME/KEY: misc_feature
<222> LOCATION: (22)..(22)

```
<223> OTHER INFORMATION: n is a, c, g, or t

<400> SEQUENCE: 28
ccattcccar ttrtcnacra answcca                                              27

<210> SEQ ID NO 29
<211> LENGTH: 30
<212> TYPE: DNA
<213> ORGANISM: Artificial Sequence
<220> FEATURE:
<223> OTHER INFORMATION: C-R70 primer
<220> FEATURE:
<221> NAME/KEY: misc_feature
<222> LOCATION: (10)..(10)
<223> OTHER INFORMATION: n is a, c, g, or t

<400> SEQUENCE: 29
gacgaggccn swrttccayt craarttrtc                                           30
```

METHOD FOR PRODUCING SECRETED β-GALACTOSIDASE

TECHNICAL FIELD

The present invention relates to a method for producing a secreted β-galactosidase that is easily used in the production of a galactooligosaccharide.

BACKGROUND ART

A β-galactosidase is known to catalyze not only a reaction of hydrolyzing a β-D-galactoside bond in lactose or the like, but also a reaction of transferring a galactosyl group, and is used in the production of a galactooligosaccharide that selectively increases genus Bifidobacterium in the intestine.

The present applicant has reported a technique for producing a galactooligosaccharide using a β-galactosidase derived from an over-producing mutant strain of *Sporobolomyces singularis* that is a basidiomycetous yeast (PTL 1).

However, since the β-galactosidase used in the technique is a non-secreted (cell wall-binding) protein, it is necessary to use the β-galactosidase in the reaction as a cell concentrate containing cells of *Sporobolomyces singularis* that produces the β-galactosidase.

Since the cell concentrate includes viable cells, it is easily deteriorated, and moreover, it is obtained by merely concentrating the cells, the specific activity is low, and there is also a problem that the cell debris leaks out into the galactooligosaccharide reaction solution to increase the purification cost, or the like

CITATION LIST

Patent Literature

PTL 1: JP-A-2006-223268

SUMMARY OF INVENTION

Technical Problem

An object of the present invention is to provide a method for producing a β-galactosidase that solves the above-mentioned problems and is easily used in the production of a galactooligosaccharide.

Solution to Problem

As a result of intensive studies to solve the above-mentioned problems, the present inventors found that a secreted β-galactosidase is produced by integrating a non-secreted β-galactosidase gene derived from a basidiomycetous yeast into *Aspergillus oryzae* and that the secreted β-galactosidase is easily used in the production of a galactooligosaccharide, and thus completed the present invention.

That is, the present invention is directed to a method for producing a secreted β-galactosidase, characterized by integrating a non-secreted β-galactosidase gene derived from a basidiomycetous yeast into *Aspergillus oryzae* to produce a secreted β-galactosidase.

In addition, the present invention is directed to a non-secreted β-galactosidase gene derived from a basidiomycetous yeast, which is a sequence represented by SEQ ID NO: 7, 13, or 19.

Further, the present invention is directed to a transformant of *Aspergillus oryzae*, characterized in that a non-secreted β-galactosidase gene derived from a basidiomycetous yeast is integrated into *Aspergillus oryzae* to produce a secreted β-galactosidase.

Still further, the present invention is directed to a method for producing a galactooligosaccharide, characterized by allowing a β-galactosidase produced by the above-mentioned method for producing a β-galactosidase to react on a substrate containing at least lactose.

In addition, the present invention is directed to a secreted β-galactosidase, obtained by integrating a non-secreted β-galactosidase gene derived from a basidiomycetous yeast into *Aspergillus oryzae*, and culturing the resulting *Aspergillus oryzae*.

Advantageous Effects of Invention

According to the method for producing a secreted β-galactosidase of the present invention, a non-secreted β-galactosidase derived from a basidiomycetous yeast can be obtained as a secreted β-galactosidase.

Therefore, a β-galactosidase obtained by the method for producing a secreted β-galactosidase of the present invention has a high β-galactosidase activity and also high thermostability, and further is easily separated and purified, and is easily used in the production of a galactooligosaccharide.

DESCRIPTION OF EMBODIMENTS

Figure 1:
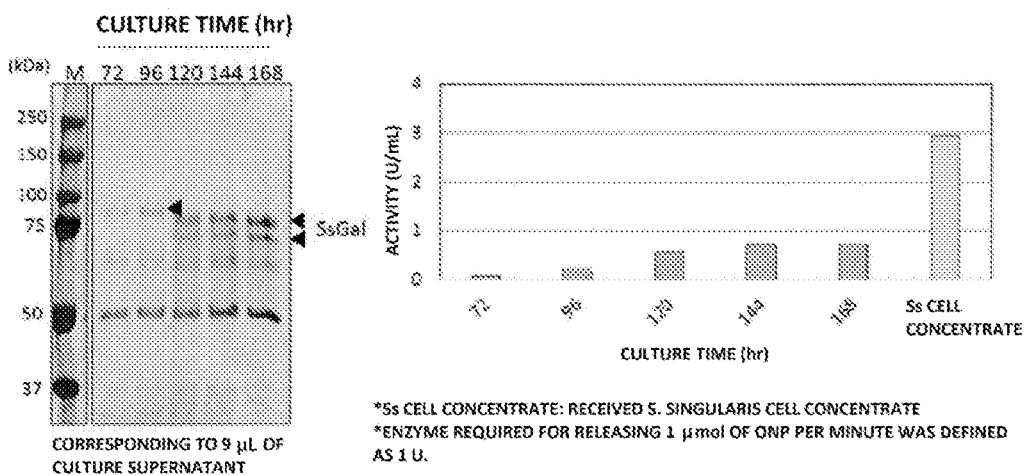
FIG. 1 is a view showing the results of SDS-PAGE and activity measurement using SsGal strain.
Figure 2:
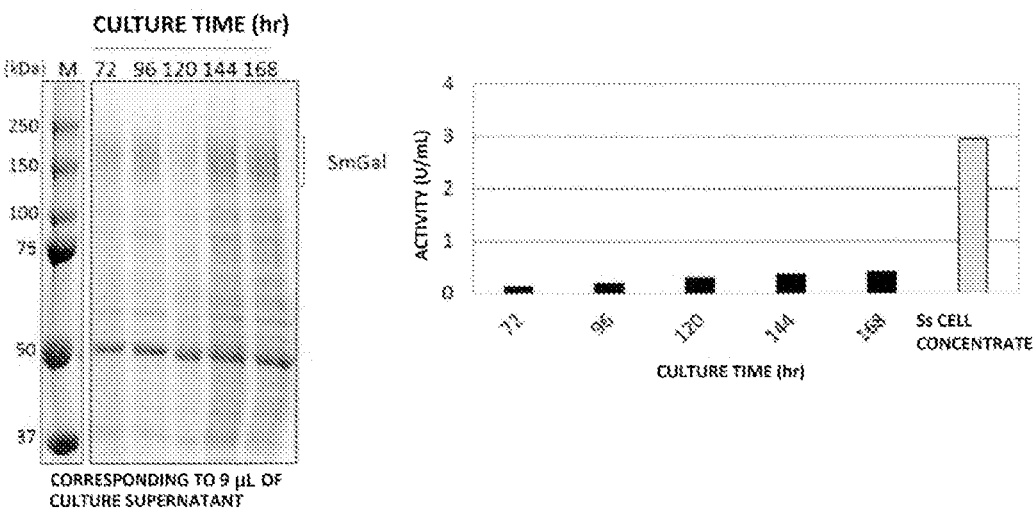
FIG. 2 is a view showing the results of SDS-PAGE and activity measurement using SmGal strain.
Figure 3:
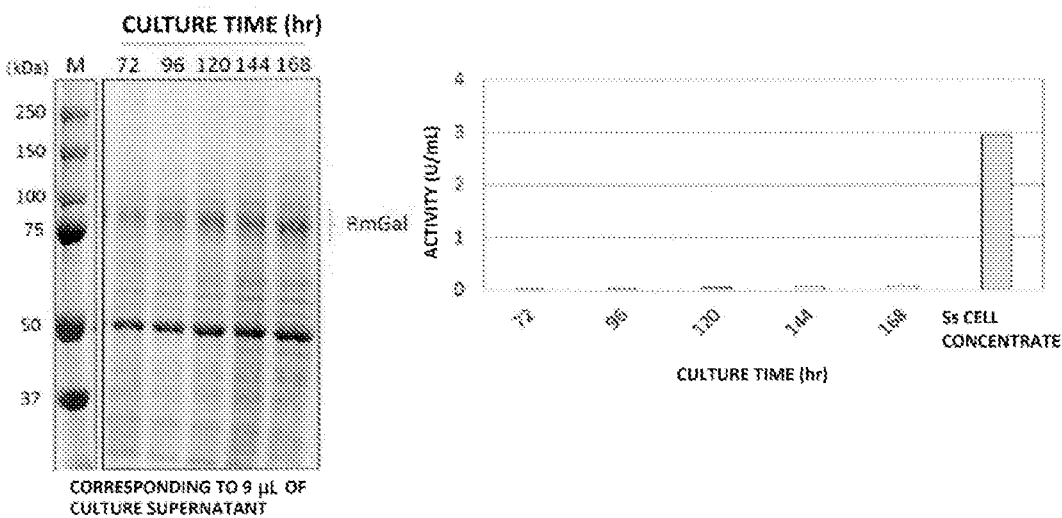
FIG. 3 is a view showing the results of SDS-PAGE and activity measurement using RmGal strain.
Figure 4:
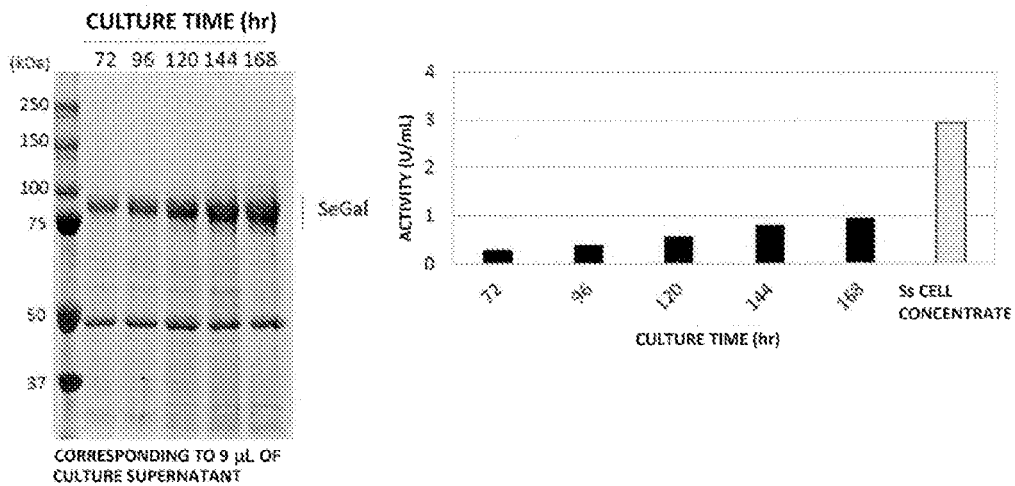
FIG. 4 is a view showing the results of SDS-PAGE and activity measurement using SeGal strain.
Figure 5:
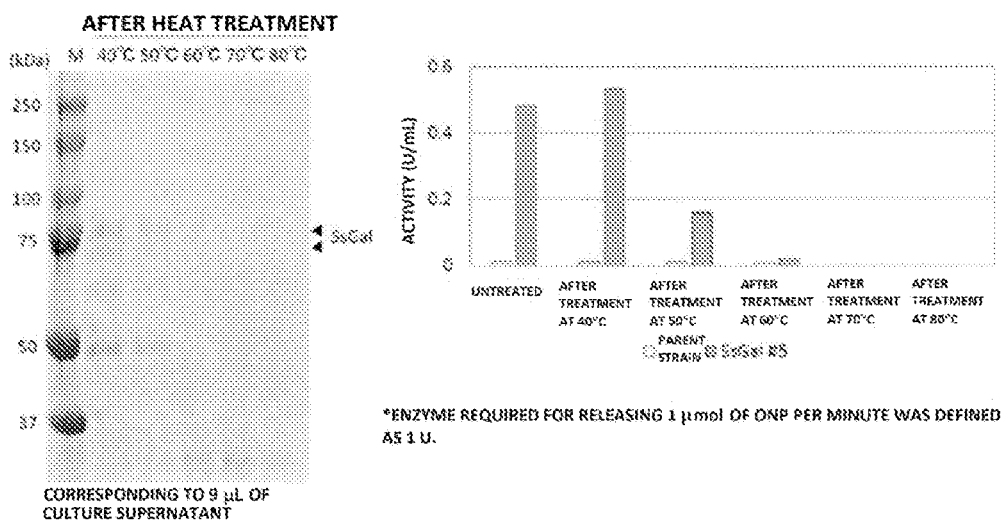
FIG. 5 is a view showing the results of SDS-PAGE and activity measurement (thermal inactivation) using SsGal strain.
Figure 6:
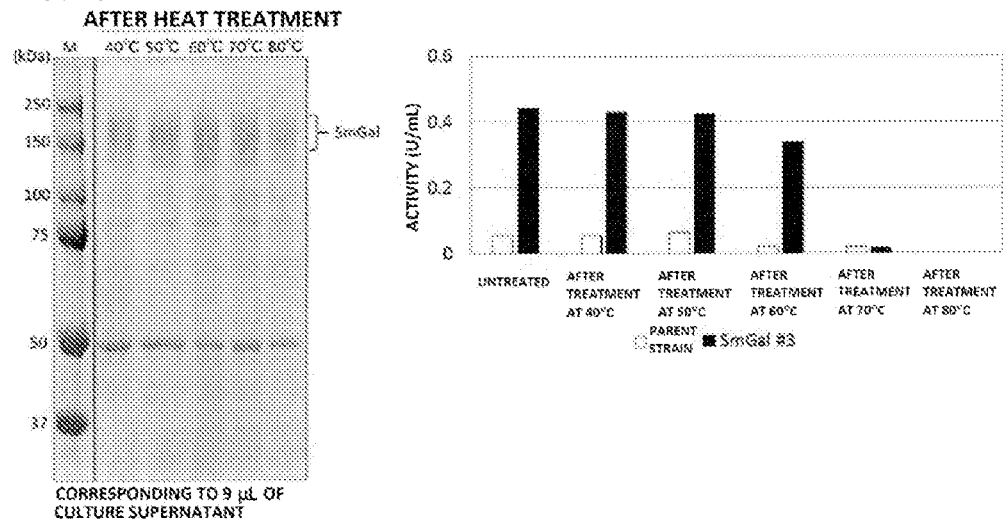
FIG. 6 is a view showing the results of SDS-PAGE and activity measurement (thermal inactivation) using SmGal strain.
Figure 7:
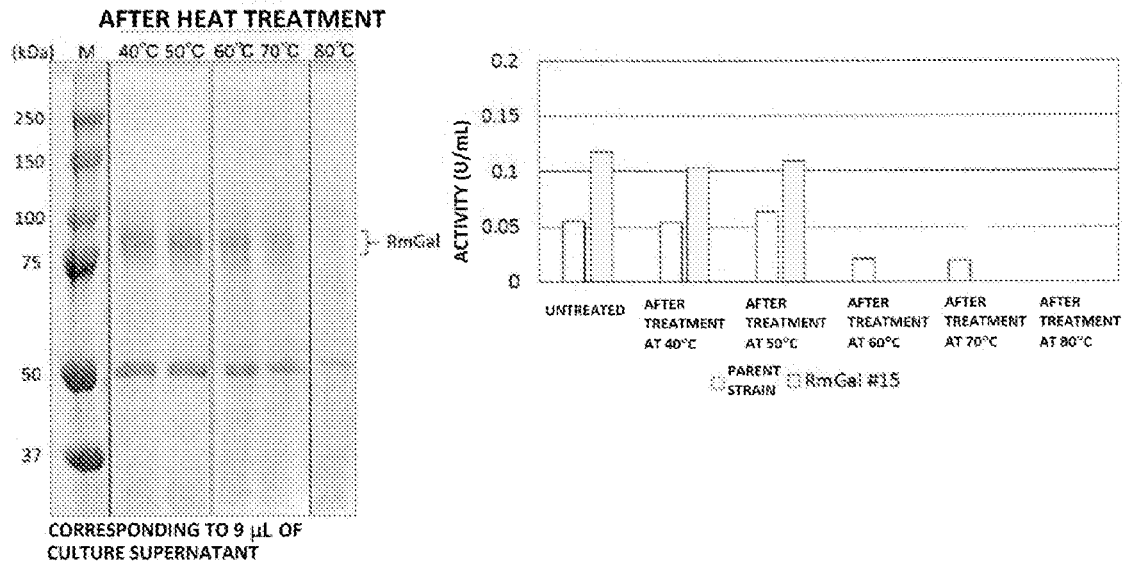
FIG. 7 is a view showing the results of SDS-PAGE and activity measurement (thermal inactivation) using RmGal strain.
Figure 8:
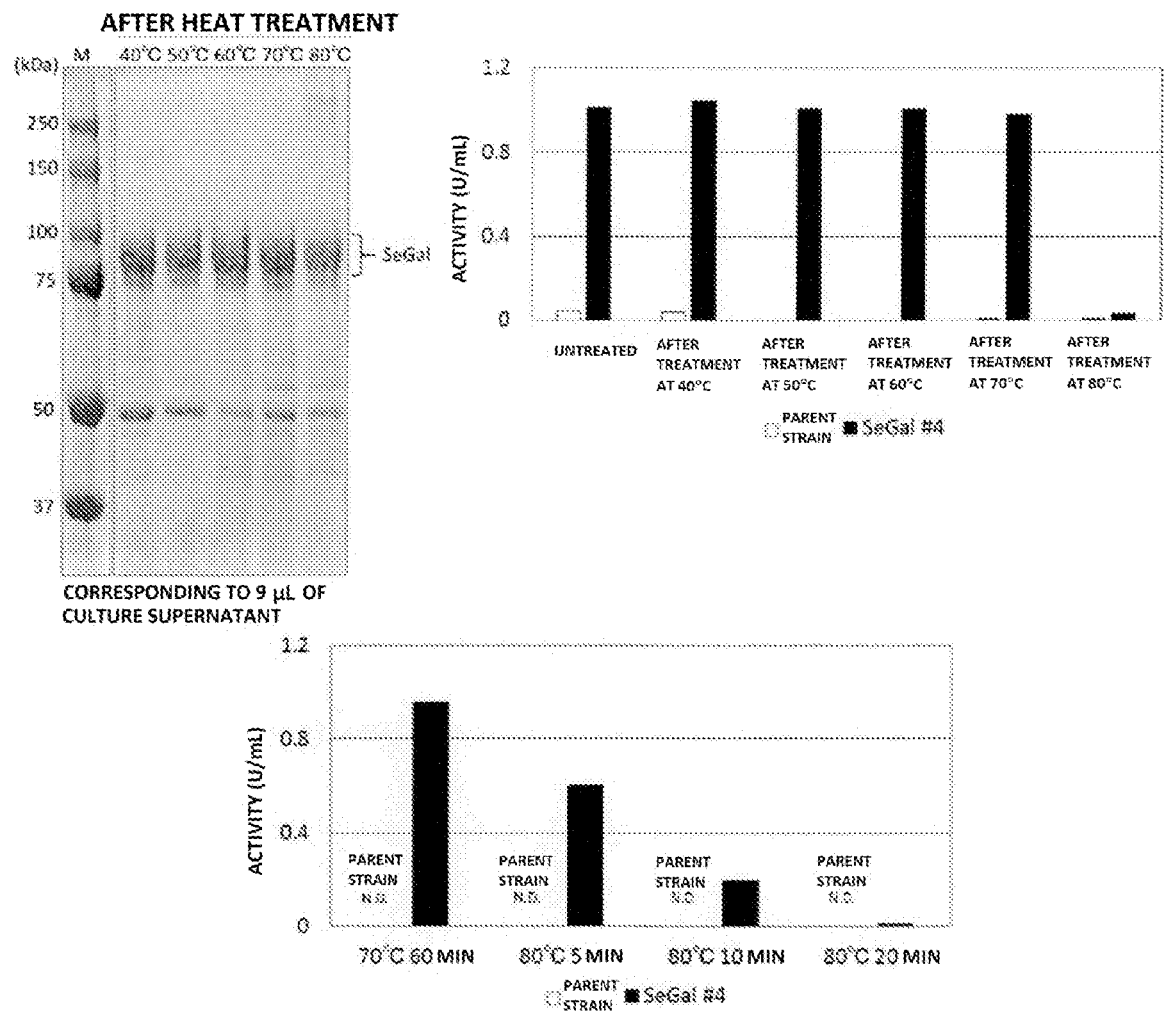
FIG. 8 is a view showing the results of SDS-PAGE and activity measurement (thermal inactivation) using SeGal strain.

The method for producing a secreted β-galactosidase of the present invention (hereinafter referred to as "the production method of the present invention") is a method including integrating a non-secreted β-galactosidase gene derived from a basidiomycetous yeast into *Aspergillus oryzae* to produce a secreted β-galactosidase.

The non-secreted β-galactosidase gene derived from a basidiomycetous yeast used in the production method of the present invention is a gene encoding a non-secreted β-galactosidase produced by a basidiomycetous yeast. Here, the "non-secreted" means to have cell wall binding affinity, which can be confirmed by activity staining or the like.

Further, the basidiomycetous yeast that produces a non-secreted β-galactosidase is not particularly limited, but examples thereof include basidiomycetous yeasts belonging to the genus *Sporobolomyces* such as *Sporobolomyces singularis*, the genus *Sirobasidium* such as *Sirobasidium magnum*, the genus *Rhodotorula* such as *Rodotorula minuta*, the genus *Sterigmatomyces* such as *Sterigmatomyces elviae*, the genus *Cryptococcus* such as *Cryptococcus laurentii*, and the like. Among these basidiomycetous yeasts, a yeast belonging to the genus *Sporobolomyces* or the genus *Sterigmatomyces* is preferred, and *Sporobolomyces singularis* or *Sterigmatomyces elviae* is more preferred.

Further, as the gene encoding a non-secreted β-galactosidase produced by a basidiomycetous yeast, first, a gene cloned from the above-mentioned basidiomycetous yeast that produces a non-secreted β-galactosidase according to a conventional method such as PCR is exemplified. Note that as the gene, a gene obtained by total synthesis in accordance with a host from the information of a gene obtained as described above is preferred.

Specifically, the following genes are exemplified. Note that in the genes, a signal sequence is also included.

- a β-galactosidase gene derived from *Sporobolomyces singularis* composed of a base sequence represented by SEQ ID NO: 1 (a sequence at positions 1 to 57 in the sequence is a signal sequence)
- a β-galactosidase gene derived from *Sirobasidium magnum* composed of a base sequence represented by SEQ ID NO: 7 (a sequence at positions 1 to 48 in the sequence is a signal sequence)
- a β-galactosidase gene derived from *Rodotorula minuta* composed of a base sequence represented by SEQ ID NO: 13 (a sequence at positions 1 to 57 in the sequence is a signal sequence)
- a β-galactosidase gene derived from *Sterigmatomyces elviae* composed of a base sequence represented by SEQ ID NO: 19 (a sequence at positions 1 to 57 in the sequence is a signal sequence)

Further, a preferred gene of the above-mentioned gene is a gene in which the signal sequence of each of the basidiomycetous yeasts is substituted with a signal sequence of *Aspergillus oryzae*. Examples of the signal sequence of *Aspergillus oryzae* include a secretory signal (TAA signal) sequence of α-amylase (Taka-amylase: TAA) of *Aspergillus oryzae* (Okazaki, F., Aoki, J., Tabuchi, S., Tanaka, T., Ogino, C., and Kondo, A., Efficient heterologous expression and secretion in *Aspergillus oryzae* of a llama variable heavy-chain antibody fragment V(HH) against EGFR. Appl Microbiol Biotechnol 96, 81-88 (2012)), and a secretory signal of lipase of Rhizopus oryzae (Hama, S., Tamalampudi, S., Shindo, N., Numata, T., Yamaji, H., Fukuda, H., and Kondo, A., Role of N-terminal 28-amino-acid region of Rhizopus oryzae lipase in directing proteins to secretory pathway of *Aspergillus oryzae*. Appl Microbiol Biotechnol 79, 1009-1018 (2008)). The substitution of such a signal sequence can be carried out according to a conventional method.

As a preferred gene among such β-galactosidase genes in which the signal sequence of each of the basidiomycetous yeasts is substituted with the signal sequence of *Aspergillus oryzae*, the following genes are exemplified. The sequences of these genes are each composed of a secretory signal (TAA signal) sequence of *Aspergillus oryzae* and a sequence encoding a native β-galactosidase.

- a β-galactosidase gene composed of a base sequence represented by SEQ ID NO: 3 (a sequence at positions 1 to 63 in the sequence is a secretory signal sequence)
- a β-galactosidase gene composed of a base sequence represented by SEQ ID NO: 9 (a sequence at positions 1 to 63 in the sequence is a secretory signal sequence)
- a β-galactosidase gene composed of a base sequence represented by SEQ ID NO: 15 (a sequence at positions 1 to 63 in the sequence is a secretory signal sequence)
- a β-galactosidase gene composed of a base sequence represented by SEQ ID NO: 21 (a sequence at positions 1 to 63 in the sequence is a secretory signal sequence)

Among the above-mentioned genes, a gene in which a codon of a sequence encoding a native β-galactosidase is changed within a range where the amino acid sequence of the β-galactosidase is not changed is preferred. As such a β-galactosidase gene, the following genes are exemplified. The sequences of these genes are each composed of a secretory signal (TAA signal) sequence of *Aspergillus oryzae* and a sequence in which a codon of a sequence encoding a native β-galactosidase is changed within a range where the amino acid sequence of the β-galactosidase is not changed.

- a β-galactosidase gene composed of a base sequence represented by SEQ ID NO: 5 (a sequence at positions 1 to 63 in the sequence is a secretory signal sequence)
- a β-galactosidase gene composed of a base sequence represented by SEQ ID NO: 11 (a sequence at positions 1 to 63 in the sequence is a secretory signal sequence)
- a β-galactosidase gene composed of a base sequence represented by SEQ ID NO: 17 (a sequence at positions 1 to 63 in the sequence is a secretory signal sequence)
- a β-galactosidase gene composed of a base sequence represented by SEQ ID NO: 23 (a sequence at positions 1 to 63 in the sequence is a secretory signal sequence)

Among the above-mentioned genes, aβ-galactosidase gene composed of a base sequence represented by SEQ ID NO: 5, 11, or 23 is preferred.

The *Aspergillus oryzae*, which is used in the production method of the present invention, and into which the β-galactosidase gene is integrated, is not particularly limited, but, for example, *Aspergillus oryzae* NS4 strain deficient in ATP sulfurylase gene (sC) and nitrate reductase gene (niaD) (available from the National Research Institute of Brewing, 3-7-1, Kagamiyama, Higashihiroshima-shi, Hiroshima, 739-0046), *Aspergillus oryzae* nia D300, *Aspergillus oryzae* RIB40, and *Aspergillus oryzae* ATCC 11488 are exemplified. Among these, *Aspergillus oryzae* NS4 strain is preferred.

In the production method of the present invention, a method for integrating the above-mentioned gene into *Aspergillus oryzae* is not particularly limited, but for example, the above-mentioned gene need only be integrated into an expression vector by a conventional method. The type of the expression vector is not particularly limited, but an expression vector derived from *Aspergillus oryzae* is preferred, and in particular, a high expression vector containing an improved promoter using cis-element (Region III)

involved in the regulation of expression of amylase genes (Improvement of the *Aspergillus* oryzae Enolase Promoter by the Introduction of cis-Element, Tsuboi, H. et al., Biosci. Biotechnol. Biochem., 69, 206-208 (2005)) and a 5'UTR sequence with high translation efficiency (Japanese Patent No. 4413557) is preferred. Further, in such a vector, an antibiotic resistance gene such as ampicillin may be integrated for selection of a transformant, or an ATP sulfurylase expression cassette or the like may be integrated as a marker.

The above-mentioned expression vector may be prepared based on the method described in the above-mentioned document, or, for example, may be produced by Contract Protein Expression Service of Ozeki Co., Ltd. (4-9, Imazu-dezaike-cho, Nishinomiya-shi, Hyogo, 663-8227).

After integrating the gene into the expression vector, the expression vector is integrated into *Aspergillus oryzae* to transform *Aspergillus oryzae*. A method for transforming *Aspergillus oryzae* is not particularly limited, and for example, the transformation may be carried out by a conventional method such as a protoplast-PEG method or an electroporation method. After the transformation, washing, selection, cell collection, and the like may be appropriately performed according to a conventional method.

In this manner, a transformant of *Aspergillus oryzae* that produces a secreted β-galactosidase can be obtained by introducing a non-secreted β-galactosidase gene derived from a basidiomycetous yeast into *Aspergillus oryzae*. By appropriately culturing the transformant in DPY medium, CDD medium, or the like, a secreted β-galactosidase is produced from *Aspergillus oryzae*.

Since the β-galactosidase obtained above is a secreted protein, and therefore, in the purification, for example, it is only necessary to separate the culture solution after culture by filtration, centrifugation, or the like, and collect the supernatant. Further, it is also possible to concentrate the supernatant using an ultrafilter or the like. The β-galactosidase has characteristics that the β-galactosidase activity is high, the thermostability is also high, and the content of impurities is low.

Preferred examples of the amino acid sequence of such a secreted β-galactosidase include the following sequences.

a β-galactosidase derived from *Sporobolomyces singularis* composed of an amino acid sequence represented by SEQ ID NO: 2 (a sequence at positions 1 to 575 in the sequence) (the same applies to amino acid sequences represented by SEQ ID NOS: 4 and 6 (a sequence at positions 1 to 575 in each of the sequences))

a β-galactosidase derived from *Sirobasidium magnum* composed of an amino acid sequence represented by SEQ ID NO: 8 (a sequence at positions 1 to 685 in the sequence) (the same applies to amino acid sequences represented by SEQ ID NOS: 10 and 12 (a sequence at positions 1 to 685 in each of the sequences))

a β-galactosidase derived from *Rodotorula minuta* composed of an amino acid sequence represented by SEQ ID NO: 14 (a sequence at positions 1 to 581 in the sequence) (the same applies to amino acid sequences represented by SEQ ID NOS: 16 and 18 (a sequence at positions 1 to 581 in each of the sequences))

aβ-galactosidase derived from *Sterigmatomyces elviae* composed of an amino acid sequence represented by SEQ ID NO: 20 (a sequence at positions 1 to 581 in the sequence) (the same applies to amino acid sequences represented by SEQ ID NOS: 22 and 24 (a sequence at positions 1 to 581 in each of the sequences))

Among the above-mentioned β-galactosidases, the β-galactosidase derived from *Sporobolomyces singularis* composed of the amino acid sequence represented by SEQ ID NO: 2, the β-galactosidase derived from *Sirobasidium magnum* composed of the amino acid sequence represented by SEQ ID NO: 8, or the β-galactosidase derived from *Sterigmatomyces elviae* composed of the amino acid sequence represented by SEQ ID NO: 20 is preferred.

The β-galactosidase has a property of being secreted outside the cell, and also has a property of having favorable thermostability and storage stability without lowering the β-galactosidase activity even if it is stored for a longtime. Note that the β-galactosidase activity can be confirmed by the method described in the below-mentioned Examples. In general, in order to efficiently produce a galactooligosaccharide, a plurality of β-galactosidases are sometimes used, however, the β-galactosidase obtained above can efficiently produce a galactooligosaccharide even by itself.

The β-galactosidase obtained above can be used, for example, in the production of a galactooligosaccharide by allowing the β-galactosidase to act on a substrate containing at least lactose in the same manner as a conventionally known β-galactosidase. Note that the β-galactosidase is a secreted protein, and therefore, it is also not necessary to particularly remove cells or the like when producing a galactooligosaccharide.

Specifically, in order to allow the β-galactosidase obtained above to act on a substrate containing at least lactose, it is only necessary to add the β-galactosidase to the substrate containing at least lactose and maintain a predetermined temperature. The addition amount of the β-galactosidase is not particularly limited, but is, for example, from 1 to 50 U, and preferably from 5 to 10 U with respect to 100 g of lactose. In addition, the temperature at which the β-galactosidase is allowed to act on the substrate is not particularly limited, but is from 30 to 90° C., and preferably from 60 to 90° C., and the maintenance time may only be set as appropriate. To the substrate containing at least lactose, a saccharide to be galactosylated may be added. Such a saccharide is not particularly limited, and examples thereof include galactose, mannose, ribose, xylose, arabinose, rhamnose, N-acetylglucosamine, α-methylmannoside, α-methylgalactoside, α-methylglucoside, 2-deoxyglucose, and 2-deoxygalactose.

The galactooligosaccharide produced as described above contains a galactooligosaccharide that is a pentasaccharide or a lower saccharide, particularly a galactooligosaccharide that is a trisaccharide in a large amount.

Further, the galactooligosaccharide produced as described above may be as it is, but may be separated and purified using a general purification method. The purification method is not particularly limited, but specifically, purification can be carried out by subjecting the galactooligosaccharide to various types of chromatography such as ion exchange, gel filtration, activated carbon, and affinity chromatography.

The thus obtained galactooligosaccharide can be used in useful food materials, pharmaceutical raw materials, and reagents.

EXAMPLES

Hereinafter, the present invention will be described in detail with reference to Examples, however, the present invention is by no means limited to these Examples.

The deposit numbers of the basidiomycetous yeasts used in these Examples are as follows.

*Sporobolomyces singularis* ATCC 24193
*Rodotorula minuta* CBS 319
*Sterigmatomyces elviae* IFO 1843
*Sirobasidium magnum* CBS 6803
ATCC: 10801 University Boulevard Manassas, VA 20110 USA
CBS: Uppsalalaan 8, 3584 CT, Utrecht, The Netherlands
IFO: 2-17-85 Jusohonmachi, Yodogawa-ku, Osaka-shi 532-8686

Example 1

Acquisition of β-Galactosidase Gene Derived from *Sporobolomyces Singularis*:

A β-galactosidase gene derived from *Sporobolomyces singularis* was obtained based on the literature (Ishikawa, E., Sakai, T., Ikemura, H., Matsumoto, K., and Abe, H., Identification, cloning, and characterization of a *Sporobolomyces singularis* beta-galactosidase-like enzyme involved in galacto-oligosaccharide production. J Biosci Bioeng 99, 331-339 (2005)) (SEQ ID NO: 1). The gene is composed of a signal sequence and a sequence encoding a β-galactosidase. A sequence (SEQ ID NO: 3) in which the signal sequence of the gene was substituted with the TAA signal sequence of *Aspergillus oryzae* was obtained on a computer, and further, a sequence (SEQ ID NO: 5) in which a codon of a sequence encoding a native β-galactosidase was changed within a range where the amino acid sequence of the β-galactosidase is not changed was obtained (SsGal). The SsGal was contracted out to GenScript, Inc. and totally synthesized.

Example 2

Acquisition of β-Galactosidase Gene Derived from *Sirobasidium Magnum*:

Degenerate primers (Table 1) (SEQ ID NOS: 25 to 29) were designed from a conserved region, and partial sequences were cloned through RT-PCR in six combinations in total using 2 types of forward primers and 3 types of reverse primers. From the partial sequences, 5' RACE and 3' RACE were performed, whereby a full-length cDNA was obtained.

TABLE 1

| SEQ ID NO | Name | Direction | Base sequence of degenerate primer |
|---|---|---|---|
| 25 | F1 | forward | gccggcgcggctathcargtngarggngcn |
| 26 | F2 | forward | gtcaagacntggttyacnttyaaygarccn |
| 27 | R1 | reverse | ctcggcccacccraaytcnswraartadat |
| 28 | R2 | reverse | ccattcccarttrtcnacraanswcca |
| 29 | C-R70reverse | | gacgaggccnswrttccaytcraarttrtc |

Based on the above-prepared full-length cDNA, a β-galactosidase gene derived from *Sirobasidium magnum* (SEQ ID NO: 7) was obtained by analogy from the start codon (ATG) in the upstream region. The gene is composed of a signal sequence and a sequence encoding a β-galactosidase. A sequence (SEQ ID NO: 9) in which the signal sequence of the gene was substituted with the TAA signal sequence of *Aspergillus oryzae* was obtained on a computer, and further, a sequence (SEQ ID NO: 11) in which a codon of a sequence encoding a native β-galactosidase was changed within a range where the amino acid sequence of the β-galactosidase is not changed was obtained (SmGal). The SmGal was contracted out to GenScript, Inc. and totally synthesized.

Example 3

Acquisition of β-Galactosidase Gene Derived from *Rodotorula Minuta*:

A β-galactosidase gene derived from *Rodotorula minuta* (SEQ ID NO: 13) was obtained in the same manner as the β-galactosidase gene derived from *Sirobasidium magnum*. The gene is composed of a signal sequence and a sequence encoding a β-galactosidase. A sequence (SEQ ID NO: 15) in which the signal sequence of the gene was substituted with the TAA signal sequence of *Aspergillus oryzae* was obtained on a computer, and further, a sequence (SEQ ID NO: 17) in which a codon of a sequence encoding a native β-galactosidase was changed within a range where the amino acid sequence of the β-galactosidase is not changed was obtained (RmGal). The RmGal was contracted out to GenScript, Inc. and totally synthesized.

Example 4

Acquisition of β-Galactosidase Gene Derived from *Sterigmatomyces Elviae*:

A β-galactosidase gene of *Sterigmatomyces elviae* (SEQ ID NO: 19) was obtained in the same manner as the β-galactosidase gene derived from *Sirobasidium magnum*. The gene is composed of a signal sequence and a sequence encoding a β-galactosidase. A sequence (SEQ ID NO: 21) in which the signal sequence of the gene was substituted with the TAA signal sequence of *Aspergillus oryzae* was obtained on a computer, and further, a sequence (SEQ ID NO: 23) in which a codon of a sequence encoding a native β-galactosidase was changed within a range where the amino acid sequence of the β-galactosidase is not changed was obtained (SeGal). The SeGal was contracted out to GenScript, Inc. and totally synthesized.

Example 5

Acquisition of SsGal Transformant

The SsGal obtained in Example 1 was sent to Contract Protein Expression Service of Ozeki Co., Ltd. (4-9, Imazu-dezaike-cho, Nishinomiya-shi, Hyogo, 663-8227), and integrated into an expression vector.

As a host for transformation, NS4 strain that is a strain derived from *Aspergillus oryzae* and deficient in nitrate reductase gene (niaD) and ATP sulfurylase gene (sC) (obtained from the National Research Institute of Brewing, 3-7-1, Kagamiyama, Higashihiroshima-shi, Hiroshima, 739-0046) was used, and the expression vector was integrated into the host by a protoplast-PEG method, whereby a transformant was obtained (SsGal strain). Note that selection of the transformant was performed based on the complementation of trait of sC deficiency.

Example 6

Acquisition of SmGal Transformant

A transfected expression vector and a transformant (SmGal strain) were obtained in the same manner as in Example 5 except that the SmGal obtained in Example 2 was used.

Example 7

Acquisition of RmGal Transformant

A transfected expression vector and a transformant (RmGal strain) were obtained in the same manner as in Example 5 except that the RmGal obtained in Example 3 was used.

Example 8

Acquisition of SeGal Transformant

A transfected expression vector and a transformant (SeGal strain) were obtained in the same manner as in Example 5 except that the SeGal obtained in Example 4 was used.

Example 9

Evaluation of Production of β-Galactosidase by Transformant (1) Activity Measurement Among the respective transformants obtained in Examples 5 to 8, the SsGal strain was cultured in CDD medium (2% dextrin, 0.2% glucose, 0.2% $NH_4Cl$, 0.002% KCl, 0.001% $K_2HPO_4$, 0.0005% $MgSO_4 \cdot 7H_2O$, $2 \times 10^{-5}$% $CuSO_4 \cdot 5H_2O$, $1 \times 10^{-5}$% $FeSO_4 \cdot 7H_2O$, $1 \times 10^{-6}$% $ZnSO_4 \cdot 7H_2O$, $1 \times 10^{-6}$% $MnSO_4 \cdot 5H_2O$, $1 \times 10^{-6}$% $AlCl_3$, 200 mM MOPS-NaOH buffer pH 7.0) at 30° C. for 144 hours (15 mL/100 mL volume Erlenmeyer flask scale). The RmGal strain was cultured in 2XDPY medium (4% dextrin, 2% hipolypepton, 2% yeast extract, 1% $KH_2PO_4$, 0.1% $MgSO_4 \cdot 7H_2O$) at 30° C. for 144 hours (150 mL/500 mL volume long-neck shake flask scale). The SmGal strain was cultured in 2×DPY medium at 30° C. for 168 hours (150 mL/500 mL volume long-neck shake flask scale). The SeGal strain was cultured in DPY medium (2% dextrin, 1% hipolypepton, 1% yeast extract, 0.5% $KH_2PO_4$, 0.05% $MgSO_4 \cdot 7H_2O$) at 30° C. for 168 hours. The culture supernatant was recovered, and mixed with an equivalent amount of 2× sample buffer (125 mM.Tris-HCl (pH 6.8), 20% glycerol, 0.01% bromophenol blue, 4% SDS, 200 mM DTT), and the resulting mixture was treated at 100° C. for 10 minutes and then subjected to SDS-PAGE (CBB staining).

Further, the activity measurement was performed according to the following method using ONPG as the substrate. A solution was prepared by adding 2-nitrophenyl-β-galactoside (ONPG) to a 50 mM citrate phosphate buffer solution (pH 4.0) to give a concentration of 12.5 mM. To 0.8 mL of the solution, 0.2 mL of the culture supernatant containing the β-galactosidase diluted with a 50 mM citrate phosphate buffer solution (pH 4.0) so that the absorbance at 420 nm was 0.2 to 0.8 was added and allowed to react at 30° C. for 10 minutes (test solution). After stopping the reaction by adding 4 mL of a 0.25 M sodium carbonate solution, centrifugation (3,000 g, 10 minutes) was performed, and the amount of released 2-nitrophenol contained in the supernatant was determined by measuring the absorbance at 420 nm using a spectrophotometer. On the other hand, a solution obtained by adding a 50 mM citrate phosphate buffer solution (pH 4.0) to a 2-nitrophenyl-β-galactoside solution was used as a reagent blank, and a solution obtained by adding a sodium carbonate solution thereto in advance, and then, adding and mixing the culture supernatant containing the β-galactosidase therewith, and at the same time, stopping the reaction and performing color development was defined as a reaction initial solution (blind sample). One unit (U) of enzyme activity was defined as the amount of enzyme that releases 1 μmol of 2-nitrophenol per minute under the conditions, and calculated according to the following formula.

$$\text{Activity value (U/mL)} = [\{(\text{absorbance of test solution}) - (\text{absorbance of reagent blank}) - (\text{absorbance of blind sample})\} / \{0.91 (\text{extinction coefficient of 2-nitrophenol}) \times 0.2 \times 10\}] \times \text{dilution factor}$$ [Math. 1]

The results of SDS-PAGE and activity measurement are shown in FIGS. 1 to 4. By the CBB staining, in each of the RmGal strain, the SmGal strain, and the SeGal strain, a specific band that is not present in the parent strain was detected, and the band was presumed to be the β-galactosidase of each strain. In the SsGal strain, a specific band was not observed in the DPY medium, but when the strain was cultured in the CDD (pH 7.0) medium, a specific band that is not present in the parent strain was detected, and the band was presumed to be the β-galactosidase. The culture conditions in which the secretory productivity of each β-galactosidase becomes high were studied. As a result, the maximum activity was obtained under the conditions that the SsGal strain was cultured in CDD (pH 7.0) medium at 30° C. for 144 hours, the RmGal strain was cultured in 2× DPY medium at 30° C. for 144 hours, the SmGal strain was cultured in 2× DPY medium at 30° C. for 168 hours, and the SeGal strain was cultured in DPY medium at 30° C. for 168 hours. Further, the productivities of the SsGal strain, the RmGal strain, the SmGal strain, and the SeGal strain were estimated to be about 200 mg/L, about 200 mg/L, about 200 mg/L, and about 1 g/L, respectively, based on the concentrations of the bands of SDS-PAGE.

(2) Estimation of Copy Number

Further, estimation of the number of expression cassettes integrated into the transformant was performed by a real-time PCR method.

From the results of the PCR, it was estimated that the SsGal strain, the RmGal strain, and the SmGal strain are each a strain in which one copy of expression cassette was inserted, and the SeGal strain is a strain in which two copies of expression cassettes were inserted.

(3) Thermal Inactivation Test 1 mL of each of the culture solutions of the respective transformants and the parent strain (NS4 strain) cultured under the culture conditions described in (1) was incubated at 40° C., 50° C., 60° C., 70° C., or 80° C. for 1 hour, and the measurement of enzyme activity and SDS-PAGE were performed.

The results of SDS-PAGE and activity measurement are shown in FIGS. 5 to 8. The SsGal strain maintained its activity up to 40° C., but when the SsGal strain was incubated at 50° C. for 1 hour, the activity was decreased by about 70%, and the activity was lost at 70° C. The activity of the parent strain cultured under the same conditions was slightly detected up to 60° C., and lost at 70° C. The RmGal strain maintained its activity up to 50° C., but when the RmGal strain was incubated at 60° C. for 1 hour, the activity was lost. The activity of the parent strain cultured under the same conditions was detected up to 70° C., and lost at 80° C. The SmGal strain maintained its activity up to 50° C., but when the SmGal strain was incubated at 60° C. for 1 hour, the activity was decreased by about 20%, and the activity was lost at 80° C. The activity of the parent strain cultured under the same conditions was detected up to 70° C., and lost at 80° C. The SeGal strain maintained its activity up to 70° C. When the SeGal strain was incubated at 80° C. for 1 hour, the activity was decreased by about 97%. The activity of the parent strain cultured under the same conditions was detected up to 40° C., and lost at 50° C. Further, with respect to the SeGal, a treatment at 80° C. was performed in a shorter time (5 minutes, 10 minutes, and 20 minutes) than 1 hour. As a result, the activity was decreased by about 37% by performing the treatment at 80° C. for 5 minutes, and decreased by about 98% by performing the treatment for 20 minutes. In addition, as a result of the activity measurement, all the strains exhibited a higher activity than the parent strain when being treated at 40° C. and 50° C.

From the above results, it was found that the SeGal strain can maintain its activity even at high temperature.

Example 10

Figure 9:
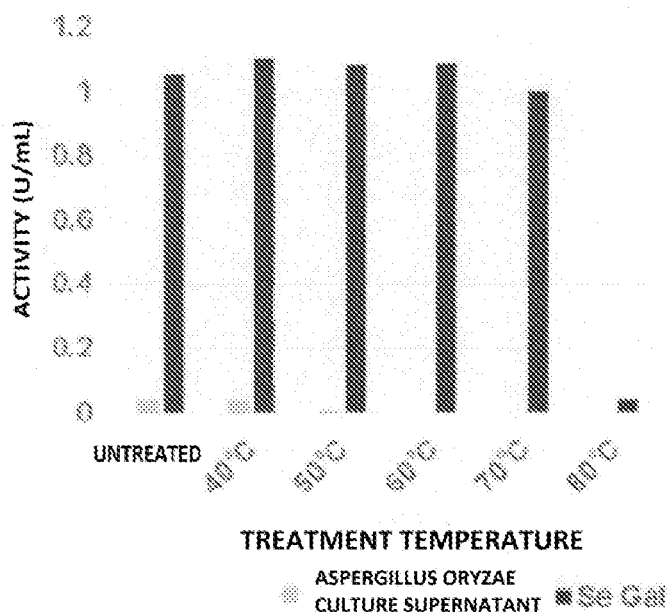
FIG. 9 is a view showing the results of activity measurement after a heat treatment using SeGal strain and a parent strain.

Removal of Contaminant Enzymes:

As shown in Example 9(3), it was found that the SeGal strain can maintain its activity even at high temperature. On the other hand, when a thermal inactivation test was performed in the same manner as in Example 9(3) for contaminant enzymes come from *Aspergillus oryzae* that is the parent strain of the SeGal strain, the contaminant enzymes could be inactivated by a heat treatment at 70° C. Therefore, it was found that the β-galactosidase produced by the SeGal strain can be purified by a heat treatment (FIG. 9).

Example 11

Figure 10:
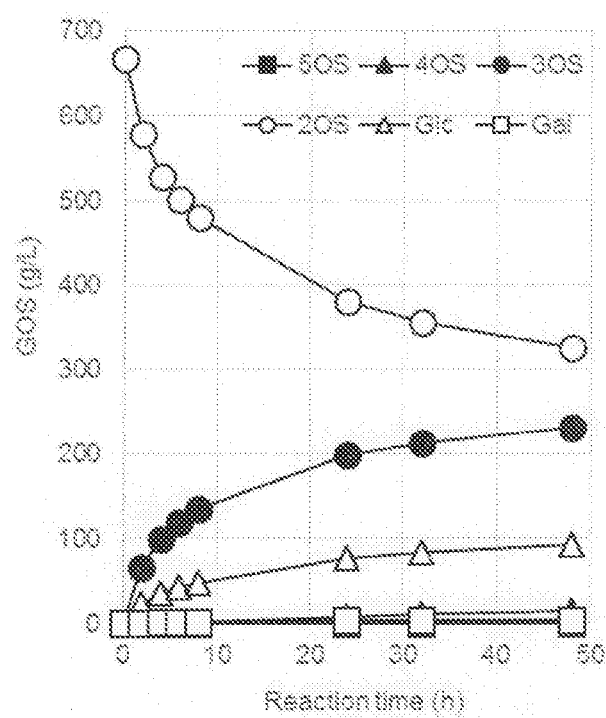
FIG. 10 is a view showing a reaction time and a sugar composition in a solution in the production of a galactooligosaccharide using SsGal strain.
Figure 11:
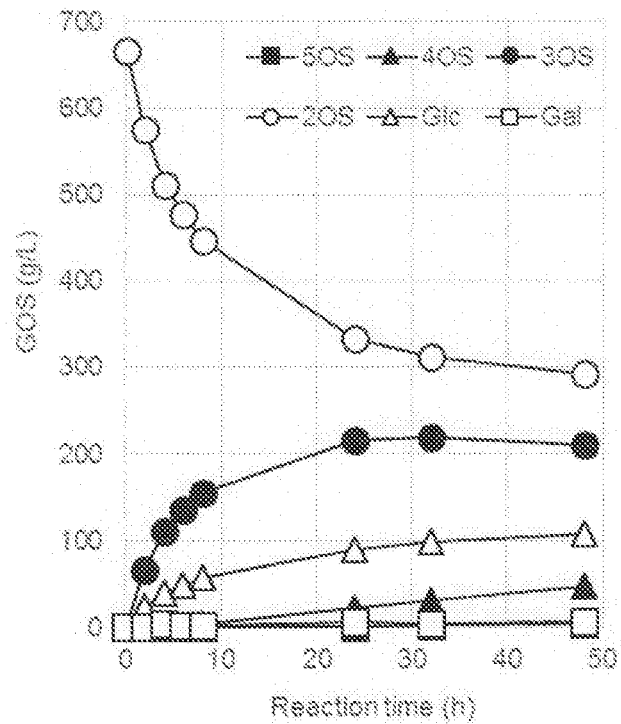
FIG. 11 is a view showing a reaction time and a sugar composition in a solution in the production of a galactooligosaccharide using SmGal strain.
Figure 12:
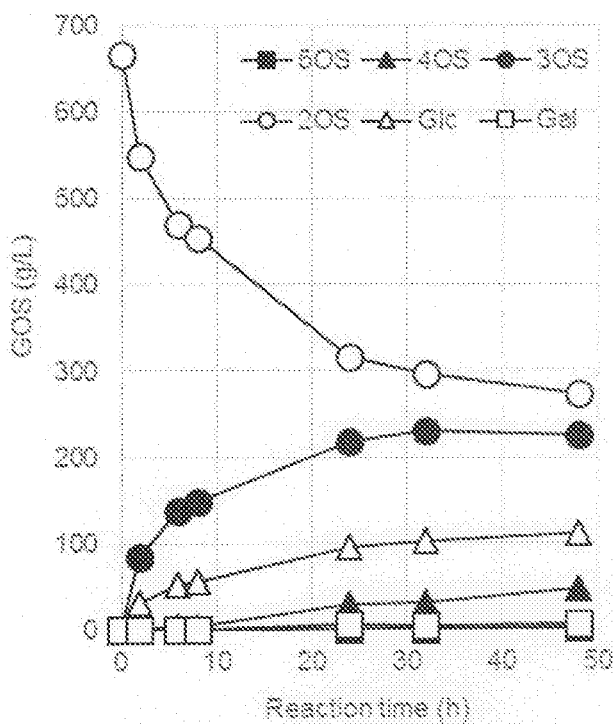
FIG. 12 is a view showing a reaction time and a sugar composition in a solution in the production of a galactooligosaccharide using SeGal strain.

Production of Galactooligosaccharide (1):

To 150 mL of a solution containing 66% (w/v) lactose, each of the culture supernatants of the SsGal strain, the SmGal strain, and the SeGal strain obtained in Example 9 in an amount corresponding to 10 U was added, and allowed to react at a predetermined temperature for a predetermined time, whereby a galactooligosaccharide was produced. The sugar composition and amount were measured by high-performance liquid chromatography. The reaction time and the sugar composition in the solution are shown in FIGS. 10 to 12 (FIG. 10: SsGal strain, FIG. 11: SmGal strain, FIG. 12: SeGal strain).

From the drawings, it was found that by the β-galactosidases produced by the SsGal strain, the SmGal strain, and the SeGal strain, a galactooligosaccharide that is a trisaccharide can be mainly produced from lactose.

Further, when a galactooligosaccharide was produced using the β-galactosidase produced by the SsGal strain, the galactooligosaccharide content was 56.0%, when a galactooligosaccharide was produced using the β-galactosidase produced by the SmGal strain, the galactooligosaccharide content was 66.7%, and when a galactooligosaccharide was produced using the β-galactosidase produced by the SeGal strain, the galactooligosaccharide content was 68.5%.

Note that the above-mentioned β-galactosidases were secreted proteins, and therefore, it is not necessary to treat the cells after producing the galactooligosaccharide, and the galactooligosaccharide can be efficiently produced.

Example 12

Figure 13:
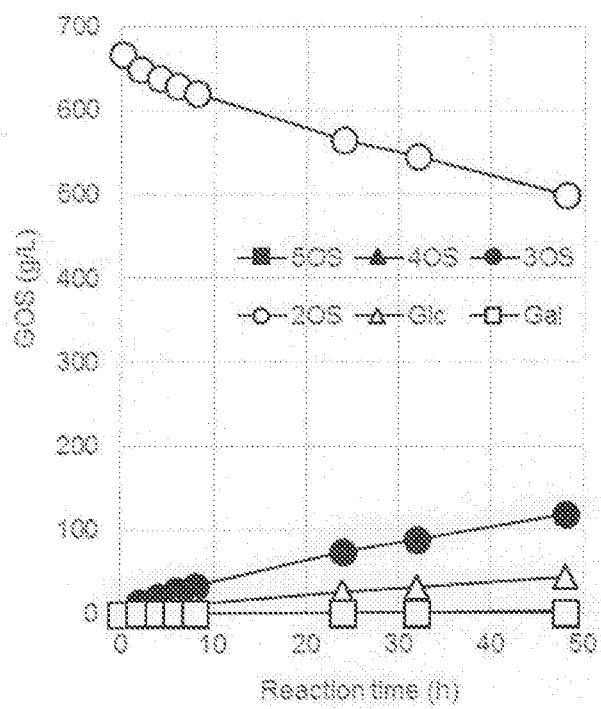
FIG. 13 is a view showing a reaction time and a sugar composition in a solution in the production of a galactooligosaccharide using SeGal strain ((a): 70° C., (b): 80° C.)
Figure 13:
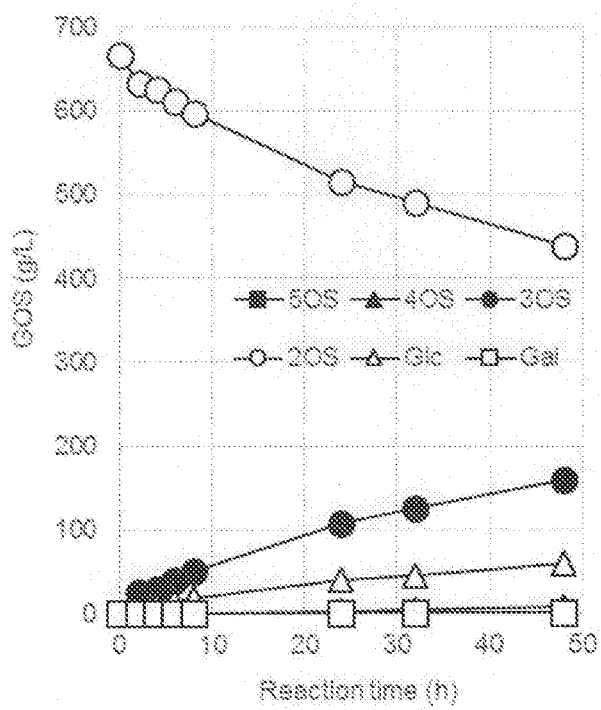
Figure 14:
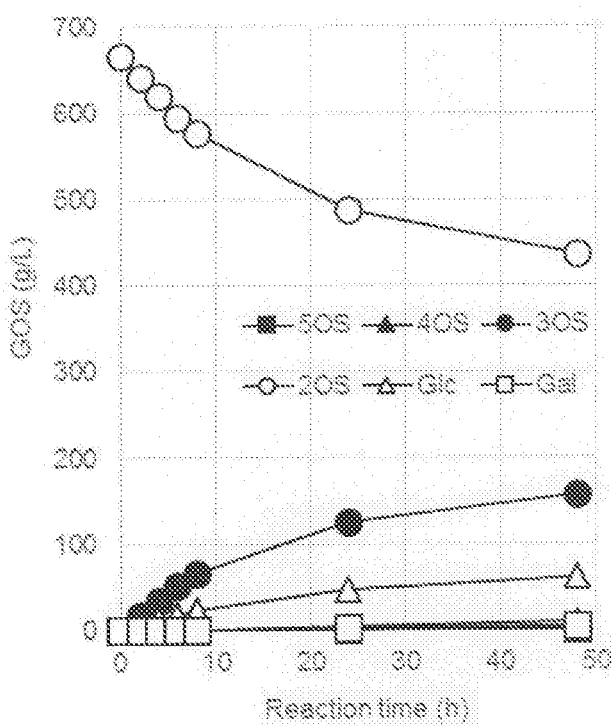
FIG. 14 is a view showing a reaction time and a sugar composition in a solution in the production of a galactooligosaccharide using SeGal strain ((c): 90° C.)

Production of Galactooligosaccharide (2):

To 150 mL of a solution containing 66% (w/v) lactose, the culture supernatant of the SeGal strain obtained in Example 9 in an amount corresponding to 1.0 U was added, and allowed to react at 70° C., 80° C., or 90° C. for a predetermined time, whereby a galactooligosaccharide was produced. The sugar composition and amount were measured by high-performance liquid chromatography. The reaction time and the sugar composition in the solution are shown in FIG. 13 ((a): 70° C., (b): 80° C.) and FIG. 14 ((c) : 90° C.)

The β-galactosidase derived from the SeGal strain had high heat resistance, and could achieve GOS production at 70 to 90° C.

INDUSTRIAL APPLICABILITY

A β-galactosidase obtained by the method for producing a secreted β-galactosidase is easily separated and purified, and can be used in the production of a galactooligosaccharide.

The invention claimed is:

1. A method for producing a secreted β-galactosidase, comprising integrating a non-secreted β-galactosidase gene derived from *Sporobolomyces singularis* and a signal sequence into *Aspergillus oryzae* to produce a secreted β-galactosidase, and culturing the *Aspergillus oryzae* in a CDD medium, wherein the non-secreted β-galactosidase gene derived from *Sporobolomyces singularis* and the signal sequence has a sequence of SEQ ID NO: 1, 3 or 5, and wherein the CDD medium comprises dextrin, glucose, $NH_4Cl$, $KCl$, $K_2HPO_4$, $MgSO_4 \cdot 7H_2O$, $CuSO_4 \cdot 5H_2O$, $FeSO_4 \cdot 7H_2O$, $ZnSO_4 \cdot 7H_2O$, $MnSO_4 \cdot 5H_2O$, $AlCl_3$, and MOPS-NaOH buffer pH 7.0.

2. The method for producing a secretory β-galactosidase according to claim 1, wherein the culturing in the CDD medium is carried out at 30° C. for 144 hours.

3. The method according to claim 1, wherein the CDD medium comprises 2% dextrin, 0.2% glucose, 0.2% $NH_4Cl$, 0.002% $KCl$, 0.001% $K_2HPO_4$, 0.0005% $MgSO_4 \cdot 7H_2O$, $2 \times 10^{-5}$% $CuSO_4 \cdot 5H_2O$, $1 \times 10^{-5}$% $FeSO_4 \cdot 7H_2O$, $1 \times 10^{-6}$% $ZnSO_4 \cdot 7H_2O$, $1 \times 10^{-6}$% $MnSO_4 \cdot 5H_2O$, $1 \times 10^{-6}$% $AlCl_3$, and 200 mM MOPS-NaOH buffer pH 7.0.

* * * * *